United States Patent [19]

Eidt et al.

[11] Patent Number: 5,764,987
[45] Date of Patent: Jun. 9, 1998

[54] RELOCATABLE FILE FORMAT AND METHOD AND APPARATUS FOR CREATING AND LOADING SAME

[75] Inventors: Erik L. Eidt, Campbell; Alan W. Lillich, Los Gatos, both of Calif.

[73] Assignee: Apple Computer, Inc., Cupertino, Calif.

[21] Appl. No.: 654,013

[22] Filed: May 28, 1996

Related U.S. Application Data

[63] Continuation of Ser. No. 212,153, Mar. 14, 1994, abandoned, which is a continuation-in-part of Ser. No. 35,750, Mar. 23, 1993.

[51] Int. Cl.$^6$ .............................. G06F 9/44; G06F 12/02
[52] U.S. Cl. ..................... 395/701; 395/710; 395/712
[58] Field of Search ........................ 395/658, 375, 395/421.08, 157, 800, 775, 700, 601, 500, 183.14, 139, 412, 701, 200.61, 682, 200.79, 868, 676, 684, 311, 826, 110, 710, 200.59, 284, 830, 712, 650, 507, 404; 364/DIG. 1, DIG. 2; 340/825, 28

[56] References Cited

U.S. PATENT DOCUMENTS

| | | | |
|---|---|---|---|
| 4,791,550 | 12/1988 | Stevenson et al. | 395/650 |
| 4,881,168 | 11/1989 | Imagami et al. | 395/800 |
| 4,918,587 | 4/1990 | Pechter et al. | 395/421.08 |
| 4,924,515 | 5/1990 | Matyas et al. | 380/25 |
| 5,175,856 | 12/1992 | Van Dyke et al. | 395/700 |
| 5,193,180 | 3/1993 | Hastings | 395/575 |
| 5,291,601 | 3/1994 | Sands | 395/700 |
| 5,307,490 | 4/1994 | Davison et al. | 395/650 |
| 5,327,559 | 7/1994 | Priven et al. | 395/700 |
| 5,339,419 | 8/1994 | Chan et al. | 395/700 |
| 5,403,639 | 4/1995 | Bdsan et al. | 395/600 |
| 5,408,665 | 4/1995 | Fitzgerald | 395/700 |

OTHER PUBLICATIONS

"IEEE Standard for Microprocessor Universal Format for Object Modules (IEEE Std 695–1990)", IEEE Computer Society (Feb. 29, 1991).

Braga, et al., "A Portable Linking Loader", Symposium on Trends and Applications 1976: Micro and Mini Systems, IEEE Computer Society (May 27, 1976), pp. 124–128.

Presser, Leon, and White, John R., "Linkers and Loaders", ACM Computing Surveys (Sep. 1972), vol. 4, No. 3, pp. 149–167.

(List continued on next page.)

*Primary Examiner*—Daniel H. Pan
*Attorney, Agent, or Firm*—Fliesler, Dubb, Meyer & Lovejoy

[57] ABSTRACT

Relocation table entries in a executable object code file are interpreted as relocation instructions rather than as individual specifications for a particular respective relocatable information item. An abstract machine is provided for interpreting the relocation instructions and performing various relocation operations and various control functions for the abstract machine, in response to the relocation instructions. The abstract machine maintains certain variables containing information which is referenced and updated in response to certain types of the relocation instructions, thereby obviating the need to include such information as part of each relocation instruction. Certain of the relocation instruction types can also specify a particular relocation operation to be performed on a run of n consecutive relocatable information items, where n is specified as part of the relocation instruction. Certain of these relocation instruction types also consider each information item as including two or more individual relocations of the same or different types to perform, thus effectively specifying a run of n repetitions of a pattern of relocations. Other types of relocation instructions are also made available. The file also contains a hashed symbol export table and pattern-initialized data expansion instructions.

58 Claims, 14 Drawing Sheets

OTHER PUBLICATIONS

"The Concise Atari ST 68000 Programmer's Reference Guide", Glentop Publishers (Aug. 1986), pp. 2-20 – 2-27.

"SCO® UNIX® Development System, Programmer's Reference Manual vol. 1", SCO Open Systems Software (10 Dec. 1991), pp. 180-186, 294-299, 337, 351-354, 369-372.

"R6000 InfoExplorer", Articles Published on CD-ROM: IBM Corporation, 1991. Articles entitled: a.out File Format; Optional Auxiliary Header for the a.out File; Section Headers for the a.out File; Raw Data Sections for the a.out File; Special Data Sections for the a.out File; Relocation Information for the a.out File; xcoff.h; filehdr.h; reloc.h; scnhdr.h; loader.h.

Kanai, et al., "The Concept and Implementation of Standard Object Module Format for Microprocessors (SYSROF-E)", Proceedings of the 1986 International Conference on Industrial Electronics, Control and Instrumentation (Sep. 29, 1986), vol. 2 of 2, pp. 839-844.

"Inter–Linkage Function Invocation Method", IBM Technical Disclosure Bulletin (Sep. 1992), vol. 35, No. 4B, pp. 44-49.

"EXE Format for 32-Bit Personal Computer Systems", IBM Technical Disclosure Bulletin (Sep. 1992), vol. 34, No. 3, pp. 363-365.

Garitagoitia, J.R., et al., "Relocating Direct Linking Loader for MCS-80 Microcomputer Series", Euromicro Newsletter (1977), vol. 3, No. 3, pp. 22-28.

Duncan, Ray, "Advanced OS/2 Programming", Microsoft Press (1989), Appendix D, pp. 715-736.

```
    15    13 12      9 8                    0
   ┌─────┬──────┬──────────────────────────┐
   │ 0 1 0│SUBOP4│          CNT9            │   RUN
   └─────┴──────┴──────────────────────────┘
```
*FIG. 7A*

```
    15        12 11                        0
   ┌──────────┬──────────────────────────┐
   │ 1 0 0 0  │          B12             │   DELTA
   └──────────┴──────────────────────────┘
```
*FIG. 7B*

```
    15    13 12      9 8                    0
   ┌─────┬──────┬──────────────────────────┐
   │ 0 1 1│SUBOP4│          IDX9            │   GLP
   └─────┴──────┴──────────────────────────┘
```
*FIG. 7C*

```
    15  14 13           6 5                 0
   ┌─────┬──────────────┬──────────────────┐
   │ 0 0 │      W8      │        N6         │   DELTADATA
   └─────┴──────────────┴──────────────────┘
```
*FIG. 7D*

```
    15        12 11      8 7                 0
   ┌──────────┬─────────┬───────────────────┐
   │ 1 0 0 1  │   I4    │       CNT8        │   RPT
   └──────────┴─────────┴───────────────────┘
```
*FIG. 7E*

```
    28 27 26 25                              0
   ┌─────┬────┬──────────────────────────────┐
   │ 0 1 0│SUB-│          OFFSET26           │
   │     │OPC │                              │
   └─────┴────┴──────────────────────────────┘
```
*FIG. 7F*

```
    28 27 26 25    22 21                     0
   ┌─────┬────┬──────┬─────────────────────┐
   │ 0 1 1│SUB-│ CNT4 │        CNT22        │
   │     │OPC │      │                      │
   └─────┴────┴──────┴─────────────────────┘
```
*FIG. 7G*

RELOCATABLE FILE FORMAT AND METHOD AND APPARATUS FOR CREATING AND LOADING SAME

CROSS-REFERENCE TO RELATED APPLICATIONS

This application is a Continuation of Ser. No. 08/212,153, filed Mar. 14, 1994, now abandoned, which is a continuation-in-part of U.S. patent application Ser. No. 08/035,750, filed Mar. 23, 1993, entitled "Load Time Relocation Engine", by inventors Erik L. Eidt and Alan W. Lillich, assigned to the assignee of the present application.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

1. Field of the Invention

The invention relates to the loading of software into memory for execution by a computer system, and more particularly, to techniques and file formats which facilitate the same.

2. Description of Related Art

Computer programs are typically written originally in source code in a computer language such as C or Pascal, or in an assembly language. To prepare the program for execution on a computer system, one or more source code modules are passed through a compiler (or assembler) which is specific to the language used and the computer system on which it will be executed, and which generates an object code file as its output. A linker routine, which is either a separate program or is part of the compiler, combines them into a single output file, known as an "executable" object code file. One or more executables are then loaded together into memory by a loader program, and control is transferred to a start address to initiate program execution.

An executable object code file typically includes, among other things, a header section which contains information about the structure of the file; one or more code sections which contains binary instructions which are directly executable by the system's CPU; one or more data sections; and a loader section, the contents of which are described below.

A data section typically contains data which was initialized by the compiler in response to the source code, descriptors describing various procedure pointers, as well as several other types of pointers. The various pointers which are contained in the data section may include some which refer to the address in memory of other data objects or of specific computer instructions. For example, a pointer may refer to specific objects in a code section, such as the entry point of a procedure. Other pointers in the data section may contain the addresses of other objects in the same data section. (As used herein, an address may be real or virtual, depending on the computer system used). Further, in systems where programs may be compiled into two or more executable files and subsequently loaded together, a data section in one file may contain pointers to objects in a code or data section of another file.

All of these references to absolute addresses must be "relocatable" since at the time of compilation and linking, the compiler/linker has no way of knowing what will be the ultimate addresses in memory at which the various referenced objects will be loaded. Thus references in an executable object code file to an address in a code section are often represented in a form which is merely relative to the start of the code section, and references to an object in a data section are represented in a form which is merely relative to the starting address of the data section. The loader program is then able to perform a relocation of these references by, after a referenced section is loaded into memory and the start address of that section is known, merely adding that start address to all of the references to objects within that section.

References to external symbols are typically represented in an executable object code file as indices into a symbol import/export table which is also contained in the file, each import entry in the import/export table identifying both the name of one of the symbols and the external file which should contain that symbol. The indices are often numbered consecutively, and as will be seen below, the table also contains export entries. When the loader program encounters a reference to an external symbol, it loads the external file and determines the address of the referenced symbol. The loader program then relocates the reference by adding in the address of the referenced symbol.

In order to determine the address of an import symbol, the loader searches for the symbol, usually by name, among the exports in the symbol import/export table of the external file. The entry which contains the desired export also designates the address of the symbol by designating the section number of the external file containing the symbol, and an offset into that section.

The loader section of an executable object code file typically includes a relocation table containing entries which specify how each relocatable reference is to be relocated upon loading into memory. For example, for a relocatable reference to an object which is within a code section, the relocation table contains a specification that the number to be added to the reference is the start address of the code section, rather than the start address of some other section. Similarly, for a relocatable reference to an object which is contained within a data section, the relocation table contains an entry specifying that the number to be added to the relocatable reference is the start address of the data section rather than of a code section. For a relocatable reference to an external symbol, the relocation table contains a corresponding specification of the index to the desired entry in the symbol import table.

When the loader program begins operation, it retrieves the desired executable object code file from a mass storage device such as a disk. If the computer system permits multiple tasks to be resident simultaneously using a shared object code section, then a separate copy of the data section(s) is (are) made for each task which will use the loaded file. In one example of memory organization, the loader may first check whether the desired file is already present in memory for another task. If not, the loader loads the header, code, data and loader sections of the file into a portion of memory which is read-only to individual users. In either case, the loader then makes a copy of the data section(s) in read/write memory for the new task.

If the loader has been invoked to load several files or modules into memory at the same time, then these files, too, are loaded into memory in the same manner as the first file. All the references to external symbols are resolved at this time, by inserting into each file's symbol import table the address into which each symbol has been loaded. Symbol imports may be resolved recursively. That is, when one module (e.g. an application program) references a symbol in a second module (e.g. a library), the loader may load and perform all relocations on the second module before returning to resolve the symbol in the first module. Similarly, if the second module references a symbol in a third module, the loader may load and perform all relocations in the third module before returning to the second, and so on.

After the various sections of file have been loaded into memory, and imports have been resolved, the loader performs the relocation process. The relocation process is performed by traversing the relocation table in the loader section, and performing the specified relocation operation for each of the relocatable references contained within the current file.

One popular format for executable object code files is known as XCOFF. XCOFF is described in the following articles published in IBM, "R6000 InfoExplorer" (CD-ROM, 1992):

"a.out File Format",

"Optional Auxiliary Header for the a.out File",

"Section Headers for the a.out File",

"Raw Data Sections for the a.out File",

"Special Data Sections for the a.out File",

"Relocation Information for the a.out File",

"xcoff.h",

"filehdr.h",

"reloc.h",

"scnhdr.h",

"loader.h";

all incorporated herein by reference. In XCOFF, the loader section has the following portions:

Header Portion

External Symbol Import/Export Table

Relocation Table

Import File Ids

Loader String Table.

The Header Portion of the Loader Section contains a version number and sufficient information to navigate the remainder of the Loader Section.

The External Symbol Import/Export Table contains one 24-byte entry for each of the external references for the file. The entries are unsorted, with no grouping of imports separately from exports, and no grouping of imports from one external file separate from imports from another external file. Each entry in the External Symbol Import/Export Table has the following fields:

TABLE I

| Field Name | Length Bytes | Description |
|---|---|---|
| l_name | 8 | Full symbol name (if ≤ 8 bytes), or offset to full symbol name in the Loader String Table. |
| l_value | 4 | Offset into l_scnum where export symbol is located; unused if import. |
| l-scnum | 2 | Section number containing the export symbol, or 0 if import or not defined. |
| l_smtype | 1 | Symbol type, and flags |

TABLE I-continued

| Field Name | Length Bytes | Description |
|---|---|---|
| | | indicating whether the symbol is an import, export, and/or entry point description. |
| l_smclas | 1 | Symbol storage class. |
| l_ifile | 4 | Import file id: ordinal of import file Ids in Loader Import File Ids portion. Specifies source for import symbols. |
| l_parm | 4 | Parameter type check field. |

The Relocation Table contains the relocations information for the XCOFF file. Each entry in the Relocation Table is 12 bytes long and contains the following fields:

TABLE II

| Field Name | Length (Bytes) | Description |
|---|---|---|
| l_vaddr | 4 | Offset within section number specified in l_rsecnm, of an information item to be relocated. |
| l_symndx | 4 | External symbol import table index of object that is being referenced. |
| l_rtype | 2 | Type of relocation. |
| l_rsecnm | 2 | Number of the section containing the relocatable item governed by this table entry. |

The l_symndx field of a relocation table entry specifies whether the item to be relocated is a reference to an external symbol, or to an object in one of the code or data sections. Specifically, values of 1 and 2 indicate that the reference is to an object in a .data or .bss section respectively (both of which are considered "data sections" as the term is used herein), and a value of 0 indicates that the reference is to an object in a .text section (code). Values of 3 or higher constitute indices into the external symbol import table for the file, and indicate that the relocatable reference in the information item is a reference to the corresponding external symbol. In this case, the relocatable reference in the information item itself may contain 0, or an offset value to which the address of the external symbol will be added. Note that while relocation table entries have the capacity to control relocations of information items contained in the code section, this capacity is rarely used on computer systems which support relative branching. For these systems, when a compiler generates a branch instruction for the code section, it typically uses the relative branch format so as to obviate any need for a relocation. When the compiler generates an instruction which references a data object, it typically uses an indexed addressing mechanism for which only the offset from the base address of the data section need be included in the ultimately executed code. The software pre-loads the starting address of the desired data section into a register to use as the base address. Further, in the situation where code sections are sharable, relocations are avoided in the code section also because the relocation appropriate for one task may not be the same as the relocation appropriate for another task sharing the same code section.

The l_rtype field indicates the type of relocation which is to be performed, and most commonly contains a value indicating that the reference is an absolute 32-bit reference to the virtual address of the object.

1_rsecnm indicates the section number containing the information item to be relocated. As with the $1_{13}$ symndx field, certain predefined values are implicit references to the .text, .data and .bss sections, respectively.

The Import File Ids portion of the XCOFF file contains variable length strings, each carrying the file Id for a respective one of the import files referenced ordinally in the 1_ifile field of an import entry in the External Symbol Import/Export Table. Similarly, the Loader String Table portion of the file contains variable length strings, each carrying the text name of a respective one of the import and export symbols referenced in the 1_name field of an import or export entry in the External Symbol Import/Export Table.

One problem with the XCOFF file format is that it is extremely inefficient in terms of space occupied in the mass storage device, in terms of memory usage at launch time, and in terms of the time required to launch an application. The space which an XCOFF file occupies in mass storage is in large part due to the fact that XCOFF requires 12 bytes of relocation information for each 4-byte word in the data section that requires relocation. Thus in an executable object code file containing 1.5 megabytes, as much as 300 k bytes might be occupied by the relocation table. The relocation table space overhead is also a large factor in the inefficient usage of memory at launch time. The inefficiency of launch time speed performance is due in part to the need to retrieve and interpret 12 bytes for every relocation to be performed.

The inefficiency of the XCOFF file format is due also in part to the absence of any organization in the External Symbol Import/Export Table. This means that when the loader program needs to import a symbol exported by an XCOFF file, it must search through the entire External Symbol Import/Export Table until it is found. This can amount to hundreds or thousands of entries in some programs, which may need to be searched hundreds or thousands of times (once for each import from the file). Moreover, each search can involve a lengthy string comparison of the symbol name of an export in the Table, with the desired symbol import name.

An XCOFF loader program may attempt to speed this process by reading the entire External Symbol Import/Export Table of an imported XCOFF file into read/write memory before performing any comparisons, but this itself takes time and requires an extensive amount of memory. Additionally, the entire Loader String Table would also need to be loaded Into memory, and in a virtual memory computer system there is a strong likelihood that the need to repeatedly access the External Symbol Import/Export Table entries and the Loader String Table in an alternating manner will cause repeated page faults and further degrade performance. Moreover, a typical importing file may need to import only 10% of the symbols exported by the imported file being read into memory in this manner. Thus the vast majority of the entries in the External Symbol Import/Export Table and the Loader String Table which are brought into memory in order to speed import resolution, may never be used.

In addition to XCOFF, another conventional format for executable object code files is used in the GEM disk operating system for Atari ST computers. See K. Peel, "The Concise Atari ST 68000 Programmer's Reference Guide" (Glentop Publishers: 1986), especially pp. 2–21 through 2–24. The entire Peel guide is incorporated herein by reference.

In the GEM format, the loader section of an executable object code file consists of a series of bytes, each of which specifies at most a single relocation. A loader routine maintains a pointer into the program being loaded, and updates the pointer in dependence upon each byte in the loader section. Specifically, if a byte in the loader section contains any number between 2–255 inclusive, the loader routine advances the pointer by the specified number of bytes and adds the start program address to the 32-bit relocatable reference then pointed to by the pointer. If the byte in the loader section contains the value 1, then the loader routine advances the pointer by 254 bytes without performing a relocation. A zero byte in the loader section indicates the end of relocations.

The GEM executable object code file format and loader routine are extremely primitive, lacking any capability for symbol imports and exports, for separate code and data sections, or for any kind of relocation other than the addition of the start program address to a 32-bit relocatable reference. Additionally, like the XCOFF format, the GEM format still contains a relocation table entry (byte) for each relocation to be performed.

SUMMARY OF THE INVENTION

The invention takes advantage of certain characteristics of executable object code files to drastically reduce the number of bytes of relocation information which are required per relocation. In particular, roughly described, relocation table entries in an executable object code file are interpreted as relocation instructions rather than individual specifications for a particular respective relocatable information item. An abstract machine is provided for interpreting the relocation instructions and performing various relocation operations and various control functions for the abstract machine, in response to the relocation instructions. The abstract machine maintains certain variables containing information which is referenced and updated in response to certain types of the relocation instructions, thereby obviating the need to include such information as part of each relocation instruction. Certain of the relocation instruction types can also specify a particular relocation operation to be performed on a run of n consecutive relocatable information items, where n is specified as part of the relocation instruction. Other types of relocation instructions are also made available.

In another aspect of the invention, an executable object code file separates the import symbol table from the export symbol table, and in a combined string table, locates the import symbol name strings closer to the import symbol table and locates the export symbol name strings closer to the export symbol table. The export symbol table is also sorted according to a hashing algorithm. Additionally, pattern initialized data sections are stored as data expansion instructions to further reduce the size of the object file.

BRIEF DESCRIPTION OF THE DRAWINGS

The invention will be described with respect to particular embodiments thereof, and references will be made to the drawings, in which like elements are given like designations, and in which:

FIGS. 7A-7G illustrate field definitions for relocation instructions recognized by the abstract machine;

DETAILED DESCRIPTION

Figure 1:
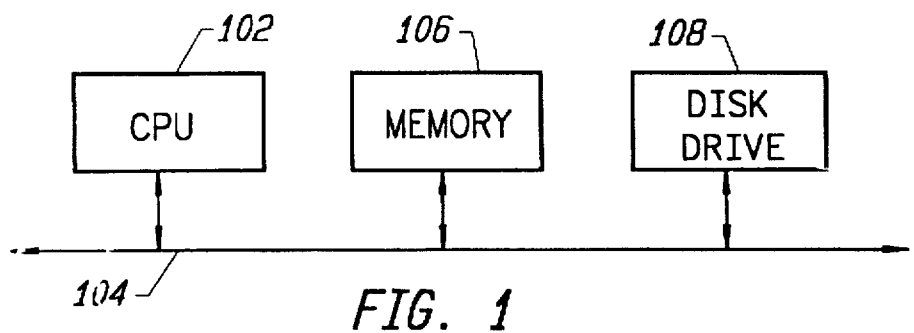
FIG. 1 is a symbolic, simplified block diagram of a computer system incorporating the invention.

FIG. 1 is a symbolic block diagram of a computer system in which the invention is implemented. It comprises a CPU 102 which is coupled to a bus 104. The bus 104 is also coupled to a memory 106 and a disk drive 108. Numerous types of computer systems may be used, but in the present embodiment, computer software is usually stored on the disk drive 108 and brought into memory 106 over the bus 104 in response to commands issued over bus 104 by the CPU 102. The CPU 102 runs an operating system which, possibly together with specialized hardware, supports virtual addressing. That is, a computer program running on CPU 102 can reference memory addresses in an address space which is much larger than the physical space in memory 106, with the operating system and/or specialized hardware swapping pages from memory 106 to and from the disk drive 108 as necessary. The operating system also supports multi-tasking, in which two or more tasks can execute different copies of the same or different software in a parallel or time-sliced manner.

Executable object code files stored on the disk drive 108 are referred to herein as containers, and those that incorporate features of the presently described embodiment are referred to as PEF containers (that is, they follow a "PEF" format). Such files may also be retrieved from a different part of memory 106, or from another resource (not shown). A PEF container may contain the compiler output from a single source code module or, if the compiler is able to combine more than one source code module, the output from a plurality of source code modules. Several different containers (PEF or otherwise) may be required to form a complete program.

OVERALL PEF CONTAINER STRUCTURE

Each PEF container contains the following portions a container header, N section headers, a string table, and N section data portions. The container header is of a fixed size and contains global information about the structure of the PEF container. The exact contents of the container header are unimportant for an understanding of the present invention and are therefore not described herein.

The section headers portion of a PEF container includes a section header for each of N "sections". Every PEF section, regardless of whether it includes any raw data, has a corresponding section header. Such sections include, for example, loadable sections such as code, data and pattern initialized data (pidata) sections, and nonloadable sections such as a "loader" section. Each of the sections has a corresponding section number which is derived from the order of the section headers in the section header portion of the PEF container, starting with section 0. Section 0 is typically a code section and section 1 is typically a data section, but this is not a requirement.

Each section header is 28 bytes long and has the following structure:

TABLE III

| No. of Bytes | Description |
| --- | --- |
| 4 | Section name (offset into global string table). |
| 4 | Desired section address in memory (typically 0). |
| 4 | Execution size in bytes. |
| 4 | Initialization size in bytes (prior to any zero-initialized extension). |
| 4 | Raw size in bytes. |
| 4 | Offset from beginning of container to this section's raw data. |
| 1 | Region kind (code section, data section, pidata section, loader section, etc.). |
| 1 | Memory alignment required for this section (byte alignment, half-word alignment, full-word alignment, etc.). |
| 1 | Sharing kind (unsharable section, sharable within a context; sharable across all context within a task; sharable across all contexts within a team; or sharable across all contexts. |
| 1 | Reserved. |

The exact meaning of each of the elements in a section header is unnecessary for an understanding of the present invention, except as included in the table above, and except to note that the section kinds include the following sections:

TABLE IV

| Kind | Description |
| --- | --- |
| code | A code section is loadable and contains read-only executable object code in binary format, in an uncompressed, directly executable format. |
| data | A data section is loadable and contains initialized read/write data followed by read/write zero-initialized data. The presence of zero-initialized read/write data is indicated by the section size being larger than the image size. A PEF data section combines the .data and .bss sections of a standard UNIX executable object code file. Data sections are not compressed. |
| pidata | A Pidata section is loadable and identifies a read/write data region initialized by a pattern specification contained in the section's raw data in the object file. In other words, the raw data portion of a PEF container which corresponds to a pidata header contains a small program that is interpreted by the loader to determine how the section of memory should be initialized. Zero extension is automatically handled by the loader for pattern-initialized data, as |

TABLE IV-continued

| Kind | Description |
| --- | --- |
| | with the data section. The format of a pidata section is described below. |
| constant | A constant section is loadable and contains read-only data. The loader can place it in read-only memory, and a constant section is not compressed. |
| loader | The loader section is nonloadable and contains information about imports, exports and entry points. The format of the loader section is discussed below. |
| debug | The debug section is nonloadable and contains all information necessary for symbolic debugging of the container. Multiple formats can be supported, including the format of a conventional XCOFF .debug section. |

The PEF container format includes no region kind specifically for zero-initialized data, similar to a .bss section in a conventional XCOFF file. Rather, zero-initialized sections are achieved in PEF simply by specifying a data section with an init size of 0. The loader uses the exec size to determine how much space to allocate to the section in memory, and then uses the difference between the exec size and the init size to determine how much space to zero-initialize. Thus the effect of a data section with a 0 init size is to zero-initialize the entire data section in memory. Note there is no requirement that zero-initialized data sections immediately follow other data sections in memory.

The section data portion of the PEF container contains raw section data corresponding to each of the headers in the section header portion of the PEF container (except for zero-initialized sections). The sequence of section data portions need not be the same as the sequence of their corresponding section headers. The raw data within certain sections including code, data and loader sections are required to be 8-byte (double-word) aligned. For code sections, the raw data simply contains the executable object code. For data sections, the raw data contains the initialized data for the section. For the loader section, the raw data contains additional information needed by the loader as set forth in more detail below.

Loader Section Format

The loader section contains the following portions:

Loader section header

Table of Import Container ID's

Import Symbol Table

Relocation headers

Relocation instructions

Loader String Table

Export Slot Table

Export Chain Table

Export Symbol Table.

Loader Section Header

The loader section header has a fixed size, and provides information about the structure and relative location of the various components of the loader section. Most of the entries in the loader section header are unimportant for an understanding of the present invention, except to note that it contains, among other things, one entry specifying the number of entries present in the Table of Import Container ID's, one entry indicating the number of entries in the "import symbol table" portion of the loader section, one entry indicating the number of sections in the PEF container which require relocations, one entry indicating the byte offset from the start of the loader section to the start of the relocation instructions (Relocation Table), one entry indicating an offset to the Loader String Table, one entry indicating an offset to the Export Slot Table, a "hash slot count" (indicating the number of "slots" in the Export Slot Table), and an entry indicating the number of symbols which are exported from this object file (including re-exports of imports). All tables use zero-based indices.

Table of Import Container ID's.

The Table of Import Container ID's contains an entry for each external container which may contain a symbol to be imported into the present PEF container. Such external containers may follow a conventional format such as XCOFF, or preferably follow the same format as described herein for a PEF container. Each entry in the Table of Import Container ID's contains, among other information which is not important for an understanding of the present invention, the following fields: an offset into the Loader String Table to indicate the name of the container, a count of a number of symbols which are contained in the Import Symbol Table for the particular external container, and a zero-based index of the first entry in the Import Symbol Table (in the present file) for the particular external container.

Import Symbol Table

The Import Symbol Table contains one entry for each external symbol to be imported. Each Import Symbol Table entry contains a symbol class identifier together with an offset into the Loader String Table to indicate the name of the symbol. All of the symbols to be imported from a given one of the external containers are grouped together in the Import Symbol Table, although within that group they may appear in any order. Imported symbols may be in any of the following classes: an address in code, an address in data, a pointer to a transition vector (also referred to herein as a descriptor or procedure pointer), a TOC symbol, or a linker inserted glue symbol.

Relocation Headers.

The Relocation Headers portion of the loader section of a PEF container contains one entry for each loadable section of the PEF container which includes one or more information items to be relocated. As used herein, an "information item" may be a word, a double word, or any other unit of information which contains one or more relocatable address fields. Unlike the conventional file format, in which each relocatable information item consisted of exactly one relocatable address field, a relocatable information item in PEF may contain any number of relocatable address fields as defined by the relocation instruction.

Note that although relocations of information items which are contained within a code section are supported by the PEF container definition, code sections preferably do not include any load time relocations at all. This permits code sections to be located outside of user-writable memory, and also permits code sections to be sharable. Note also that though multiple data sections are supported; typically only one data section will exist.

Each header in the Relocation Headers portion of the loader section of a PEF container has the following format:

TABLE V

| No. of Bytes | Description |
| --- | --- |
| 4 | Section number. |
| 4 | Number of bytes of relocation instructions |

TABLE V-continued

| No. of Bytes | Description |
| --- | --- |
| | for this section. |
| 4 | Offset from the start of the Relocation Table to the first relocation instruction for this section. |

The section number field of a relocation header identifies the section number of a loadable section whose information items are to be relocated. Section number 0 may, for example, be a code section, and section number 1 may, for example, be a data section. As set forth above, the section numbers are assigned depending on their sequence in the "Section Headers" portion of the PEF container. Also as set forth above, no relocation header will typically be included for a code section since code sections preferably contain no relocatable information items. Additionally, section numbers −1 and −2 have special meanings which are not here relevant; these sections do not contain relocations. Section number −3 indicates a re-export-of-import, and does not contain any relocations.

Relocation Table

The Relocation Table in the loader section of a PEF container consists of an array of relocation instructions. All of the relocation instructions for information items within a given section of the PEF container are grouped together. The relocation instructions are two or four bytes in length and contain an opcode in the high-order bits. The remaining fields of the instruction depend upon the opcode and are described hereinafter.

Loader String Table

The loader string table contains all of the strings referenced by other portions of the loader section. The strings are all variable in length, and include both import and export symbol names and file names of imported libraries. The loader string table is located in the middle of the loader section, after the import symbol table and relocation table, but before the symbol export portions of the loader section. All of the import symbols are grouped together and located nearest the import symbol table, and all of the export symbols are grouped together and located nearest the export symbol table. Both the grouping of the symbols and their locations relative to the two symbol tables tend to improve performance on loading in a virtual memory computer system, since page hits are more likely.

Symbol Export Portions

The PEF container organization hashes a container's export symbols into a hash data structure at container build time. This considerably speeds the search for exported symbols when they are to be imported into another container at load time. The symbol export portions of the loader section of a PEF container include an Export Slot Table, an Export Chain Table, and an Export Symbol Table.

In the hash data structure, the Export Slot Table contains an entry for each hash "slot" in the data structure. Each entry contains a chain count indicating the number of export symbols which have been placed in the slot corresponding to the entry's index, and an index into the Export Chain Table of the first Export Chain Table entry for the slot.

The Export Chain Table contains an entry for each export symbol; grouped according to their slots Each entry contains the hashword value for the entry's export symbol.

The Export Symbol Table contains an entry for each symbol in the current PEF container which may be imported by another container. These entries include an offset into the Loader String Table of the current container to identify the name of the symbol, the number of the section in the current PEF container which contains the symbol, and the offset into that section at which the symbol may be found.

Thus to locate an export symbol given its name, the loader program first computes the hashword value for the symbol name using a predefined Name-to-Hash-Word function. It then uses a predefined Hash-Word-to-Hash-Slot-Number function, together with the size of the Export Slot Table in the given container (obtained form the Loader Section header) to compute the slot number for the export symbol. It uses the hash slot number as an index into the Export Slot Table, from where it fetches the chain count and the Export Chain Table index of the first Export Chain Table entry for the slot. While the count is valid, the Export Chain Table is searched starting at the Export Chain Table index previously fetched. When a hashword matches that computed for the desired export symbol, the Export Chain Table index of that hashword designates the export index number of a potential name match. To see if the name really matches, the loader program applies the export index to the Export Symbol Table, which contains the offset to the export name's text, which is compared to the desired export symbol name. If it matches, then the information about the export identified by that index is returned. Otherwise, as long as the count is still valid (if not, symbol is not found), the next export index is checked.

A PEF loader program can also locate an export symbol given its export symbol index. To find information about an export symbol by (zero based) index, the PEF Loader applies the index to the Export Chain Table to fetch the hashword value for that symbol, or applies the index to the Export Symbol Table to fetch the rest of the information about the value. The Export Symbol Table contains a pointer to the actual name text.

The general process for construction of the Export Slot Table and the Export Chain Table in the presently described embodiment is as follows:

1. Compute the number of elements in the Export Slot Table. This is based upon the number or exports, but can vary depending on desired Export Slot Table size overhead. Write the Export Slot Table size into the Loader Section header.
2. For each export, compute its hashword value using the Name-to-Hash-Word function. Then compute its export hash slot value based upon the Export Slot Table size, using the Hash-Word-to-Hash-Slot-Number function.
3. Sort the exports by hash slot number. This order groups together all exports with the same slot number, and creates the (zero based) symbol index for each export. At each index in the Export Chain Table, write the hash word for the export. At each index in the Export Symbol Table, write the symbol table entry.
4. Construct the Export Slot Table (size given by step 1). Each entry in this table has the count of exports, as well as the index of the first export whose hash slot values collide at that hash slot index.

The following is a preferred method for computing an Export Slot Table size for use in the hashing process, although other methods could be used instead. The hash slot table size function computes an appropriate size for the Export Slot Table, given the number of exports. The size is always a power of 2, and therefore the output of this function is to give the number of the power of 2. The constant kAvdChainSize is normally 5, but can vary as desired for a size vs. speed trade off. Note: there is a very small penalty for longer hash slot chains, which result from shorter hash slot tables, because the data structures are optimized to account for hash slot collisions.

```
int NumSlotBits ( long exportCount )
{
    register int i;
    for (i = 0; i < 13; i++) {
        if ( exportCount / (1 << i) < kAvgChainSize ) break;
    }
    if (i < 10) return i+1;
    return i;
}   /* NumSlotBits () */
```

The preferred Name-to-Hash-Word function used to compute the hashword for export symbols in the loader section, encodes the length of the identifier as the high order 16 bits, and the low order bits are constructed by accumulating for each byte the following operation: rotate the current hash value 1 bit, and xor in the next byte of the name. It is implemented as follows.

```
#define ROTL(x)  ( ( (x) << 1 ) - ( (x) >> (16) ) )
/* produce hash value for id given length (length == 0 - - > null
    terminated) */
unsigned long Hash (register unsigned char *name, register int
    length)
{
    register long hash = 0;
    register int len = 0;
    while (*name) {
        hash = ROTL ( hash );
        hash ^= *name++;
        len++;
        if ( - -length == 0) break;
    }
    return (unsigned short) (hash ^ (hash >> 16)) + (len << 16);
}   /* Hash () */
```

The Hash-Word-to-Hash-Slot-Number function converts a hash value as computed above, into an appropriately small index number. The preferred slot function is based upon the size of the Export Slot Table, also computed as above.

define HashSlot (h,S,M)(((h) ^ ((h)>>(S))) & (M)) hashSlotIndex=HashSlot (hashWord32, htShift, (1<<htShift)–1)

Pidata Section Format

The raw data of a pidata section is organized as a sequence of data expansion instructions. Each instruction begins with a 3-bit opcode followed by a 5-bit count, together in the first byte. Then depending on the opcode, additional counts and/or raw data bytes may follow. The opcodes are as follows:

Opcode 0: Zero #Count

This opcode takes one count parameter. It clears Count bytes starting at the current data location.

Opcode 1: Block #Count (Count # of raw data bytes)

This opcode takes one count parameter, and count number of raw data bytes. It deposits the raw data bytes into the data location, essentially performing a block byte transfer.

Opcode 2: Repeat #Count1, #RCount2 (Count1 # of raw data bytes)

This opcode takes two count parameters, and Count1 number of raw data bytes. It repeats the Count1 number of raw data bytes RCount2 times.

Opcode 3: RepeatBlock #Count1, #DCount2, #RCount3 (raw data bytes)

This opcode takes three count parameters and Count1+ DCount2* RCount3 number of raw data bytes. The raw data bytes are interpreted as follows: the first Count1 bytes make up the "repeating pattern". The next DCount bytes make up the first "non-repeating part". There are RCount3 number of "non-repeating part"s. The opcode first places the "repeating pattern", then one "non-repeating part". This is performed RCount3 times, each time using the same "repeating pattern" and a new "non-repeating part". Lastly, one more "repeating pattern" is placed.

Opcode 4: Repeat Zero #Count1, #DCount2, RCount3 (raw data bytes)

This opcode takes three count parameters and DCount2*RCount3 number of raw data bytes. The raw data bytes are interpreted as follows: The "repeating pattern" is made up of Count1 bytes that are not represented in the raw data bytes. The first DCount bytes make up the first "non-repeating part". There are RCount3 number of "non-repeating part"s. The opcode first places the "repeating pattern" (zeroes), then one "non-repeating part". This is performed RCount3 times, each time using the same "repeating pattern" (zeroes) and a new "non-repeating part". Lastly, one more "repeating pattern" (zeroes) is placed.

LOADER PROGRAM

Figure 2:
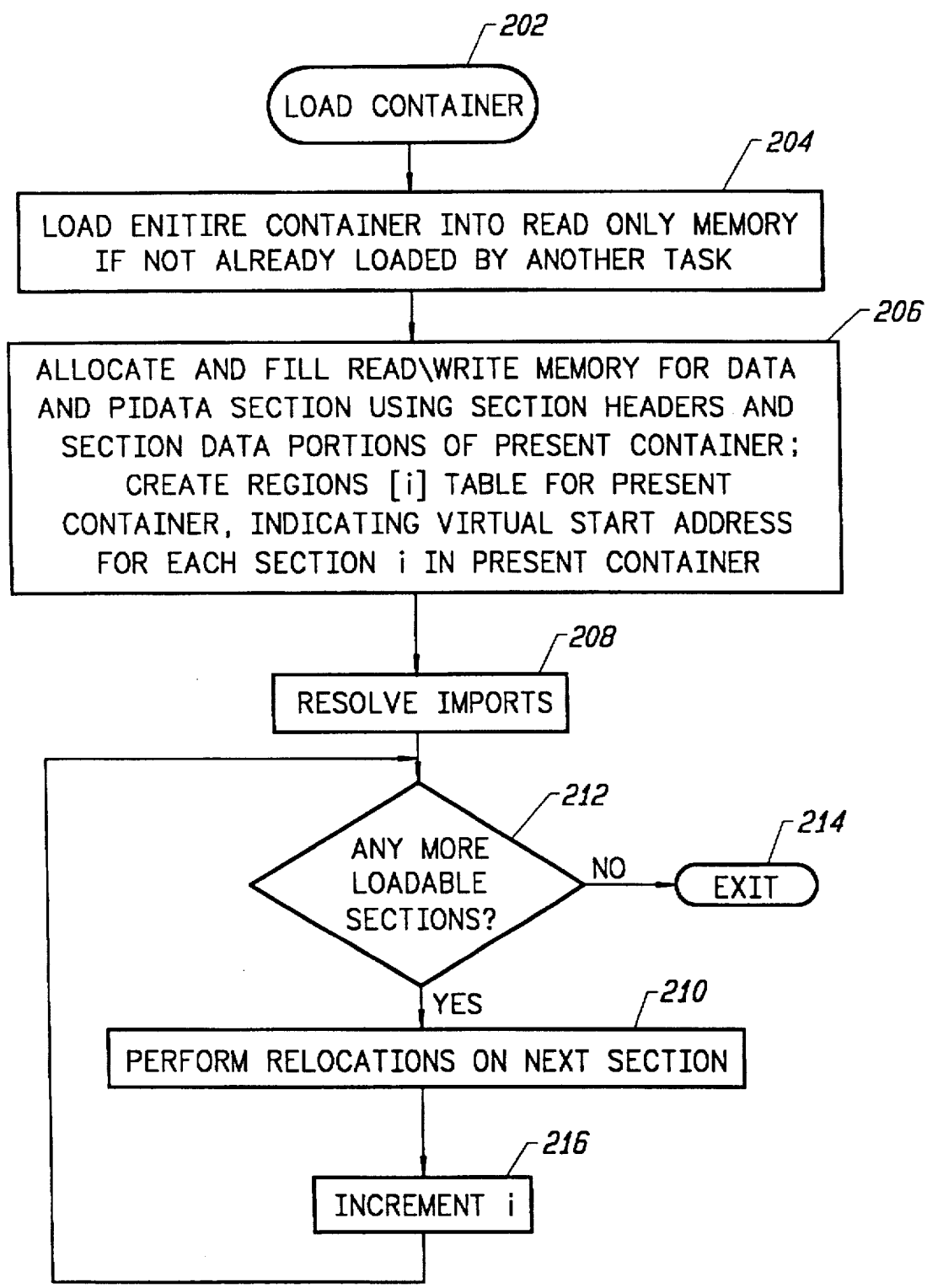
FIG. 2 is a simplified flow chart illustrating the broad functions of a loader program using the present invention.

FIG. 2 is a simplified flow chart illustrating broad functions of a loader program which may employ the present invention. The LOAD CONTAINER routine 202 illustrated in the figure is recursive as hereinafter described.

In a step 204, the entire PEF container then being loaded is brought from the source of the container (disk drive 108, another portion of memory 106, or a resource (not shown)) into a portion of memory 106 which is not writable by a user program. If the desired container is already present in memory 106, having been previously loaded by another task, then this step 204 is skipped.

Figure 3:
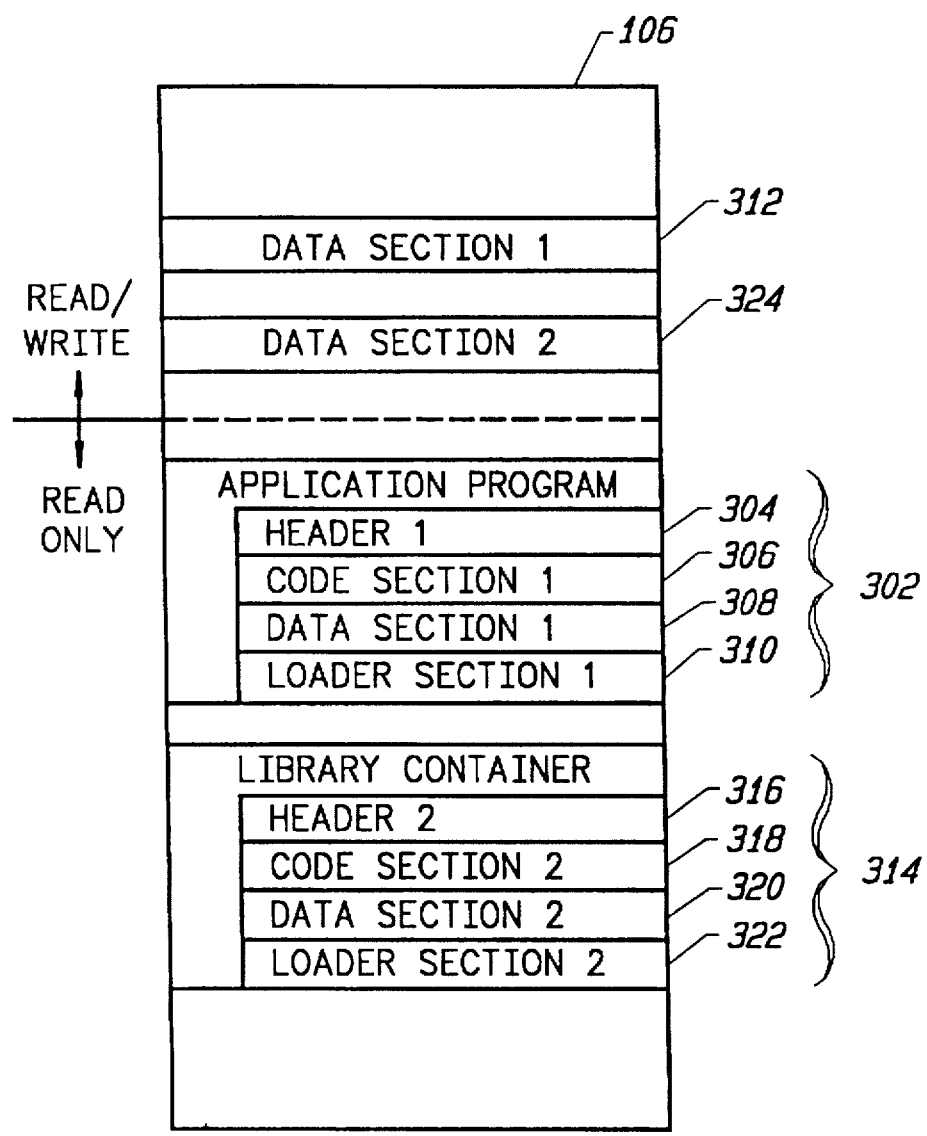
FIG. 3 is a symbolic diagram of information storage in the memory of FIG. 1.

FIG. 3 is a symbolic diagram of memory array 106 for an illustration of the LOAD CONTAINER routine for a situation in which the primary PEF container is an application program, and in which the application program includes calls to external symbols which are all located within a second PEF container referred to herein as a library container. As shown in FIG. 3, the application program is loaded in step 204 into a region 302 of the read-only portion of memory 106. The application program includes (among other sections not shown) a header section loaded into a memory region 304, a code section loaded into a memory region 306, a data section loaded into a memory region 308, and a loader section loaded into a memory region 310.

Referring again to FIG. 2, after the container is loaded into memory 106, the LOAD CONTAINER routine allocates and fills read/write memory regions for all the data and pidata sections (step 206) For the illustration of FIG. 3, this step involves copying the data section from region 308 of memory 106 into a region 312 in a read/write part of memory 106. The regions to be allocated in this step are identified in the header section 304 of the application program, and the data to be copied or otherwise written into the allocated memory regions derive from the corresponding section data portions of the application program.

Also in step 206, a regions[i] table is created to indicate the virtual start address for each region i created for the present container. Specifically, if the present container includes only one code section, and it is identified in the Section Headers portion of the container as a section 0, then regions[0] will carry the virtual address in read-only memory at which the code section was placed. In the example of FIG. 3, regions[0] will carry the virtual address of the start of memory region 306. Similarly, if section 1 of the container is a data section, then the table entry regions[1] will carry the virtual address of the data section in memory 106 as copied for use by the current task. In the example of FIG. 3, the table entry for regions[1] would carry the virtual address of memory 106 region 312. As mentioned, multiple code and data sections are supported and may occur in any order. Each is given a number, and the regions[i] table indicates where each section is located in memory 106.

Referring again to FIG. 2, after the regions[i] table is created, all references to external symbols are resolved in a step 208 and in a manner hereinafter described. (Note that in the present embodiment, though not important for an understanding of the present invention, certain external symbol imports need not be resolved at this time if they carry a flag indicating that the import need not be resolved.) The result of the RESOLVE IMPORTS step 208 is an imports[j] table which carries the virtual address of each of the symbols j which are referenced in the present container. The RESOLVE IMPORTS step 208 is described in more detail below.

After the imports are resolved, a decision is made in a step 212 as to whether any relocation headers are present in the Relocation Headers portion of the loader section of the PEF container. If not, then the user program is now fully loaded into memory 106 and the LOAD CONTAINER routine 202 is complete. The user program may be executed at this time. If the Relocation Headers portion of the loader section does contain one or more relocation headers, then the loader executes a PERFORM RELOCATIONS step 210 on the section indicated by the next relocation header. As mentioned above, there is no requirement that the sequence in which sections be relocated be the same as the sequence of the sections in the PEF container, nor is there any requirement that sections be relocated in numerical order. After the relocations are performed on all the information items within the section identified in the current relocation header, the index into the relocation headers is incremented in a step 216, and the routine returns to the decision step 212 in order to determine whether any further Relocation Headers remain in the Relocation Headers portion of the loader section of the current PEF container. This process continues until all of such sections have been processed.

Symbol Import Resolution

Figure 4:
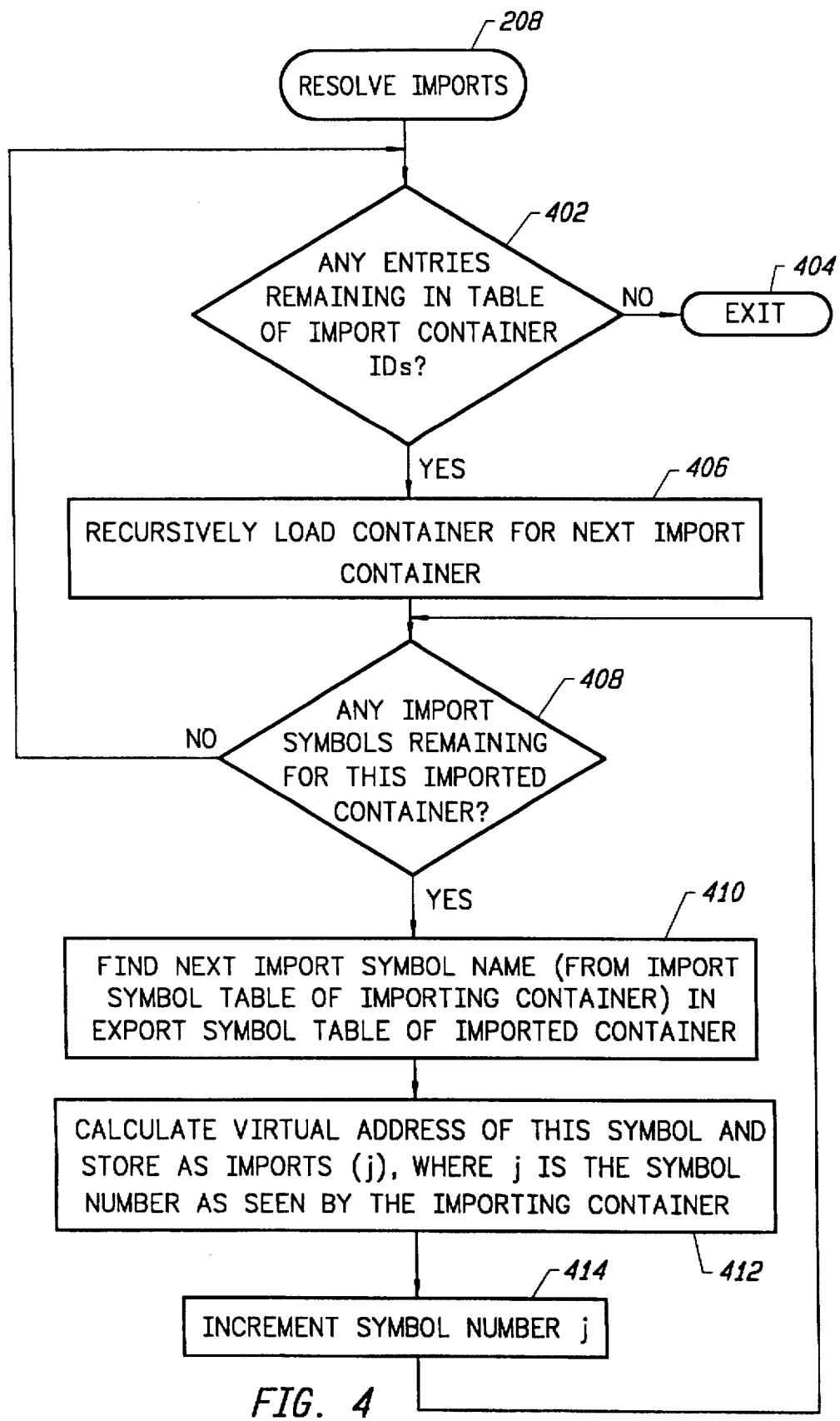
FIG. 4 is a flow chart detailing the RESOLVE IMPORTS step of FIG. 2.

FIG. 4 is a flow chart detailing the RESOLVE IMPORTS step 208 (FIG. 2). Generally described; the RESOLVE IMPORTS routine 208 loops through all of the Import Container ID's in the Table of Import Container ID's in the Loader section header of the current PEF container. For each such Import Container ID, the RESOLVE IMPORTS routine 208 recursively calls the LOAD CONTAINER routine to bring the referenced container into memory and to recursively resolve the imports specified therein. Once control returns to the RESOLVE IMPORTS routine for the present container (referred to herein as the "importing container"), the routine cycles through all of the entries in the Import Symbol Table in the loader section of the importing container. For each such entry, the routine compares the name of the imported symbol to various ones of the strings identified in the Export Symbol Table of the container most recently loaded (referred to herein as the "imported container") until a match is found. Such comparisons are facilitated by the hashed organization of PEF export symbol tables. The virtual address of the imported symbol is then calculated from the corresponding entry of the Export Symbol Table of the imported container and stored in the imports[j] table.

Accordingly, the RESOLVE IMPORTS routine 208 begins with a step 402 in which it is determined whether any entries remain in the Table of Import Container ID's for the present container. If not, then the RESOLVE IMPORTS routine 208 is finished and the routine is exited in a step 404. If entries do remain in the Table of Import Container ID's, the LOAD CONTAINER routine is recursively invoked, in a step 406, for the next referenced container. As previously mentioned, containers need not all follow the PEF format, and if the next specified container is not in the PEF format, then another appropriate routine is invoked instead of LOAD CONTAINER.

After control is returned to the RESOLVE IMPORTS routine 208 for the present container, a determination is made whether the Loader Import Symbol Table in the loader section of the present container includes any further symbols to be imported from the container most recently loaded (step 408). If not, then control is returned to step 402 to determine whether the present container requires loading of any further external containers.

In the illustration of FIG. 3, recursive execution of the LOAD CONTAINER routine 202 results in the loading of the library container into a region 314 of the read-only part of memory 106. The container header of the library container is placed in a region 316, the code section is placed in a region 318, the data section is placed in a region 320, and the loader section for the library container is placed in a region 322. The data section 320 is also copied to region 324 in the read/write part of memory 106 for the present task. A separate regions[i] table is created for the library container and used as hereinafter described to perform relocations in the library container and, after processing resumes for the application program, to calculate the virtual addresses of symbols imported from the library container.

Returning to the flow chart of FIG. 4, after it is determined that additional symbols remain to be imported from the most recently loaded container, the RESOLVE IMPORTS routine 208 finds the next import symbol name (from the Import Symbol Table of the present container) in the Export Symbol Table of the container most recently loaded (step 410). This is accomplished by the steps illustrated in FIG. 8.

Figure 8:
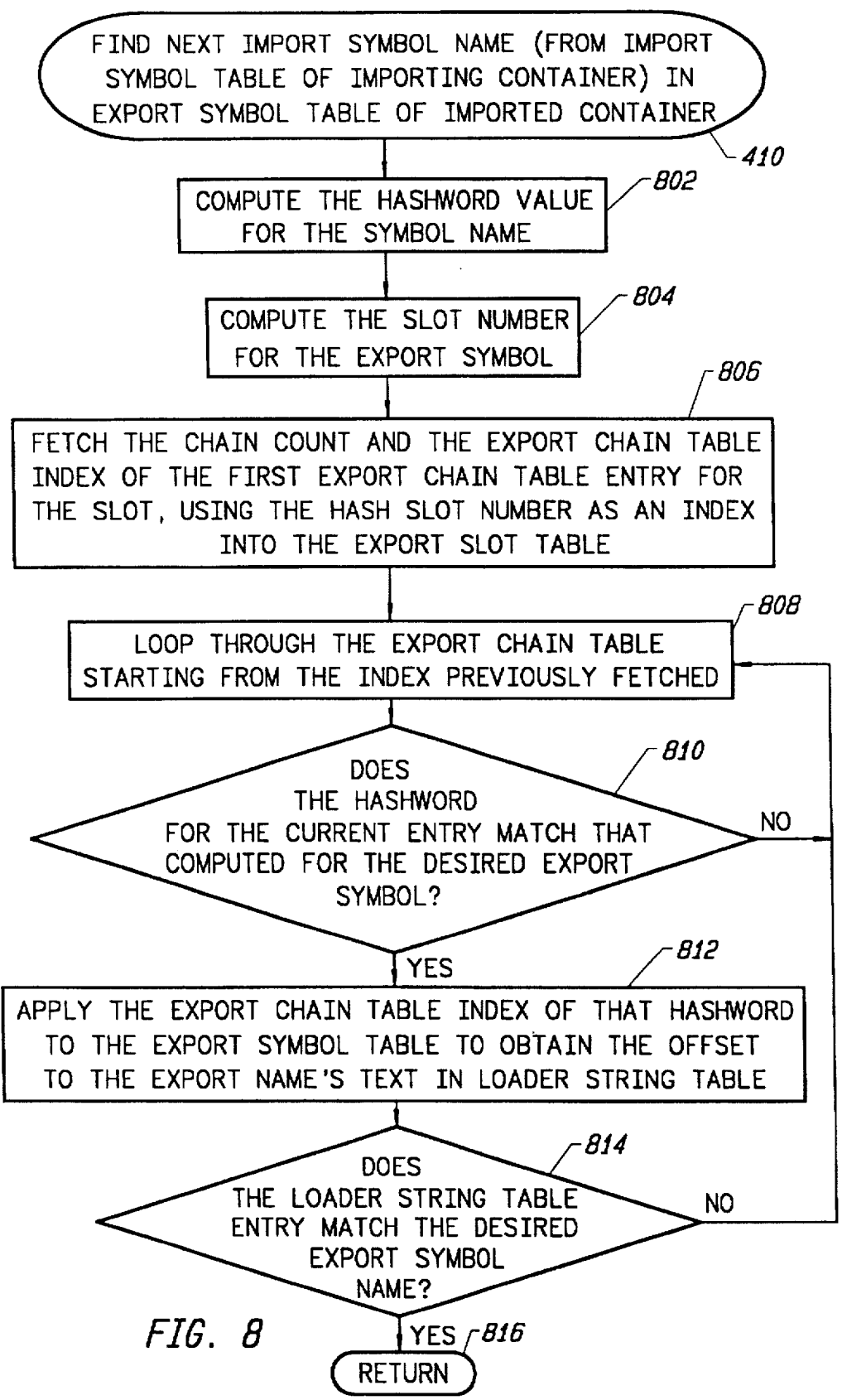
FIG. 8 is a flowchart detailing the FIND NEXT IMPORT SYMBOL NAME step in FIG. 4.

Referring to FIG. 8, the step 410 begins by computing the hashword value for the desired import symbol name using the predefined Name-to-Hash-Word function (step 802). In a step 804, the routine uses the predefined Hash-Word-To-Hash-Slot-Number function, together with the size of the Export Slot Table, to compute the export slot number where the import symbol should be found. In step 806, the routine uses the hash slot number as an index into the Export Slot Table, from where it fetches the chain count and the Export Chain Table index of the first Export Chain Table entry for the slot. In a step 808, the routine loops through the Export Chain Table, starting from the index previously fetched, for up to the number of entries designated by the chain count. For each entry in the Export Chain Table, the routine determines whether the hashword for that entry matches that computed for the desired import symbol (step 810). If not, then the loop continues (808) If so, then the Export Chain Table index of that hashword is applied Export Symbol Table to obtain the offset to the export name's text in the Loader String Table (step 812), and it is determined whether the corresponding Loader String Table entry matches the desired import symbol name (step 814). If not, then the loop continues (step 808), and if so, then the import has been found in the export symbol table and the routine returns to the caller (step 816).

Thus the completion of step 410 results in an index to the referenced entry in the Export Symbol Table of the most recently loaded container. In a step 412, the information in that Export Symbol Table entry is used to calculate the virtual address of the symbol to be imported, which is then stored in the imports[j] table for the importing container. In particular, the virtual address of the imported symbol is calculated as the virtual address of the section in the imported container which contains the imported symbol, plus the offset into that section where the symbol is located. The virtual address of the section in the imported container which contains the imported symbol is taken from the regions[i] table for the imported container, and both i and the offset are taken from the imported container's Export Symbol Table entry which has been identified for the symbol to be imported. The symbol number j is the symbol number as seen by the present, or importing container.

Note that if the section number in the Export Symbol Table entry for the desired symbol contains the special section number −2, then the virtual address is taken directly from the offset field of that entry. If the section number is −3 (indicating a re-export of a symbol imported into the library container from yet a third container), then the offset is used as an index into the library's import symbol table.

After the virtual address of the present symbol is calculated and stored in imports [j], j is incremented in a step 414 and control is returned to the decision step 408 to determine whether any further symbols need to be imported from the most recently loaded container.

Relocating References

Figure 5:
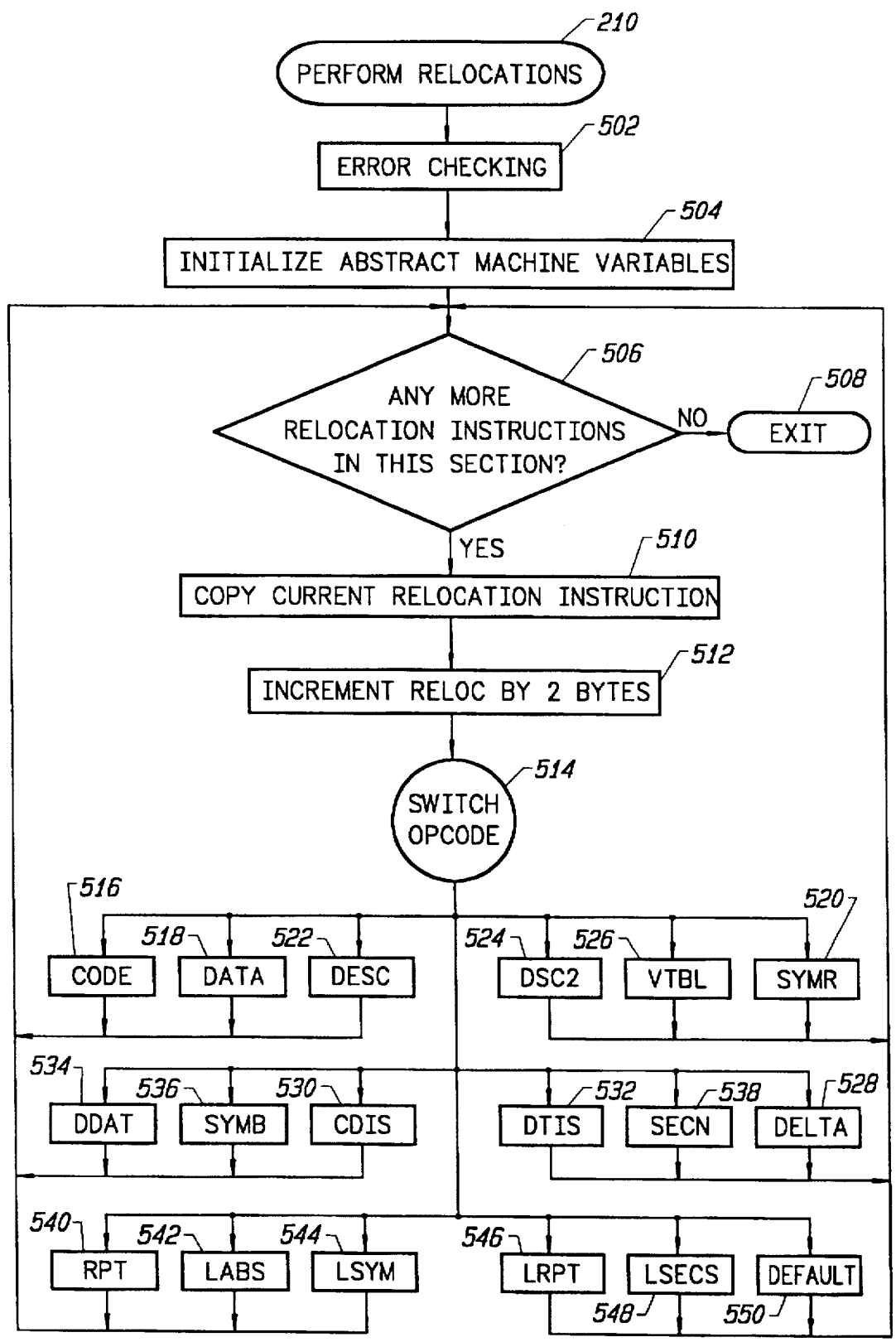
FIG. 5 is a flow chart detailing the PERFORM RELOCATIONS step of FIG. 2.

FIG. 5 is a flow chart detailing the PERFORM RELOCATIONS step 210 in FIG. 2. As mentioned, the PERFORM RELOCATIONS routine is invoked for each of the loadable sections i in the current PEF container, in the sequence specified in sequential relocation headers in the current PEF container. The current section number i is passed as a parameter to PERFORM RELOCATIONS routine. A C-language procedure which includes the PERFORM RELOCATIONS routine 210 is set out in Appendix A.

Referring to FIG. 5, the routine first checks for errors in a step 502, and aborts if an error is detected. Such errors can include the receipt of a section number which is less than zero or greater than the total number of sections in the current container. Another error might be that the section number provided by the calling routine is a constant section or the loader section, neither of which contain any relocatable items.

After the initial error checking step 502, several variables are initialized in a step 504 As will be seen, the individual elements of the Relocation Table are interpreted at a much higher level in the present embodiment than would relocation table entries in a conventional relocation table. This interpretation is performed in the present embodiment entirely in software, by routines which simulate decoding and execution of the relocation instructions in the Relocation Table. Thus the interpretation software forms a "pseudo machine" or "abstract machine" for interpreting and executing the relocation instructions.

Accordingly, the following abstract machine variables are initialized in the step 504:

reloc Pointer to the next relocation instruction in the Relocation Table of the loader section of the current PEF container. Initialized to point to the first relocation instruction for the current section number as passed to the PERFORM RELOCATIONS routine 210.

rlEnd Pointer to the first byte after the last relocation instruction for the current section number as passed to the PERFORM RELOCATIONS routine 210. Initialized to that value by adding, to reloc, the number of bytes of relocation instruction as specified in the relocation header for the current section.

rAddr Pointer to the next information item in the raw data for the current section. Initialized to the memory address of the beginning of the memory region for the current section number.

rSymI A symbol index (count value) which is used to access a corresponding import's address in the imports [i] table. Initialized to the value 0 for each new section.

codeA Pointer to the starting memory address of one of the loadable sections in the current PEF container. Initialized to point to the starting memory address of section number 0 if section number 0 is present and loadable, otherwise it is initialized to the value 0. As will be seen, certain relocation instructions can change the value of codeA, thereby affecting subsequent relocations by relocation instructions that refer to this variable.

dataA Pointer to the memory address of another one of the loadable sections in the current PEF container. Initialized to point to the starting memory address of section number 1 if section number 1 is present and loadable, otherwise initialized to the value 0. As with code A, certain relocation instructions can change the value of dataA, thereby affecting subsequent relocations by instructions that refer to this variable.

rpt A counter variable used in the repeat instructions described below. Initialized to the value 0.

The abstract machine variables codeA and dataA do not attempt to define which section is a code section and which section is a data section in the container, except to supply initial default values for these variables. The variables can point to any of the container's loadable sections, and can be changed as often as desired through the use of the relocation instructions.

Note that although codeA and dataA are described above as pointing to the memory address of a loaded section, they do so by storing a value equal to the memory address of the loaded section minus the default address for that section. The default address for a section is obtained from the desired Section Address field in that section's Section Header. The default address for the various sections are typically 0, however, so the value contained by the codeA and dataA variables will typically equal the starting address of the desired section in memory.

After the abstract machine variables are initialized, a decision is made as to whether there are any (further) relocation instructions corresponding to information items within the current section (step 506). This decision is made by testing whether reloc is less than rlEnd. If not, then the relocations are complete for the current section and PERFORM RELOCATIONS routine 210 is exited (step 508).

If more relocation instructions exist for the present section, then the next relocation instruction is retrieved and copied into a variable r (step 510). (Note that in another embodiment, the relocation instruction may be retrieved, for example as part of a step which tests its contents, without actually copying it into a variable for subsequent reference.) The variable reloc is then incremented by two bytes in a step 512. As will be seen, most of the relocation instructions are two bytes in length, although a few of them are four bytes in length. In step 510, only the first two bytes are copied into r. After step 510, reloc points to the next relocation instruction if the current one is only 2 bytes in length, or to the second half-word of the current relocation instruction if it is 4 bytes in length.

All of the instruction formats begin with an opcode in the high-order bits. Referring to FIG. 5, the opcode is used in a "switch" step 514 to pass control to one of a plurality of routines depending upon the contents of the opcode portion of the relocation instruction now in the variable r. In the present embodiment, all information items to be relocated are assumed to contain one or more relocatable references, each in the form of a 4-byte virtual address field, and relocation is accomplished by adding the contents of some specified pointer (a pointer to the start of a region in memory or a pointer taken from an import) to the relocatable reference.

After completion of the particular routine called for by the opcode in the retrieved relocation instruction, control returns to the decision step 506 in order to determine whether any further relocation instructions have been provided for the present section. If so, then the next relocation instruction is retrieved and the loop continues If not, then the PERFORM RELOCATIONS routine 210 is exited.

RELOCATION INSTRUCTIONS

Relocation instructions in the present embodiment are objects that are packed as opcode and arguments. Some of the relocation instructions act as directives for the abstract machine itself, while others instruct that a relocation needs to be performed, and others instruct that many relocations of a particular type are to be performed. The various field definitions for the different types of instructions are fully set forth in the following C language typedef.

```
typedef union {
    struct { unsigned op:7, rest:9;                          } opcode;
    struct { unsigned op:2, delta_d4:8, cnt:6;               } deltadata;
    struct { unsigned op:7, cnt_ml:9;                        } run;
    struct { unsigned op:7, idx:9;                           } glp;
    struct { unsigned op:4, delta_ml:12;                     } delta;
    struct { unsigned op:4, icnt_ml:4, rcnt_ml:8;            } rpt;
    struct { unsigned op:6, idx_top:10;                      } large1;
    struct { unsigned op:6, cnt_ml:4, idx_top:6;             } large2;
    RelocInstr instr;
    TUnsigned16 bot;
} Relocation;
```

Figure 6:
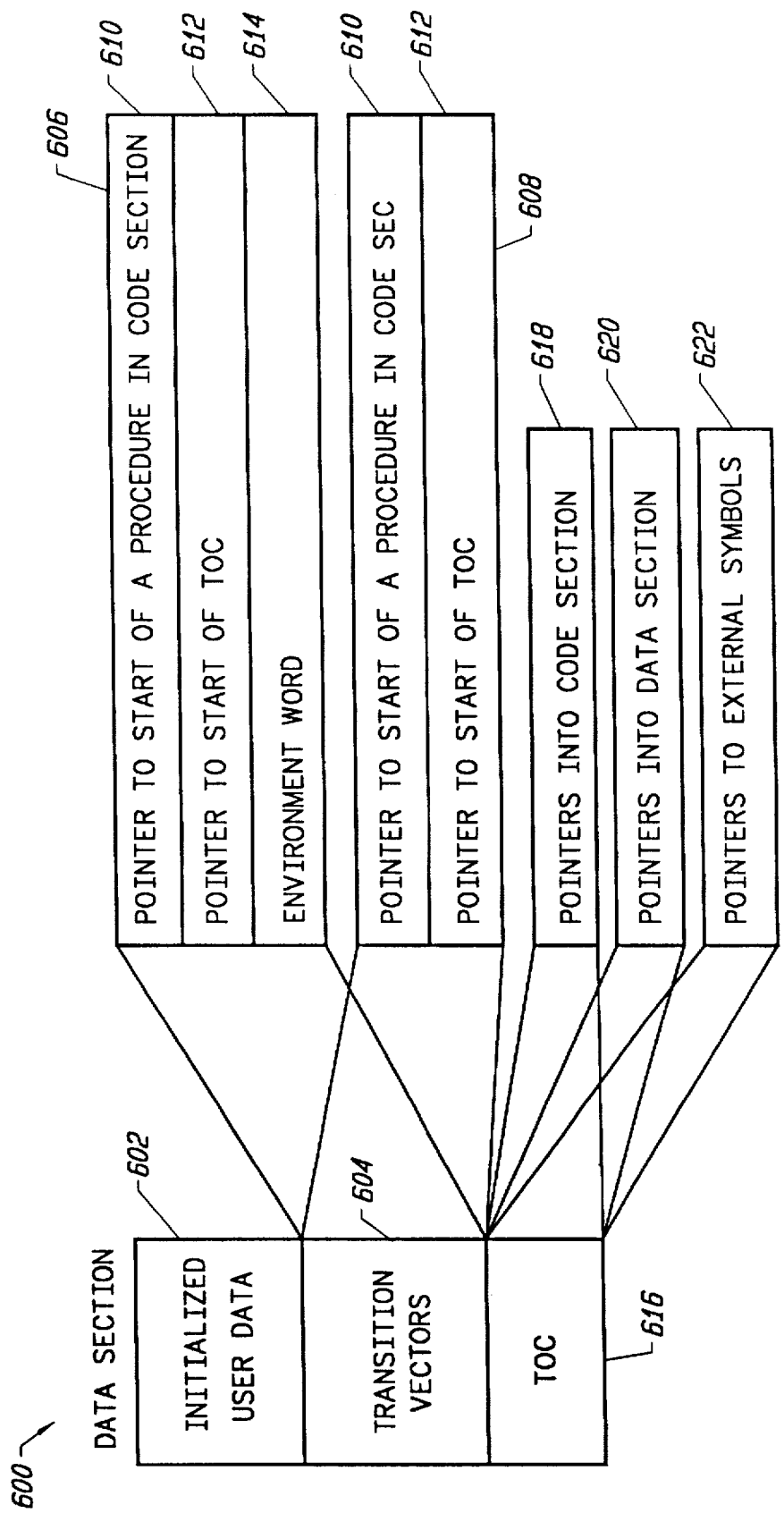
FIG. 6 illustrates the structure of a data section generated by a typical compiler.

Before proceeding, it will be useful to understand the structure of a data section 600 generated by a typical compiler. Such a structure is illustrated in FIG. 6. Grouped at the start of the data section 600 is initialized user data in a portion 602. Following the initialized user data portion 602, compilers typically place a group of contiguous transition vectors (also known as procedure descriptors) in a region 604. Transition vectors are used by external callers to procedures which are referenced by the transition vectors. Thus transition vectors are common especially in executable object code files produced on compilation of libraries. The compiler typically creates a transition vector for each procedure compiled, although by the time relocations are being performed by a loader program, the transition vectors for procedures which are never called by external callers typically have been eliminated.

Transition vectors are usually created in one of two formats, indicated in FIG. 6 as formats 606 and 608, respectively. A given compiler typically produces transition vectors in only one of the two formats 606 or 608. In format 606w each transition vector contains three 4-byte words. The first word is a pointer 610 to the start of a procedure in the code section, and the second word 612 is a pointer to a known location in the TOC for the data section 600. The third word 614 contains an "environment word" which is rarely used and is not important for an understanding of the present invention. As created by the compilers the pointer 610 contains an offset into the code section for the desired procedure and pointer 612 contains an offset into the data section 600 usually for the start of the TOC. Thus the first word of each transition vector 606 must be relocated by the loader program through the addition of the start address of the code section in the current container. This is referred to as a "code-type relocation". Similarly, the second word of each transition vector 606 must be relocated by the loader program through the addition of the start address of a data section, typically the same data section 600 which contains the transition vector 606. This is known as a "data-type relocation". The environment word 614 in each of the transition vectors 606 does not need to be relocated.

Transition vectors of the second type 608 are the same as those of the first type 606, except that the third word of each transition vector is omitted.

Following the transition vectors 604, compilers typically place a table of pointers, also known as a table of contents (TOC) in a portion 616 of the data section 600. The TOC contains various pointers 618 into the code section, pointers 620 into the data section 600, and pointers 622 to external symbols which are to be imported. These pointers are typically intermixed, although it is frequent that several of one type are grouped together. As produced by a compiler, pointers into the code section carry only the offset into the code section and pointers into the data section carry only the offset into the data section. These types of pointers 618 and 620 therefore require code and data-type relocations, respectively. Pointers 622 to external symbols typically contain 0 upon completion of compilation, although they are permitted to contain an offset to which the address of the desired symbol will be added. The latter address is taken from an appropriate entry in the imports [i] table created by the RESOLVE IMPORTS routine 208 (FIG. 4). This type of relocation is referred to herein as a "symbol-type relocation".

Considering first the code-type relocations, it can be seen that the relocation table entries to accomplish such relocations in conventional executable object code formats require 12 bytes of relocation information for each 4-byte information item to be relocated. This is due in part to the fact that conventional format requires all of the following information to appear in each 12-byte relocation table entry: the section number containing the information item to be relocated the offset within that section of the information item to be relocated, the section number whose starting address must be added to the information item, and an indication that the information item is a 32-bit word. In the present embodiment, on the other hand, most of this is information either is maintained in one of the abstract machine variables, or is inherent in the relocation instruction opcode. In particular, the offset in the current section of the information item to be relocated, is maintained in the abstract machine variable rAddr together with the section number containing the information item to be relocated. Similarly, the number of different relocatable address fields in the information item to be relocated, and the fact that each is to be treated as a 32-bit pointer are inherent in the relocation instruction opcode, since a separate routine can be provided to perform the relocations specified by each relocation instruction opcode. Additionally, the section number whose starting address in memory is to be added to the offset value in the relocatable address field is also specified inherently by many of the relocation instruction opcodes.

Moreover, whereas the conventional executable object code file format requires one relocation table entry for each address field to be relocated, the loader program of the present embodiment takes advantage of the fact that as mentioned above, several relocations of the same type are often grouped together (as in the TOC). That is, a compiler may generate five pointers 618 into the code section sequentially, followed by four pointers 620 into the data section, followed by seven pointers 622 to external symbols, followed by more pointers 620 into the data section, and so on. The loader program of the present embodiment takes advantage of this characteristic by providing a class of relocation instructions which specify a type of relocation (e.g. code, data, symbol) together with a count of the number of such relocations to perform sequentially (i.e. in a "run").

Many of the relocation instructions which accommodate a run of similar type relocations follow the "run" instruction format illustrated in FIG. 7A. In this format, the high-order three bits carry an opcode of 010, the next four bits carry a subopcode indicating the type of relocation to perform, and the low-order nine bits carry a count CNT9 indicating the number of consecutive information items to be relocated in the manner specified by the subopcode.

One such relocation instruction type is CODE which, in a step 516 (FIG. 5) adds the value in abstract machine variable codeA to the information item specified by the machine variable rAddr for CNT9 consecutive information items. rAddr is incremented by four after each individual one of the relocations so as to point to the next information item in the run. Another such relocation instruction type is DATA which, in a step 518 adds the value in abstract machine variable dataA to the information item specified by the abstract machine variable rAddr for CNT9 consecutive four-byte information items.

Another relocation instruction type, SYMR, performs a run of symbol-type relocations. For each of the symbol-type relocations in the run, the information item specified by rAddr is relocated by adding the value from imports [rSymI], both rSymI and rAddr being incremented by 1 and 4, respectively, after each such relocation operation in the run. As mentioned, rsymI is initialized to zero at the start of processing a section. Unless specifically reset by an SYMB or LSYM instruction (described below), rSymI increases monotonically as the section is processed.

It can be seen that the availability of these three relocation-type instructions (CODE, DATA and SYNJR) themselves can drastically reduce the number of bytes of Relocation Table information which are required to perform the required relocations on information items contained within a TOC. The DESC and DSC2 relocation instruction types can provide an even more drastic reduction. As previously mentioned, in a typical executable object code file, all of the transition vectors are grouped together in a portion 604 (FIG. 6). For transition vectors of type 606, each transition vector requires a code-type relocation, followed by a data-type relocation, followed by no relocation. For transition vectors of type 608, each transition vector requires a code-type relocation followed by a data-type relocation. In either case, the conventional executable object code format required 24 bytes (two 12-byte relocation table entries) to specify a transition vector relocation. In the present embodiment, on the other hand, a run-type relocation instruction, referred to herein as DESC, is provided for relocating a run of transition vectors of type 606. The routine is implemented in DESC step 522 (FIG. 5) in which, for each three-word information item 606 in the run, the value in abstract machine variable codeA is added to the word pointed to by raddr and rAddr is post-incremented by four. The value in abstract machine variable dataA is then added to the word pointed to by rAddr, and rAddr is post-incremented again by four. rAddr is then incremented by four a third time to skip over the environment word 614. This procedure is repeated for each information item in the specified run.

The DSC2 relocation instruction type is similar to the DESC relocation instruction type, except that it is adapted for use on transition vectors of type 608. DSC2 instructions are processed in step 524 by a routine which is identical to the DESC routine 522 except for the omission of the third incrementing of rAddr.

Accordingly, it can be seen the relocation of an entire region 604 of transition vectors can be performed using a loader program of the present embodiment, in response to a single 2-byte relocation instruction. This represents a drastic savings over conventional loader programs.

Within the above framework, numerous types of relocation instruction can be developed to simplify relocations on other commonly occurring relocatable information item formats as they are recognized. For example, one relocatable information item format which is frequently produced in the initialized user data area 602 by C++ compilers is in the form of a one-word pointer to an object in the data section, followed by one word of nonrelocatable data. Thus in the present embodiment, a VTBL relocation instruction type is provided and processed in a step 526 which adds the value in the abstract machine variable dataA to the first word of each information item in a run, and leaves the second word of each information item in the run unchanged. Many other information item formats can be accommodated by other relocation instruction types.

Certain relocation instruction types modify the abstract machine variables without performing any actual relocation operation. For example, a DELTA-type relocation instruction merely adds a specified value to rAddr, thereby effectively skipping over a number of information items which are not to be relocated. The format of the DELTA instruction is illustrated in FIG. 7B, and in particular includes a 4-bit high-order opcode of 1000, followed by a 12-bit DELTA value B12. DELTA instructions are processed in a step 528 (FIG. 5), which merely adds B12+1 to the value in abstract machine variable rAddr.

The CDIS instruction also modifies the value of an abstract machine variable without performing any relocations. In particular, it loads the codeA variable with the starting memory address of a specified one of the loadable sections in the present PEF container. The CDIS instruction follows the format of FIG. 7C and contains a high-order 3-bit opcode of 011, followed by a 4-bit subopcode indicating the CDIS instruction, followed by a 9-bit IDX9 field for specifying the section number whose start address is to be loaded into codeA. The CDIS instruction is processed in step 530 (FIG. 5), which merely copies the pointer in regions [LIDX9] into the abstract machine variable codeA.

A similar instruction which follows the same opcode format as CDIS is the instruction DTIS, processed in a step 532 (FIG. 5). The step 532 merely copies the value in regions[IDX9] into the abstract machine variable dataA. The CDIS and DTIS instructions are most useful when multiple code and/or data sections are produced by the compilation system.

Certain of the relocation instruction types supported in the present embodiment both perform a relocation operation and also further modify one of the abstract machine variables. For example, the DDAT instruction first increments rAddr by a specified number of words (similar to DELTA) and then performs a specified number of contiguous data-type relocations (similar to DATA). The DDAT instruction follows the format illustrated in FIG. 7D, which calls for a 2-bit high-order opcode of 00, followed by an 8-bit W8 field indicating the number of words of information items to skip, followed by an N6 field indicating the number of data-type relocations to subsequently perform. DDAT instructions are processed in a step 534 (FIG. 5), in a routine which first increments rAddr by four times the value in W8, and then adds the value in dataA to each of the N6 following information items. rAddr is incremented after each such relocation operation such that when the instruction is completed, rAddr points to the next information item after the run.

SYMB is another instruction which modifies an abstract machine variable and then performs a relocation operation. The SYMB instruction follows the format of FIG. 7C, and causes the abstract machine to first load rSymI with a new symbol number specified by IDX9, and then (similarly to the SYMR instruction for a run count of 1) add the value in imports [rSymI] to the relocatable information item then pointed to by rAddr. Both rSymI and rAddr are then incremented. The SYMB instruction is processed in a step 536 (FIG. 5).

The SECN instruction, which also follows the format of FIG. 7C, performs a single relocation to a section whose number is specified in IDX9. In step 538 (FIG. 5), the routine for processing SECN instructions merely adds the value in regions[IDX9] to the information item pointed to by rAddr, and increments rAddr.

The RPT instruction permits further compaction of the relocation table by providing a means of repeating a series of relocation instructions on a specified number of consecutive groups of information items. The RPT instruction follows the format of FIG. 7E, which includes a high-order 4-bit opcode of 1001, followed by a 4-bit number I4, followed by an 8-bit CNT8 field. When invoked, the abstract machine repeats the most recent I4 relocation instructions, CNT8 times. The RPT instruction is processed in a step 540 (FIG. 5) which first decrements the abstract machine variable rpt and tests for its value. If rpt is now less than 0, this is the first time that the RPT instruction was encountered and rpt is initialized to CNT8+1. Then, regardless of the value of rpt, the abstract machine variable reloc is decremented by the number of half-words specified by I4 and the routine is exited. This has the effect of causing the abstract machine to back up by I4 half-words of relocation instructions, and to repeat them. Note that since rAddr is not decremented, the repeated relocation instructions will operate on the next group of unrelocated information items (rather than on a repeated group of information items). If the initial decrementing of rpt brought that abstract machine variable to 0, then the RPT instruction is determined to be complete and the routine 540 is exited.

The number specified in I4 is a number of half-words rather than a number of relocation instructions. Thus if the repetition will include one or more 4-byte relocation instructions, then the value in I4 must include an additional count for each of such 4-byte relocation instructions. Also, the value in I4 is one less than the number of half-words to repeat (that is, I4=0 specifies a one half-word repeat, I4=1 specifies a two half-word repeat, etc.)

The LABS instruction is a 4-byte relocation instruction which follows the format of FIG. 7F. Specifically, the high-order 4 bits contain an opcode of 1010; the next two bits contain a subopcode of 00; and the low-order 26 bits carry a value OFFSET26. The LABS instruction is processed in a step 542, which adds the value OFFSET26 to the start address of the section whose information items are currently being relocated, and loads the result into abstract machine variable rAddr. Thus LABS performs a "jump" to a specific information item within the current section. Since the LABS instruction is a 4-byte instruction, the routine 542 concludes by incrementing reloc by another two bytes.

The LSYM instruction also follows the format of FIG. 7F, with a subopcode of 01. It performs the functions of setting a new symbol number in rSymI, and subsequently performing a symbol-type relocation on the information item then pointed to by rAddr. Both rSymI and rAddr are then post-incremented. The new symbol number is specified in the LSYM instruction in the field OFFSET26. The LSYMI instruction is processed in step 544.

The LRPT instruction follows the format of FIG. 7G, in which the high-order four bits carry an opcode of 1011, the next two bits carry a subopcode of 00, the next four bits carry a CNT4 value and the last 22 bits carry a CNT22 value. LRPT is similar to RPT, but allows for larger repeat counts. Specifically, when the LRPT step 546 is invoked, the last CNT4 2-byte relocation instructions are repeated the number of times specified in CNT22. Again, since LRPT is 4-byte instruction, step 546 concludes, after the last repetition, by incrementing reloc by another two bytes.

The instruction format of FIG. 7G is also used for three other 4-byte relocation instructions where the subopcode is 01 and CNT4 specifies which of the three instructions are to be invoked. The three instructions, all processed by LSECs step 548 (FIG. 5), are LSECN (which is the same as SECN but with a very large section number), LCDIS (which is the same as CDIS, but with a very large section number), and LDTIS (which is the same as DTIS, but with a very large section number). Again, since these instructions are 4-byte instructions, LSECs step 548 concludes by incrementing reloc by another two bytes.

If the opcode of the current relocation instruction pointed to by reloc is not recognized, then default step 550 indicates an error and breaks.

CONSTRUCTING A PEF FILE

A PEF file in the format described above can be created directly from compilers. Alternatively, a conventional compiler can be used to create a conventional format executable file, and a conversion tool used to convert the conventional format executable file into a PEF format file. As an illustration of procedures which may be used to create a PEF format file, Appendix B is C-language program which does so beginning from an XCOFF-format file. The program will now be described roughly by reference to flowchart FIGS. 9–15, it being understood that a more precise understanding of the procedures can be found in Appendix B.

Figure 9:
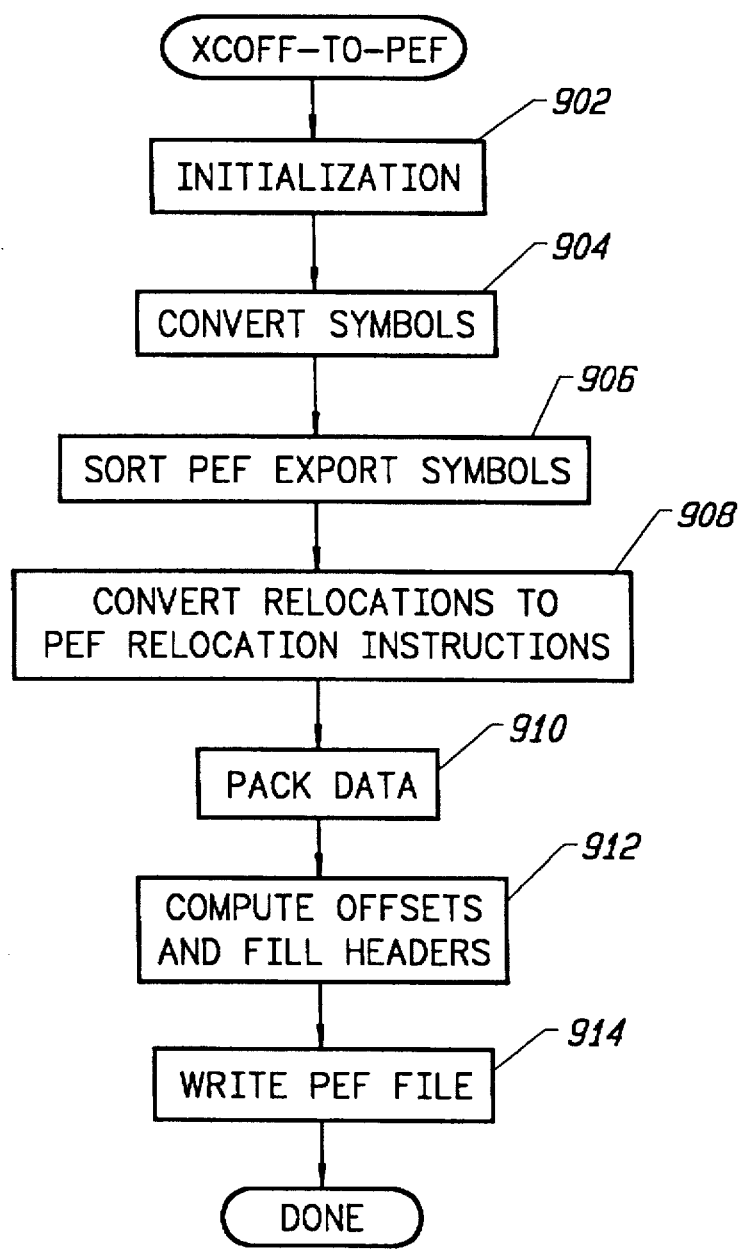
FIG. 9 is a simplified flowchart illustrating the broad functions of a program for constructing a file according to the present invention.

FIG. 9 illustrates the overall flow of the program. In an initialization step 902, the XCOFF file is opened and read into memory. The various XCOFF sections are located in memory and their addresses stored in variables.

Figure 10:
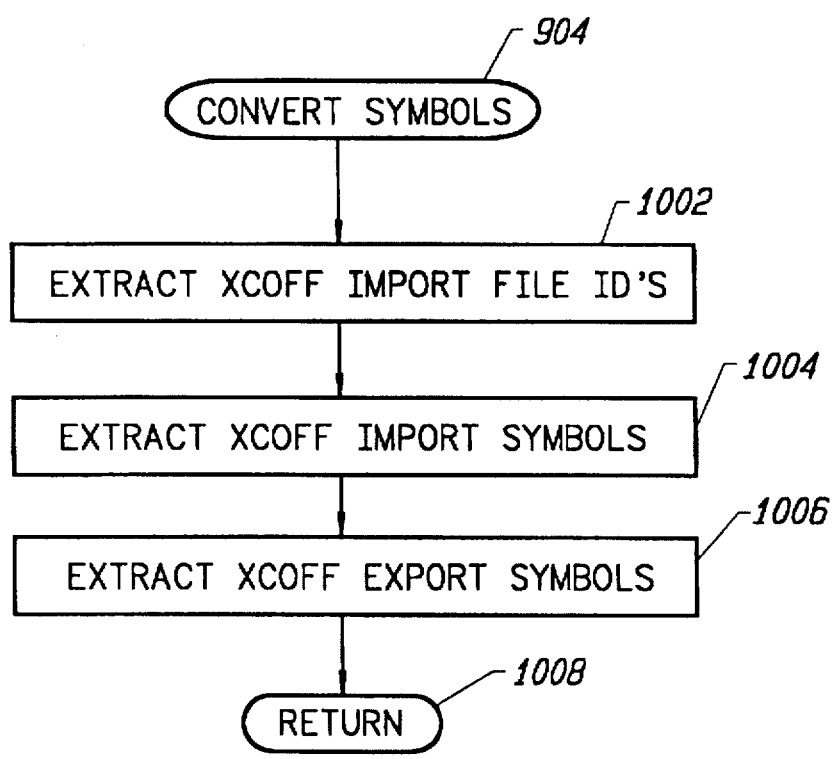
FIG. 10 is a flowchart detailing the CONVERT SYMBOLS step of FIG. 9.

In a step 904, the import symbols, export symbols and import file Ids are extracted from the XCOFF file (in-memory copy) and converted to the organization used in the PEF file format. FIG. 10 is a flowchart illustrating the symbol conversion step 904 in more detail.

Referring to FIG. 10, all of the import file Ids are first extracted from the XCOFF file. Specifically, it will be recalled that the import file Ids are all set forth in the XCOFF file as variable length strings in the Import File Ids portion of the Loader Section of the XCOFF file. The ordinal of these strings represents an import file number, referred to in the XCOFF External Symbol Import/Export Table. The step 1002 thus involves copying each of the import file Id strings into the newly created PEF Loader String Table, and writing the offset of each string into a corresponding entry in the Import Container Ids portion of the PEF Loader Section.

In a step 1004, the XCOFF imports are extracted from the XCOFF External Symbol Import/Export Table and Loader String Table. This is accomplished by traversing the XCOFF External Symbol Import/Export Table looking for import symbols, writing the import symbol name into the PEF Loader String Table and an accompanying offset to the string into the PEF Import Symbol Table. This traversal is performed separately for each import file number, so that the resulting import symbols are grouped by import file number.

In a step 1006, export symbols are extracted from the XCOFF file. Specifically, the XCOFF External Symbol Import/Export Table and Loader String Table is traversed looking for export symbols, and for each such export symbol, the symbol name is written to the PEF Loader String Table and an accompanying offset is written to the PEF Export Symbol Table. The routine also at this time computes the hash value for the export symbol and writes it into the corresponding entry of the Export Chain Table. This traversal is performed separately and sequentially for different PEF section numbers, thereby resulting in a list of export symbols grouped by PEF section number.

In a step 1008, the convert symbols routine 904 returns to the caller.

Figure 11:
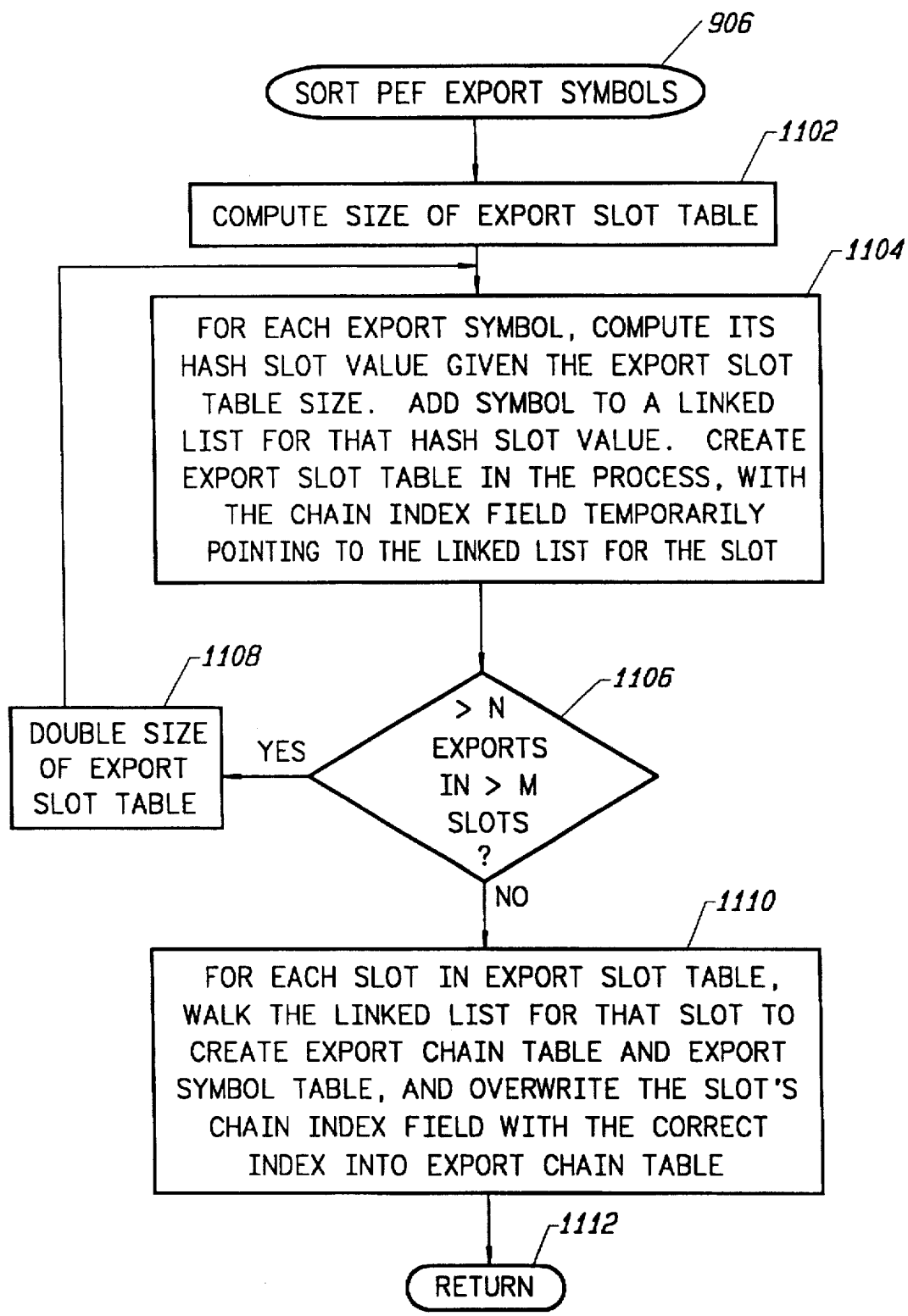
FIG. 11 is a flowchart detailing the SORT PEF EXPORT SYMBOLS step of FIG. 9.

Returning to FIG. 9, in a step 906, the program sorts the PEF export symbols as set forth in more detail in FIG. 11. As indicated in FIG. 11, in a step 1102, the routine first computes the size of the Export Slot Table given the number of exports contained in the XCOFF External Symbol Import/Export Table. In a step 1104, the procedure loops through all of the export symbols. For each export symbol, the procedure computes its hash slot value given the Export Slot Table size. The symbol is added to a linked list for that hash slot value. The Export Slot Table is created in the process, with the chain index field of each entry temporarily pointing to the linked list for the slot.

In a step 1106, a determination is made whether more than a predefined number m of the slots contain more than a predefined number n export symbols. If so, then the Export Slot Table is too small. The size is doubled in a step 1108, and step 1104 is repeated. If the Export Slot Table is not too small, then the Export Chain Table and Export Symbol Table are created from the linked lists. Specifically, for each slot in the Export Slot Table, the linked list for that slot is walked to create these two tables. The chain index field for the slot in the Export Slot Table is overwritten with the correct index into the Export Chain Table. The procedure then returns to the caller (step 1112).

Figure 12:
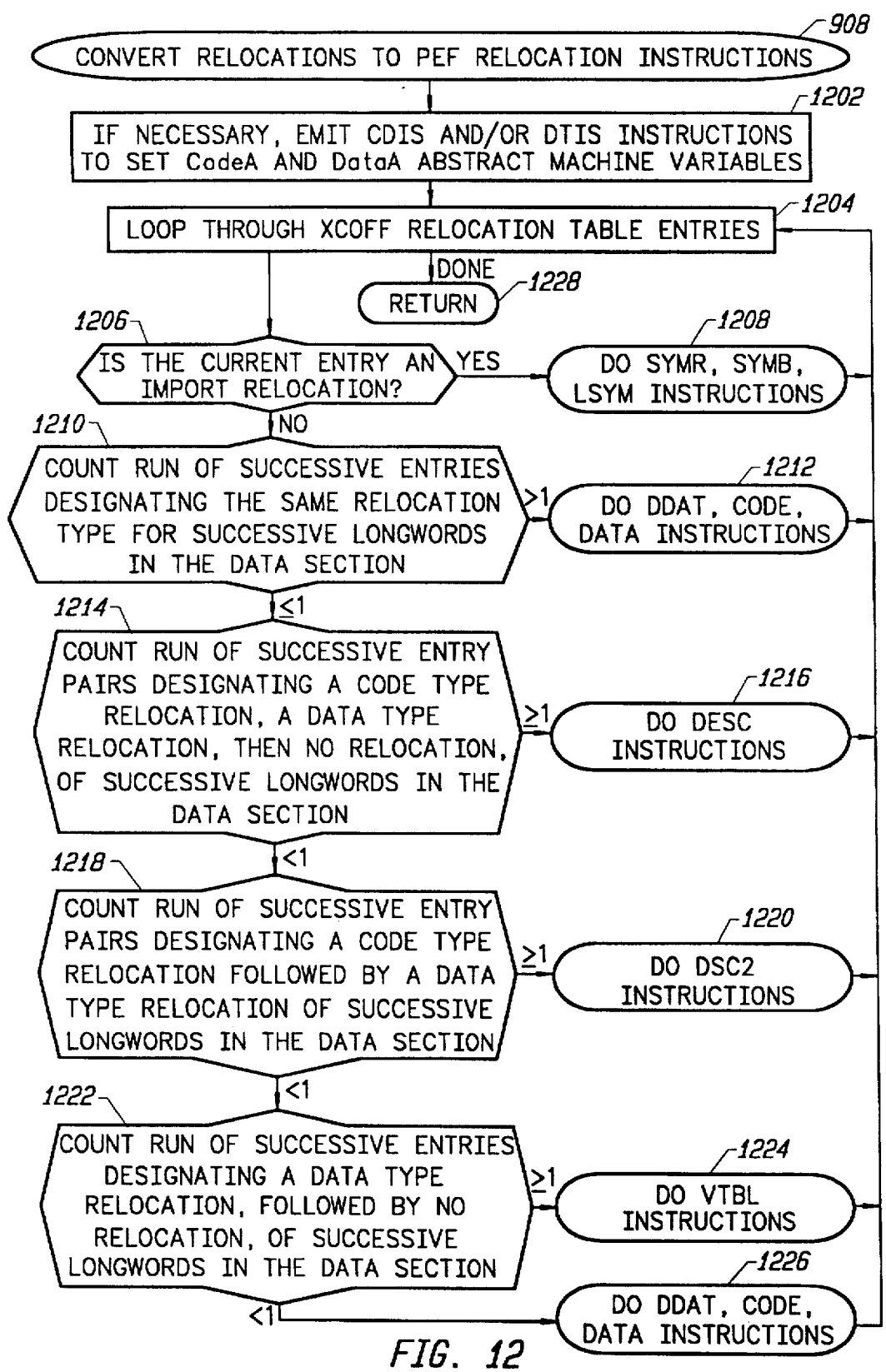
FIG. 12 is a flowchart detailing the CONVERT RELOCATIONS TO PEF RELOCATION INSTRUCTIONS step of FIG. 9.

After the PEF export symbols are sorted (FIG. 9), the relocations in the XCOFF file are converted to PEF format (step 908) FIG. 12 illustrates a procedure which accomplishes this task.

Referring to FIG. 12, in a step 1202, a determination is made as to whether the code and data sections of the PEF file have their default numbering. If not, then a CDIS and/or DTIS instruction is "emitted" in order to set the CodeA and/or the DataA abstract machine variables. The "emitting" step is described below.

In a step 1204, the routine begins looping through all of the XCOFF Relocation Table entries. In step 1206, it is determined whether the current entry in the Relocation Table is an import symbol relocation. If so, then appropriate SYMR, SYMB or LSYM instruction(s) are emitted (step 1208) and control returns to the looping step 1204. In step 1210, the routine counts the number of successive entries in the Relocation Table which designate the same relocation type (code or data) for successive longwords in the data section. If this count is greater than 1, then DDAT, CODE or DATA instructions are emitted as necessary (step 1212) and control returns to the looping step 1204.

If the run count from step 1210 is $\leq 1$, then in step 1214, a new run count is made of successive pairs of entries in the Relocation Table which designate, for three successive longwords in the data section, a Code type relocation, a Data type relocation, then no relocation. If this run count is $\geq 1$, then DESC instruction(s) are emitted (step 1216) and control returns to the looping step 1204.

If the run count from step 1214 is less than 1, then a new run count is made of successive pairs of entries in the Relocation Table which, for two successive longwords in the data section, designate a Code type relocation followed by a Data type relocation (step 1218). If this run count is $\geq 1$, then DSC2 PEF instruction(s) are emitted (step 1220) and control returns to the looping step 1204.

If the run count of step 1218 is less than 1, then in a step 1222, another run count is made of successive Relocation Table Entries designating, for two successive longwords in the data section, a Data type relocation followed by no relocation. If this run count is $\geq 1$, then VTBL instruction(s) are emitted as appropriate (step 1224) and control returns to the looping step 1204.

If none of the above-described tests are successful, then the Relocation Table entry specifies a lone Data or Code type relocation. In a step 1226, the routine therefore emits a DDAT, CODE or DATA instruction as appropriate, and returns control to the looping step 1204.

When all of the Relocation Table entries have been traversed and converted to PEF relocation instructions, the routine 908 returns to the caller (step 1228).

Figure 13:
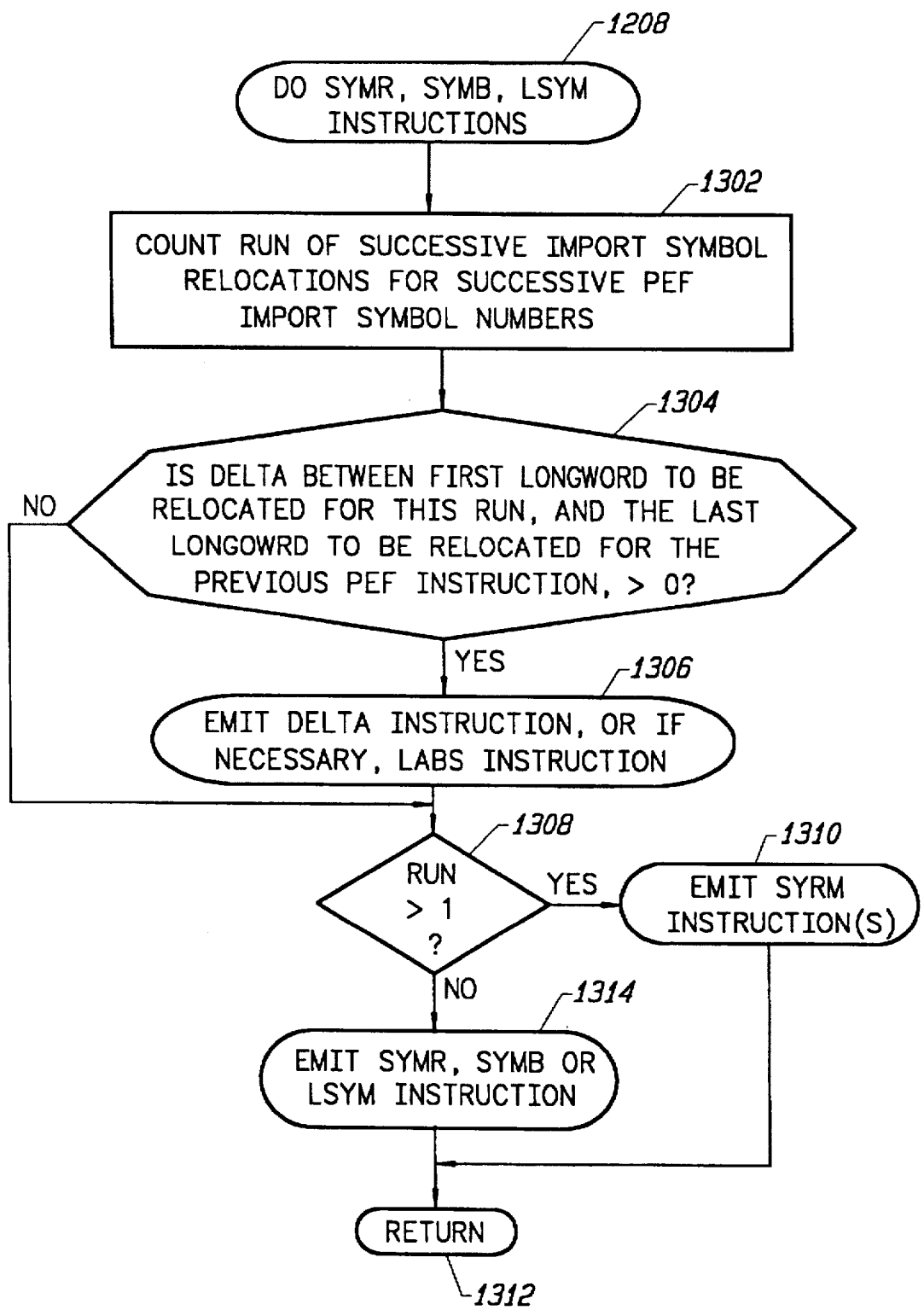
FIG. 13 is a flowchart detailing the DO SYMR, SYMB, LSYM INSTRUCTIONS step of FIG. 12.

FIG. 13 illustrates the routine 1208 to do the SYMR, SYMB and LSYM instructions. In a step 1302, a run count is made of successive import symbol relocations in the Relocation Table for successive PEF import symbol numbers. Note that in order to use the PEF SYMR/SYMB/LSYM relocation instructions, these import symbol relocations must be to successive import symbols as they are numbered after the conversion to the PEF format (step 904), not before.

In a step 1304, the delta between the first longword to be relocated for this run, and the last longword to be relocated for the previous PEF instruction, is determined. If this delta is greater than 0, then a DELTA instruction, or if necessary an LABS instruction, is emitted (step 1306). Then, if the run count is greater than 1 (step 1308), one or more SYMR instructions are emitted (step 1310) and the routine returns to the caller (step 1312). More than one SYMR Instruction can be emitted if the run count is larger than the largest run count which can be represented in the run count field of the SYMR instruction.

If the run count was equal to 1 (step 1308), then in order of preference, either an SYMR, SYMB or LSYM instruction is emitted (step 1314) and the routine returns to the caller (step 1312).

Figure 14:
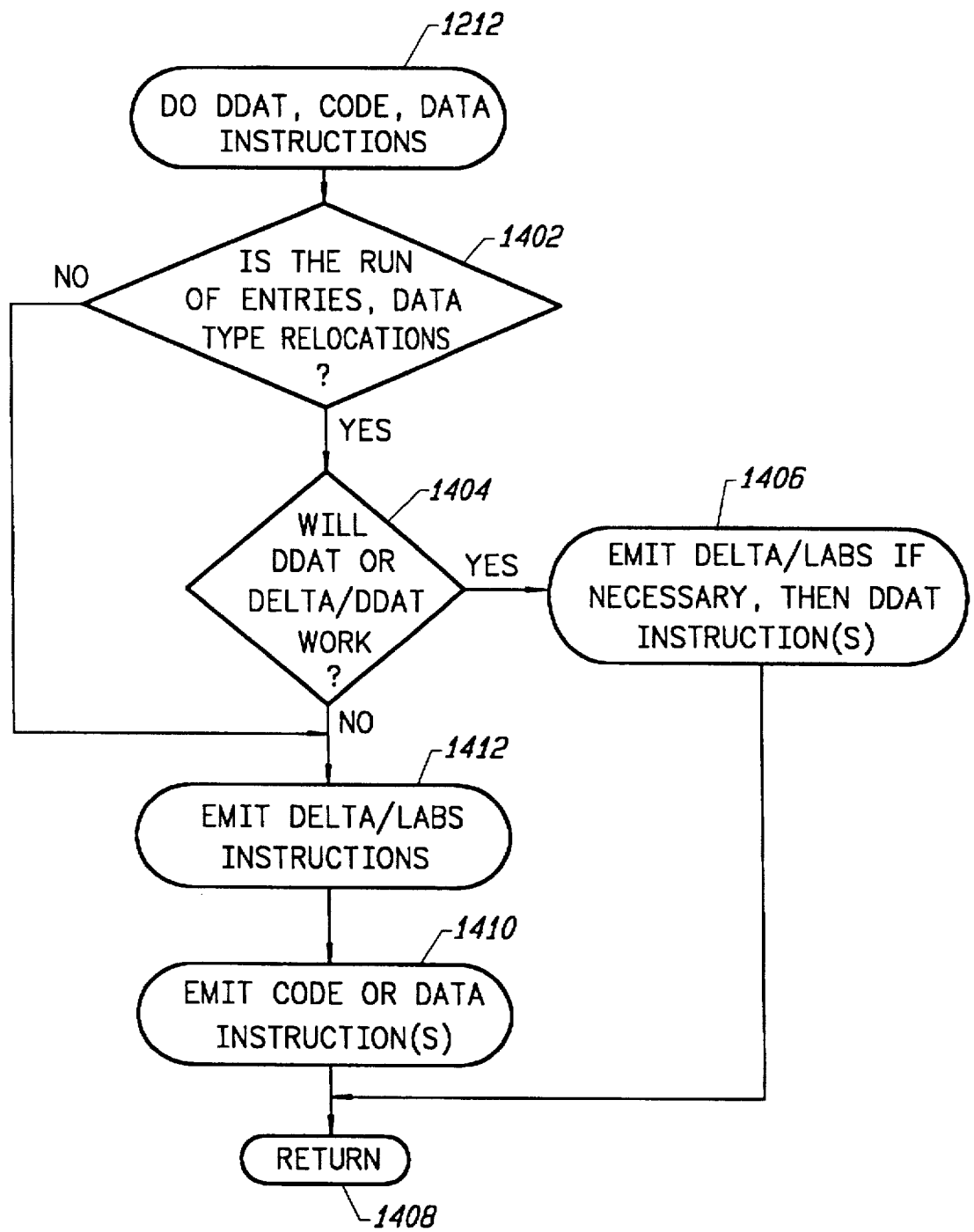
FIG. 14 is a flowchart detailing the DO DDATA, CODE, DATA INSTRUCTIONS step of FIG. 12.

FIG. 14 sets forth a procedure to do the DDAT, CODE and DATA instructions 1212 (FIG. 12). The procedure is reused in step 1226 (FIG. 12). Referring to FIG. 14, a determination is first made (step 1402) as to whether the run of entries is a run of Data type relocations. If so, then it is determined whether a DDAT instruction, possibly preceded by DELTA instruction, can successfully represent the run (step 1404). The maximum run count which can be represented in a DDAT instruction is considered here, as are data alignment requirements. If such instruction(s) will work, then they are emitted (step 1406) and the procedure returns (step 1408).

If the DELTA/DDAT instructions will not accurately represent the run (step 1404), or if the run is a run of Code type relocation (step 1402), then in a step 1410, CODE or DATA instruction(s) are emitted as required. The step 1410 may be preceded by the emission of a DELTA or LABS instruction as required (step 1412). The routine then returns to the caller (step 1408).

Figure 15:
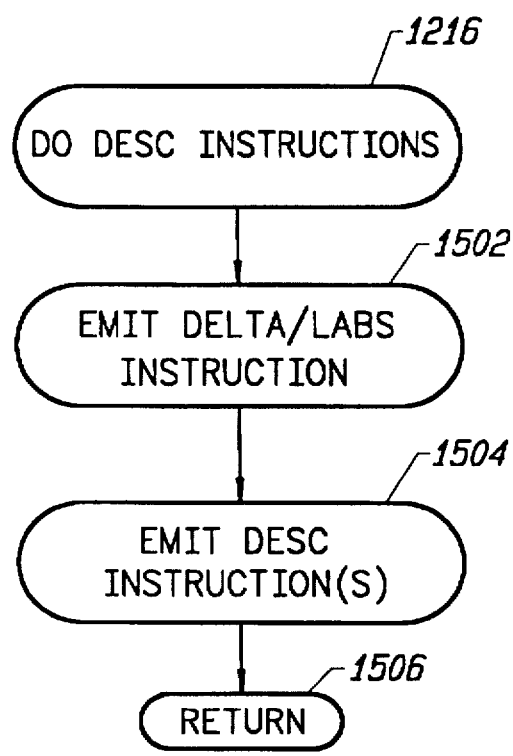
FIG. 15 is a flowchart detailing the DO DESC INSTRUCTIONS step of FIG. 12.

The step 1216 (FIG. 12) of doing DESC instructions is accomplished with a procedure set forth in FIG. 15. Referring to FIG. 15, if a DELTA or LABS instruction is required prior to the DESC instruction, then it is emitted in a step 1502. The DESC instruction(s) are then emitted in step 1504, and the routine returns to the caller in step 1506. The routines in FIG. 12 to do DSC2 instructions (step 1220) and VTBL instructions (step 1224) are identical to that set forth in FIG. 15, except that in step 1504 (FIG. 15), DSC2 instructions or VTBL instructions are emitted instead of DESC instructions.

In the above description of the routine to convert the relocations from XCOFF entries to PEF relocation instructions (FIG. 12), whenever it has been stated that a PEF relocation instruction is "emitted", the emitted relocation instructions could be placed in a temporary buffer. At a subsequent time, the temporary buffer could be scanned for repeating patterns and RPT or LRPT instructions generated therefor.

Another technique for generating the RPT and LRPT instructions is to identify patterns as they are being created. In this techniques, PEF instructions which are "emitted" by the relocation conversion routine 908 are held in a first-in, first-out (FIFO) buffer until the buffer is full or a pattern is detected. If the buffer is full, then the first PEF instruction in the buffer is outputted, and the newly emitted instruction is added to the end; the routine then returns. If a newly emitted instruction starts or continues a partial match of instructions in the buffer, then a match size variable merely increments. If the newly emitted instruction completes a match, then the match size variable returns to zero and a repeat count variable increments. If the newly emitted instruction breaks a match, then the common instructions of the pattern are first outputted and deleted from the buffer, and then an appropriate RPT or LRPT instruction is outputted. The newly emitted instruction is then added to the buffer. Note that instructions outputted by this pattern matching process are still not output to the final PEF file; they are merely stored sequentially in a final in-memory version of a PEF Relocations buffer.

Returning to FIG. 9, after all of the entries in the XCOFF Relocation Table have been converted to PEF relocation instructions (step 908), the data sections themselves are packed using the pattern-initialized data (pidata) format described above (step 910). In step 912, now that all of the PEF section sizes have been established, offsets are computed and all of the headers are filled with the necessary information pointing to the different sections (step 912). In step 914, each block of the PEF file is written out, with padding bytes inserted as necessary to meet data alignment requirements.

The invention has been described with respect to particular embodiments thereof, and it will be understood that numerous modifications are possible without departing from its scope. For example, the invention may be applied to relocatable object code file formats produced by a compiler prior to linking, although the invention is less useful in that context due to the relative scarcity of repeated patterns of relocations to be performed.

- 74 -

APPENDIX A (37 C.F.R. §1.96(a)(2)(i)

Copyright 1993 Apple Computer, Inc.

```
       OSErr PLPrepareRegion ( TPLPrivateInfoPtr ourPLInfo,
                                TCount regIndex,
                                TAddress regAddress )
       {
          register TAddress *raddr;
          register TOffset dataA;
          register int cnt;
          register TOffset codeA;
          LoaderRelExpHeaderPtr ldRelHdrPtr;
          Relocation *reloc, *rlend;
          Relocation r;
          long rpt;
          long secn;
          long rsymi;
          TOffset *imports;
          TOffset *regions;
          long i;
          long relNum;
          TOffset regStart;
          int err = noErr;
       #if NO_GLOBALS
       #include "PEFtbl.h"
       #endif if (ourPLInfo == NULL) return paramErr;
          if ((regIndex < 0) || (regIndex >= ourPLInfo->numRegions)) return paramErr;
          if (ourPLInfo->sections[regIndex].regionKind == kLoaderSection) return paramErr;
          if (ourPLInfo->sections[regIndex].regionKind == kPIDataSection) return unimpErr;

ourPLInfo -> resolved = 1;
          for (i = 0; ; i++) {
             if (i >= ourPLInfo -> numRegions) return noErr; /*no relocations for this data section*/
             ldRelHdrPtr = & ourPLInfo -> ldSections [i];
             if (ldRelHdrPtr -> sectionNumber == regIndex) break;
          } regions = ourPLInfo -> regionDeltas;
          imports = (TOffset *) ourPLInfo -> imports;

          regStart = (TOffset) regAddress;

// subtract old default address from region address
          // region array will hold deltas from new address to old address
          // for (i = 0; i < ourPLInfo -> numRegions; i++)
```

- 75 -

```
//   regions [i] -= ourPLInfo -> sections [i]. sectionAddress;
//   the regions array already holds deltas - no need to change it
     reloc = (Relocation*) (ourPLInfo -> ldRelocations + ldRelHdrPtr -> relocationsOffset);
     rlend = (Relocation *) ((RelocInstr *) reloc + ldRelHdrPtr -> numRelocations);
     raddr = (TAddress *) regStart;
     rsymi = 0;
     codeA = regions [0];
     dataA = regions [1];
     rpt   = 0;

relNum = 0;
     while (reloc < rlend) {
         r = *reloc;
         reloc = (Relocation *) ((RelocInstr *) reloc + 1);
         switch ( opcode [r.opcode.op] ) {
         case krDDAT :   raddr = (TAddress *)
                              ((TAddress) raddr + r.deltadata.delta_d4 * 4);
                         cnt = r.deltadata.cnt;
                         while (--cnt >= 0) {
// printf ("(0004:%06lx) (#%4d) 1\n", (char *) raddr - regStart, relNum++);
                              *raddr++ += dataA;
                         }
                         continue;

case krCODE :   cnt = r.run.cnt_m1 + 1;
                         while (--cnt >= 0) {
// printf ("(0004:%06lx) (#%4d) 0\n", (char *) raddr - regStart, relNum++);
                              *raddr++ += codeA;
                         }
                         continue;

case krDATA :   cnt = r.run.cnt_m1 + 1;
                         while (--cnt >= 0) {
// printf ("(0004:%06lx) (#%4d) 1\n", (char *) raddr - regStart, relNum++);
                              *raddr++ += dataA;
                         }
                         continue;

case krDESC :   cnt = r.run.cnt_m1 + 1;
                         while (--cnt >= 0) {
// printf ("(0004:%06lx) (#%4d) 0\n", (char *) raddr - regStart, relNum++);
                              *raddr++ += codeA;
// printf ("(0004:%06lx) (#%4d) 1\n", (char *) raddr - regStart, relNum++);
                              *raddr++ += dataA;
                              raddr++;
                         }
                         continue;

case krDSC2 :   cnt = r.run.cnt_m1 + 1;
                         while (--cnt >= 0) {
```

- 76 -

```
           // printf ("(0004:%06lx) (#%4d) 0\n", (char *) raddr - regStart, relNum++);
                            *raddr++ += codeA;
           // printf ("(0004:%06lx) (#%4d) 1\n", (char *) raddr - regStart, relNum++);
                            *raddr++ += dataA;
                        }
                        continue;

case krVTBL : cnt = r.run.cnt_ml + 1;
                        while (--cnt >= 0) {
10         // printf ("(0004:%06lx) (#%4d) 1\n", (char *) raddr - regStart, relNum++);
                            *raddr++ += dataA;
                            raddr++;
                        }
                        continue;
15
           case krSYMR : cnt = r.run.cnt_ml + 1;
                        while (--cnt >= 0) {
           // printf ("(0004:%06lx) (#%4d) %d\n", (char *) raddr - regStart, relNum++, rsymi);
                            *raddr++ += imports [rsymi++];
                        }
                        continue;

case krSYMB : rsymi = r.glp.idx;
           // printf ("(0004:%06lx) (#%4d) %d\n", (char *) raddr - regStart, relNum++, rsymi);
                        *raddr++ += imports [rsymi++];
                        continue;

case krCDIS : codeA = regions [r.glp.idx];
                        continue;
           case krDTIS : dataA = regions [r.glp.idx];
                        continue;

case krSECN : *raddr++ += regions [r.glp.idx];
                        continue;

case krDELT : raddr = (TAddress *)
                            ((TAddress) raddr + r.delta.delta_ml + 1);
                        continue;
           case krRPT :  if (--rpt == 0) continue;    // count was 1 --> rpt done
                         if (rpt < 0)          // first time rpt encountered?
                            rpt = r.rpt.rcnt_ml + 1; // yes- initialize rpt count
                         cnt = r.rpt.icnt_ml + 2;   // yes or no - back up cnt instrs
                         reloc = (Relocation *) ((RelocInstr *) reloc - cnt);
                         continue;

case krLABS : raddr = (TAddress *)
                            ((r.large1.idx_top << 16) + reloc -> bot + regStart);
                         reloc = (Relocation *) ((RelocInstr *) reloc + 1);
```

- 77 -

```
                                continue;

case krLSYM :   rsymi = (r.large1.idx_top << 16) + reloc -> bot;
                            reloc = (Relocation *) ((RelocInstr *) reloc + 1);
            // printf ("(0004:%06lx) (#%4d) %d\n", (char *) raddr - regStart, relNum++, rsymi);
                            *raddr++ += imports [rsymi++];
                            continue;

case krLRPT :   if (--rpt == 0) {
                                reloc = (Relocation *) ((RelocInstr *) reloc + 1);
                                continue;
                            }
                            if (rpt < 0)
                                rpt = (r.large2.idx_top << 16) + reloc -> bot;
                            cnt = r.large2.cnt_m1 + 2;
                            reloc = (Relocation *) ((RelocInstr *) reloc - cnt);
                            continue;

case krLSEC :   secn = (r.large2.idx_top << 16) + reloc -> bot;
                            switch (r.large2.cnt_m1) {
                                case 0 : *raddr++ += regions [secn]; break;
                                case 1 : codeA    =  regions [secn]; break;
                                case 2 : dataA    =  regions [secn]; break;
                            }
                            reloc = (Relocation *) ((RelocInstr *) reloc + 1);
                            continue;

default :       err = unimpErr;
                            break;
            }
        }

// restore actual region addresses to the regions array
        // instead of region deltas
        // for (i = 0; i < ourPLInfo -> numRegions; i++)
        //     regions [i] += ourPLInfo -> sections [i]. sectionAddress;
        // the region array now always holds deltas - don't want to change it back return err;
    } /* PLPrepareRegion () */
```

- 78 -

APPENDIX B (37 C.F.R. §1.96(a)(2)(i)
Copyright 1992-1993 Apple Computer, Inc.

```
               /*      File:          MakePEF.c
                       Contains:      XCOFF to PEF converter tool
                       Written by:    Erik L Eidt
                       Copyright:     - 1992-1993 by Apple Computer, Inc., all rights reserved.
               */

               #include <Errors.h>
               #include <Memory.h>
               #include <Files.h>
               #include <string.h>    /* jma */

               #if MAC
               #include <stdio.h>     /* jma */
               #endif /* #include <StdLib.h>    /* jma */
               #if MAC
               #include <CursorCtl.h>
               #endif
               // for some constants like kDefVersion:
               #include <CFLoader.h> include "XCOFF.h"
               #include "PEF.h"

typedef unsigned char byte;

#define TRUE 1
               #define FALSE 0 byte *Malloc ( long len );
               long Write ( int fd, byte *buf, long len );

               byte *PartialName ( byte *name );
               OSErr MakePStr ( byte *src, int len, byte *trg, int max );
               void movebytes ( byte *s, byte *t, long length );
               void clearbytes ( byte *t, long length );
               int comparebytes ( byte *s, byte *t, int length );
               int OpenRead ( byte *fName, byte **buf, long *len );
               long GetInt ( byte *ptr, byte **out, byte *end );
               int mchlen ( byte *str, byte *mch );
               int Log2 ( unsigned long aln );

               int CheckLibOpt ( byte **namep, int *nameLengthp, TVersion *linkedVer, TVersion *oldImpVer,
               TBoolean *iB );
               int CheckXCOFF ( byte *theContainer );
               int FindStuff ( byte *theContainer );
               int ComputeOffsets ( void );
               int FillHeaders ( byte *inFileName );
               long MapSecNumToPeff ( long secNm, long *defAddr );

long RelocAddr ( TLdRelPtr reloc );
               long RelocIndex ( TLdRelPtr reloc );
               void dodelta ( long relpos, long curpos );
               int RelCvt ( TLdRelPtr reloc, long count );
               int DataAdjust ( TLdRelPtr reloc, long count );
               long str2long ( byte **str );
```

- 79 -

```
        Boolean TryPackingData ( void );
        OSErr PackData ( register byte *ptr, register byte *end, byte *target, byte **tend );
        OSErr UnpackData ( register byte *ptr, register byte *end, register byte *trg, byte *tend
        );
        void PrtReloc ( RelocInstr w1 );
        void CheckMatch ( RelocInstr w1, int matchStart );
        void RestartMatch ( RelocInstr w1 );
        void AddReloc ( RelocInstr w1, int matchStart );
        long MacTime ( long unixTime );
        long GetFileTime ( byte *fileName );

/* the following were not declared, hence generated warnings... jma */
        int ProcessExportList ( void );
        void ComputeSections ( void );
        int SymCvt ( TLdSymPtr ldSyms, long symCnt );
        int SymSort ( void );
        int WriteFile ( byte *outFileName );
        void Free ( byte *tofree );
        long FindXCOFFIndexByName ( byte *name, TLdSymPtr ldSyms, long symCnt );
        /* ************************************************************ */

/* ************************************************************ */
        void convertString2Long (byte* theString, unsigned long* theLong);
        /* ************************************************************ */ define badUnitErr -48
        // The default version value is now private to this tool.
        // This is a legitimate version, not the wildcard value.
        #define kDefVersion 0

       long ALIGNMENT = 16;
        long oldDefVersion  = kDefVersion;
        long oldImpVersion  = kDefVersion;
        long currentVersion = kDefVersion;
        byte dataSection = kDataSection;
        byte shareOption = kContextShare;

#define CODEINDEX 0
        #define DATAINDEX 1
        #define BSSINDEX  2
        #define kSpecialSymbolCount 3 int  secNum [3];
        long locNum [3];
        // XCOFF stuff

TFileHdrPtr fileHdrPtr;
        TAuxHdrPtr  auxHdrPtr;
        TScnHdrPtr  scnHdrs;
        TScnHdrPtr  ldrScnHdr;
        TScnHdrPtr  codeScnHdr;
        TScnHdrPtr  dataScnHdr;
        TScnHdrPtr  bssScnHdr;
        TLdHdrPtr   ldHdrPtr;

TLdSymPtr   ldSyms;
        long        symCnt;

       TLdRelPtr   ldRelocs;
        long        relCnt;
```

- 80 -

```
        byte    *ldStrings;

long    codeVAddr;
        long    codeLen;
        byte    *codeStart;

long    dataVAddr;
        long    dataLen;
        byte    *dataStart;
        long    packedDataLen;
        byte    *packedDataStart;

byte    *bssStart;
        long    bssVAddr;
        long    bssLen;

long    dbsLen;

TLdSymPtr remSym [3];
        // PEFF stuff

RelocInstr *relocations;
        long relWordCnt = 0;
        byte *stringTable;
        long stringTabSize = 0;
        long stringTabOff;

        #define kNumSpclSections 3
        #define kMaxLoadableSections 2
        #define kMaxPeffSections 3
        int NumPeffSections;
        int NumLoadableSections;
        int nextSectNum;
        int codeSectNum = -1;
        int dataSectNum = -1;
        int loaderSectNum = -1;
        FileHeader fileHdr;
        SectionHeader sections [kMaxPeffSections];
        byte strings [20];

        LoaderHeader ldHdr;
        LoaderRelExpHeader loaderHdrsAry [kNumSpclSections + kMaxLoadableSections]; //
        -3,-2,-1,0,1,2
        LoaderRelExpHeaderPtr loaderHdr = & loaderHdrsAry [kNumSpclSections];
        LoaderImportFileIDPtr importFiles;
        LoaderImportPtr importSymbols;
        long importNext;
        HashSlotEntryPtr exportHashSlot;
        HashChainEntryPtr sortedHashChain, exportHashChain;
        LoaderExportPtr sortedExportSymbols, exportSymbols;
        long exportNext;
        long sortedExportNext;

long *XCOFFSymIndexToPeffImportNumber;

        long lastFileAddr;

Boolean gPackedData;

Boolean optNullPad;
        Boolean optBSSExpand;
        Boolean optKeepMIT;
        Boolean optGlobalStringTab;
```

- 81 -

```
    Boolean optNoPackData;

Boolean debug;

    byte *expFileName;
    byte *outFileName = (byte *) "a.pef";

#define kDefCreator '???\?'
    #define kDefType    'APPL'
    unsigned long gFileCreator = 0;
    unsigned long gFileType = 0;
    FInfo gFinderInfo;

Boolean entryUsed, initUsed, termUsed;
    byte *entryPoint;
    long  entryPointNameLength;
    byte *initPoint;
    long  initPointNameLength;
    byte *termPoint;
    long  termPointNameLength;

    byte *libInfo [100];
    int libOpts;

long peffCodeVAddr;
    long peffDataVAddr;
    typedef struct {
       long  format;
       byte *oldname;
       byte *name;
       long  secn;
       long  offset;
       int   class;
    } AddExpType;
    #define kAbsolute 0
    .#define kEquivalence 1

AddExpType *addExpAry;
    long addExpCnt;

    typedef struct WeakImport {
       struct WeakImport *next;
       byte *libName;
       byte *name;
    } WeakImport;
    WeakImport *WeakImportList;
    int AddWeakImport ( byte *libName, byte *name );
    int CheckWeak ( void );
    void CheckImportsForUndefOK ( int fileIndex );
    int fileCnt;

byte *gToolName;

    #ifdef JMA            /* for simple AIX testing O*N*L*Y */
    #include "hash.c"
    #include "myMacLib.c"
    #endif
    main (int argc, byte **argv)
    {
       long len;
```

- 82 -

```
        byte *buf;
        int err;
        long sectionIndex;
        byte *libName;
        byte *ptr;
        byte *inFileName;
        int i;

gToolName = PartialName ( argv [0] );
        for (i = 1; i < argc; i++) {
            if (argv [i] [0] != '-') { fileCnt++; inFileName = argv [i]; continue; }
            switch (argv [i] [1]) {
            case 'a' : if (i+1 >= argc) break;
                       ALIGNMENT = GetInt ( argv [++i], 0, 0 );
                       continue;
            case 'b' : optBSSExpand = TRUE;
                       continue;
            case 'c' : if (i+1 >= argc) break;
                       currentVersion = GetInt ( argv [++i], 0, 0 );
                       continue;
            case 'd' : if (i+1 >= argc) break;
                       oldDefVersion = GetInt ( argv [++i], 0, 0 );
                       continue;
            case 'e' : if (i+1 >= argc) break;
                       entryPoint = argv [++i];
                       entryPointNameLength = strlen ( (char*) entryPoint );
                       continue;
            case 'f' : if (i+1 >= argc) break;
                       if ((argv [i] [2]) == 'c')                  /* file creator */
                           convertString2Long ((byte*)argv [++i], & gFileCreator);  /* yuck! is there a
        better way to do this? */
                       else if ((argv [i] [2]) == 't')             /* file type */
                           convertString2Long ((byte*)argv [++i], & gFileType);   /* yuck! is there a
        better way to do this? */
                       else
                           expFileName = argv [++i];
                       continue;
            case 'g' : optGlobalStringTab = TRUE;
                       continue;
            case 'i' : if (i+1 >= argc) break;
                       initPoint = argv [++i];
                       initPointNameLength = strlen ( (char*) initPoint );
                       continue;
            case 'I' : printf ("# %s: Bad switch -I (upper-case-i).\n#         Did you mean
        lower-case-L instead?\n", gToolName);
                       return 1;
            case 'k' : optKeepMIT = TRUE;
                       continue;
            case 'L' :
            case 'l' : if (i+1 >= argc) break;
                       libInfo [libOpts++] = argv [++i];
                       // format: -l libName[=rename][#v1[-v2]][!]
                       continue;
            case 'n' : optNullPad = TRUE;
                       continue;
            case 'o' : if (i+1 >= argc) break;
                       outFileName = argv [++i];
                       continue;
            case 'r' : dataSection = kConstantSection;
                       continue;
            case 's' : if (i+1 >= argc) break;
                       shareOption = GetInt ( argv [++i], 0, 0 );
                       continue;
            case 't' : if (i+1 >= argc) break;
                       termPoint = argv [++i];
                       termPointNameLength = strlen ( (char*) termPoint );
```

- 83 -

```
                    continue;
        case 'u' : if (i+1 >= argc) break;
                    oldImpVersion = GetInt ( argv [++i], 0, 0 );
                    continue;
        case 'v' : if (i+1 >= argc) break;
                    sectionIndex = GetInt ( argv [++i], & ptr, 0 );
                    if ( *ptr++ != '=' ) break;
                    switch (sectionIndex) {
                    case 0 : peffCodeVAddr = GetInt ( ptr, 0, 0 ); continue;
                    case 1 : peffDataVAddr = GetInt ( ptr, 0, 0 ); continue;
                    }
                    break;
        case 'w' : if (i+1 >= argc) break;
                    libName = argv [++i];
            ptr = libName;
            while ( *ptr && *ptr != ':' ) ptr++;
            if (*ptr != ':') break;
            *ptr++ = 0;
                    AddWeakImport ( libName, ptr );
                    continue;
        case 'x' : optNoPackData = TRUE;
                    continue;
        } help: printf ("# %s: usage: %s [ options ] [ -o outfile ] infile\n", gToolName, gToolName);
        printf ("#  (numbers arguments are read in decimal unless preceed by 0x ie:0x100 =
hex 100)\n");
        printf ("# options:\n");
        printf ("#   -a  #      align code & data secitons to # byte boundary (def=8)\n");
        printf ("#   -b         expand bss into zeroed data (def=no)\n");
        printf ("#   -c  #      set current-version to # (def=0)\n");
        printf ("#   -d  #      set definition version to # (def=0)\n");
        printf ("#   -e  name   set entry point to routine name (def=what-XCOFF-says)\n");
        printf ("#   -f  fname  use file fname to load additional export list\n");
        printf ("#   -fc name   set the creator of the output file\n");
        printf ("#   -ft type   set the file type of the output file\n");
        printf ("#   -i  name   set initialization routine to procedure name (def=none)\n");
        printf ("#   -k         keep init,term & main routines as export symbols
(def=remove)\n");
        printf ("#   -l  oldname[=newname][#vers[-upfv]][!][-]\n");
        printf ("#              change imported library with name oldname:\n");
        printf ("#                  =newname  to newname\n");
        printf ("#                  #vers     to current-version vers (# required)\n");
        printf ("#                  -upfv     to up-from-version upfv\n");
        printf ("#                  !         to init before\n");
        printf ("#                  -         to weak import\n");
        printf ("#   -n         pad exported loader symbols with trailing null
(def=nonull)\n");
        printf ("#   -o  fname  set the target output file name (def=a.pef)\n");
        printf ("#   -r         mark data section as read-only (def=read-write)\n");
        printf ("#   -s  #      set share option of data section to #
(def=contextShare)\n");
        printf ("#   -t  name   set termination routine to procedure name (def=none)\n");
        printf ("#   -u  #      set implementation version to # (def=0)\n");
        printf ("#   -v  #1=#2  make section #1 have default virtual address #2 (def=0)\n");
        printf ("#   -w  libName:ImpName make import impName from library libName weak (ok
to be undef at runtime)\n");
        printf ("#   -x         disable automatic data section packing\n");
        printf ("# %s version 2.13 (b6)\n", gToolName);
        return 1;
    } if (expFileName && fileCnt == 0) { }
    else if (fileCnt != 1) goto help;

#if MAC
    SpinCursor ( 32 );
```

- 84 -

```
    #endif if (expFileName) {
            err = ProcessExportList ();
            if (err) return 1;
        } if MAC
        SpinCursor ( 32 );
    #endif if (fileCnt) {
            err = OpenRead ( inFileName, & buf, & len );
            if (err) return 1;
            err = CheckXCOFF ( buf );
            if (err) { printf ( "# %s: '%s' not XCOFF executable file format\n", gToolName, argv
    [1] ); goto EBOT; }

            err = FindStuff ( buf );
            if (err) goto EBOT;
        } if MAC
        SpinCursor ( 32 );
    #endif

ComputeSections ();

    #if MAC
        SpinCursor ( 32 );
    #endif err = SymCvt ( ldSyms, symCnt );
        if (err) goto EBOT;

#if MAC
        SpinCursor ( 32 );
    #endif
        err = SymSort ();
        if (err) goto EBOT;

#if MAC
        SpinCursor ( 32 );
    #endif if (fileCnt) {
            err = RelCvt ( ldRelocs, relCnt );
            if (err) goto EBOT;
        } if MAC
        SpinCursor ( 32 );
    #endif if ( dataSectNum >= 0 && ! optBSSExpand && ! optNoPackData )
            gPackedData = TryPackingData ();

    #if MAC
        SpinCursor ( 32 );
    #endif

ComputeOffsets ();
        FillHeaders ( inFileName );
```

- 85 -

```
    #if MAC
        SpinCursor ( 32 );
    #endif
        err = WriteFile ( outFileName );
        if (err) goto EBOT;

#if MAC
        SpinCursor ( 32 );
    #endif return 0;

EBOT :
        printf ("# %s: '%s' not converted\n", gToolName, inFileName);
        return 1;
    } /* main () */

    /* ***************************** JMA ***************************** */
    /*                                                                  */
    /* The Mac OS does not allow you to seek past EOF. I put in this routine to figure */
    /* out if we're trying to do so, and write an appropriate number of bytes of zero  */
    /* instead.                                                         */
    /*                                                                  */
    /* ***************************** JMA ***************************** */
    void my_SetFPos (short refNum, short mode, long offset)
    {
    #ifdef MAC
    #pragma unused(mode)
        byte  zero = 0;
        long  i;
        long  curLength;

        GetFPos (refNum, &curLength);   /* get current size of file */ if (curLength < offset)
        {
            for (i = curLength; i < offset; i++)
            {
                Write ( refNum, &zero, 1);
            }
            return;
        }
    #else
        SetFPos (refNum, mode, offset);
    #endif
    }

    Boolean TryPackingData ( void )
    {
        byte *block;
        long  length;
        byte *target, *end;
        OSErr err;

block  = dataStart;
        length = dataLen;
        target = (byte *) NewPtr ( length + 10 );
        if ( ! target ) {
            printf ("# %s: Could not allocate target buffer (%d bytes)\n", gToolName, length );
            return FALSE;
        } end = target + length;
```

- 86 -

```
        err = PackData ( block, block + length, target, & end );
        if ( err ) {
          printf ("# %s: Packed Data not smaller, not packing...\n", gToolName);
          return FALSE;
        }
        else {
          byte *compBuf;
          register int i;

          // printf ( "Unpacked Size = %d\n", length );
          // printf ( "Packed Size ~== %d\n", gPackedSize );
          // printf ( "Actual Packed Size = %d\n", end - target );

compBuf = (byte *) NewPtr ( length );
          if ( ! compBuf ) {
          printf ("# %s: Could not allocate comparison buffer (%d bytes)\n", gToolName,
        length);
              return FALSE;
          }
          err = UnpackData ( target, end, compBuf, compBuf + length );
          if ( err ) {
          printf ("# %s: Error unpacking data for verification; not packing data\n",
        gToolName);
              return FALSE;
          } for ( i = 0; i < length; i++ ) {
            if ( compBuf [i] != block [i] ) {
            printf ("# %s: Verify error at byte offset %x; not packing data\n", gToolName, i);
              return FALSE;
            }
          }
        }
        packedDataStart = target;
        packedDataLen  = end - target;
        dataSection    = kPIDataSection;

        return TRUE;
        } /* TryPackingData () */

      void ComputeSections ( void )
      {
         nextSectNum = 0;

lastFileAddr = sizeof fileHdr;
         if ( codeLen ) {
            codeSectNum = nextSectNum++;
            lastFileAddr += sizeof (SectionHeader);
         }
         dbsLen = dataLen + bssLen;
         if ( dbsLen ) {
            dataSectNum = nextSectNum++;
            lastFileAddr += sizeof (SectionHeader);
         } loaderSectNum = nextSectNum++;
         lastFileAddr += sizeof (SectionHeader);

         if ( optGlobalStringTab )
            lastFileAddr += sizeof strings;
```

- 87 -

```
     ) /* ComputeSections () */ long Align ( long offset, long aln )
     {
         int left = offset & (aln-1);
         if (! left) return offset;
         return offset + aln - left;
     } /* Align () */
   int ComputeOffsets ( void )
     {
         long i;
         long loaderSectionSize;

if (dataSectNum >= 0) {
             loaderHdr [dataSectNum]. numRelocations = relWordCnt;
             loaderHdr [dataSectNum]. relocationsOffset = 0;
         } for (i = kReExportImport; i < kMaxLoadableSections; i++)
             if ((loaderHdr [i]. numRelocations)        // || loaderHdr [i]. numExports)
                 ldHdr. numSections++;
         ldHdr. relocationsOffset =
                         sizeof (LoaderHeader) +
                         ldHdr. numImportFiles * sizeof (LoaderImportFileID) +
                         ldHdr. numImportSyms  * sizeof (LoaderImport)        +
                         ldHdr. numSections    * sizeof (LoaderRelExpHeader);

ldHdr. stringsOffset =
                         ldHdr. relocationsOffset +
                         relWordCnt * sizeof (RelocInstr);
         ldHdr. hashSlotTable = Align ( ldHdr. stringsOffset + stringTabSize, 4 );

loaderSectionSize =   ldHdr. hashSlotTable                                      +
                               (1 << ldHdr. hashSlotTabSize) * sizeof (HashSlotEntry) +
                               ldHdr. numExportSyms * sizeof (HashChainEntry)  +
                               ldHdr. numExportSyms * SIZEOF_LoaderExport;

// NOTE :
         // The section numbers of the sections is set by the macro's
         loaderSectNum,codeSectNum&dataSectNum
         // which are used to number the sections and set their section header order.
         // Rearange as desired by changing macros loaderSectNum, codeSectNum & dataSectNum.
         // Be sure to keep the the numbers (and therefore headers) of the loadable
         // sections to be before the numbers (and therefore headers) of the
         // non-loadable sections.

// NOTE: the order of the 3 data of the sections below determines
         //       the file order of the sections
         //       the code that actually writes to the file peforms independantly
         //       from the order of sections in the file // Loader Section
         sections [loaderSectNum]. containerOffset = Align ( lastFileAddr, 8 ) ;
         sections [loaderSectNum]. rawSize = loaderSectionSize;
         sections [loaderSectNum]. alignment = Log2 ( 4 );
         lastFileAddr = sections [loaderSectNum]. containerOffset +
                        sections [loaderSectNum]. rawSize;
   if (codeSectNum >= 0) {
```

```
        // Code Section
        sections [codeSectNum]. containerOffset = Align ( lastFileAddr, ALIGNMENT );
        sections [codeSectNum]. rawSize  = codeLen;
        sections [codeSectNum]. initSize = codeLen;
        sections [codeSectNum]. execSize = codeLen;
        sections [codeSectNum]. alignment = Log2 ( ALIGNMENT );
        lastFileAddr = sections [codeSectNum]. containerOffset +
                       sections [codeSectNum]. rawSize;
     }
     if (dataSectNum >= 0) {
        // Data Section
        sections [dataSectNum]. containerOffset = Align ( lastFileAddr, (gPackedData ? 4 :
     ALIGNMENT) );
        sections [dataSectNum]. rawSize  = gPackedData ? packedDataLen :
                                           (optBSSExpand ? dataLen + bssLen : dataLen);
        sections [dataSectNum]. initSize = (optBSSExpand ? dataLen + bssLen : dataLen);
        sections [dataSectNum]. execSize = dataLen + bssLen;
        sections [dataSectNum]. alignment = Log2 ( ALIGNMENT );
        lastFileAddr = sections [dataSectNum]. containerOffset +
                       sections [dataSectNum]. rawSize;
     } return 0;
     } /* ComputeOffsets () */ int FillHeaders ( byte *inFileName )
     {
        static byte sectionNames [] = "code\0data\0loader";

movebytes ( sectionNames, strings, sizeof sectionNames );

fileHdr. magic1          = peffMagic1;
        fileHdr. magic2          = peffMagic2;
        fileHdr. fileTypeID      = peffTypeID;
        fileHdr. architectureID  = powerPCID;
        fileHdr. versionNumber   = kPEFVersion;

     #if MAC
        fileHdr. dateTimeStamp   = fileHdrPtr -> fhTimDat ? fileHdrPtr -> fhTimDat :
     GetFileTime ( inFileName );
     #else
        fileHdr. dateTimeStamp   = MacTime ( fileHdrPtr -> fhTimDat );
     #endif fileHdr. oldDefVersion   = oldDefVersion;      // -- option
        fileHdr. oldImpVersion   = oldImpVersion;      // -- option
        fileHdr. currentVersion  = currentVersion;     // -- option
        fileHdr. numberSections  = nextSectNum;
        fileHdr. loadableSections = nextSectNum - 1;   // loader section not "loadable"

sections [loaderSectNum]. sectionName = optGlobalStringTab ? 10 : -1;
        sections [loaderSectNum]. sectionAddress = 0;
        sections [loaderSectNum]. regionKind = kLoaderSection;
        sections [loaderSectNum]. shareKind  = kGlobalShare;

if (codeSectNum >= 0) {
           sections [codeSectNum]. sectionName = optGlobalStringTab ? 0 : -1;
           sections [codeSectNum]. sectionAddress = peffCodeVAddr;     // -- option
           sections [codeSectNum]. regionKind = kCodeSection;
           sections [codeSectNum]. shareKind  = kGlobalShare;
        }

        if (dataSectNum >= 0) {
           sections [dataSectNum]. sectionName = optGlobalStringTab ? 5 : -1;
           sections [dataSectNum]. sectionAddress = peffDataVAddr;     // -- option
```

- 89 -

```
            sections [dataSectNum]. regionKind = dataSection;      // -- option
            sections [dataSectNum]. shareKind = shareOption;       // -- option
        }

        loaderHdr [kReExportImport]. sectionNumber = kReExportImport;
        loaderHdr [kPhysicalExport]. sectionNumber = kPhysicalExport;
        loaderHdr [kAbsoluteExport]. sectionNumber = kAbsoluteExport;

if (codeSectNum >= 0)
            loaderHdr [codeSectNum]. sectionNumber = codeSectNum;

if (dataSectNum >= 0)
            loaderHdr [dataSectNum]. sectionNumber = dataSectNum;

        return 0;
    } /* FillHeaders () */ int WriteFile ( byte *outFileName )
    {
        short refNum;
        long i;
        int err;
        Str255 pStr;
        err = MakePStr ( outFileName, strlen ( (char*) outFileName ), pStr, sizeof pStr );
        if (err) return err;

err = HCreate ( 0, 0, pStr, kDefCreator, kDefType );
        if (err < 0) {
    #ifdef MAC
            if (err != dupFNErr) {    /* duplicates are ok! ? */
    #endif
                printf ("# %s: Error creating %s %d\n", gToolName, outFileName, err);
                return -1;
    #ifdef MAC
            }
    #endif
        }
        err = HOpenDF ( 0, 0, pStr, fsRdWrPerm, & refNum );
        if (err < 0) {
            printf ("# %s: Error opening %s %d\n", gToolName, outFileName, err);
            return -1;
        }

// File Header
        Write ( refNum, (byte *) & fileHdr, sizeof fileHdr );

        // Section Headers
        for (i = 0; i < fileHdr. numberSections; i++)
        {
            Write ( refNum, (byte *) & sections [i], sizeof (SectionHeader) );
        }

// Global String Table
        if ( optGlobalStringTab )
        {
            Write ( refNum, strings, sizeof strings );
        }

// Loader Section
        my_SetFPos ( refNum, fsFromStart, sections [loaderSectNum]. containerOffset );
        Write ( refNum, (byte *) & ldHdr, sizeof ldHdr );

// Loader RelExp Headers
```

```
          Write ( refNum, (byte *) importFiles, ldHdr. numImportFiles * sizeof
       (LoaderImportFileID) );
          Write ( refNum, (byte *) importSymbols, ldHdr. numImportSyms * sizeof (LoaderImport) );

for (i = kReExportImport; i < kMaxLoadableSections; i++) {
             if ( loaderHdr [i]. numRelocations )    // || loaderHdr [i]. numExports )
             {
                Write ( refNum, (byte *) & loaderHdr [i], sizeof (LoaderRelExpHeader) );
             }
          }

Write ( refNum, (byte *) relocations, relWordCnt * sizeof (RelocInstr) );
          Write ( refNum, (byte *) stringTable, stringTabSize );
          my_SetFPos ( refNum, fsFromStart, sections [loaderSectNum]. containerOffset +
                          ldHdr. hashSlotTable );
                          // to skip any padding after string table Write ( refNum, (byte *) exportHashSlot, (1 << ldHdr. hashSlotTabSize) * sizeof
       (HashSlotEntry) );
          Write ( refNum, (byte *) sortedHashChain, ldHdr. numExportSyms * sizeof (HashChainEntry)
       );
          Write ( refNum, (byte *) sortedExportSymbols, ldHdr. numExportSyms * SIZEOF_LoaderExport
       );

// Code Section
          if (codeSectNum >= 0) {
             my_SetFPos ( refNum, fsFromStart, sections [codeSectNum]. containerOffset );
             Write ( refNum, codeStart, codeLen );
          }

// Data Section
          if (dataSectNum >= 0) {
             my_SetFPos ( refNum, fsFromStart, sections [dataSectNum]. containerOffset );
             if ( gPackedData )
                Write ( refNum, packedDataStart, packedDataLen );
             else
                Write ( refNum, dataStart, dataLen );
             if (optBSSExpand)
             {
                Write ( refNum, bssStart, bssLen );
             }
          }

// End of file padding
          if ( lastFileAddr != Align ( lastFileAddr, ALIGNMENT ) ) {
             my_SetFPos ( refNum, fsFromStart, Align ( lastFileAddr, ALIGNMENT ) - 1 );
             Write ( refNum, (byte *) "", 1 );
          } if MAC
          SetEOF ( refNum, Align ( lastFileAddr, ALIGNMENT ) );
       #endif
          FSClose ( refNum );

/*
              if creator/filetype were specified, set 'em now...
          */
          if (gFileCreator || gFileType)
          {
       #if MAC
             Str255 pStr;

err = MakePStr ( outFileName, strlen ( (char*) outFileName ), pStr, sizeof pStr );
```

- 91 -

```
            if (err) return err;

err = HGetFInfo ( 0, 0, pStr, & gFinderInfo );
            if ( err ) {
                    printf ("# %s: cannot get file type and creator info on %s (%d)\n", gToolName,
            outFileName, err);
                    return 1;
            }

            if ( gFileCreator )
                gFinderInfo.fdCreator = gFileCreator;

if ( gFileType )
                gFinderInfo.fdType    = gFileType;
            err = HSetFInfo ( 0, 0, pStr, & gFinderInfo );
            if ( err ) {
                    printf ("# %s: cannot set file type and creator info on %s (%d)\n", gToolName,
            outFileName, err);
                    return 1;
            }
    #else
                    printf ("# %s: cannot set file type and creator on this system\n",
            gToolName);
    #endif
        } return 0;
    } /* WriteFile () */
    byte *SkipCount ( byte *thisChar, int libIndex, int offset, int *length )
    {
        int skipCount;
        for (skipCount = 0; skipCount < (3 + libIndex*3 + offset); skipCount++) {
            while (*thisChar != 0) thisChar++;   /* Skip the current string */
            thisChar++;   /* Get to the start of the next string */
        }
        *length = strlen ( (char*) thisChar );
        return thisChar;
    } /* SkipCount () */

    byte *GetLibName ( byte *thisChar, int libIndex, int *length )
    {
        static byte name [256];
        byte *fileN, *membN;
        int fLen, mLen;
        fileN = SkipCount ( thisChar, libIndex, 1, & fLen );
        membN = SkipCount ( thisChar, libIndex, 2, & mLen );

if (! mLen) {
            *length = fLen;
            return fileN;
        } movebytes ( fileN, name, fLen );
        name [fLen] = ':';
        movebytes ( membN, name+fLen+1, mLen );
        name [fLen+1+mLen] = 0;

*length = fLen + 1 + mLen;
        return name;
    } /* GetLibName () */
```

- 92 -

```
      GetName ( TLdSymPtr sym, byte **name, int *nameLength )
      {
         int len;

        if ( sym -> lsZeroes != 0) {
            byte *ptr = (byte *) sym -> lsName;
            *name = ptr;
            len = 0;
            while (len < 8 && *ptr) { ptr++; len++; }
         }
         else {
            *name = ldStrings + sym -> lsOffset;
            len = strlen ( (char*) *name );
         }
         *nameLength = len;

return 0;
      } /* GetName () */

SizeString ( int length, Boolean needNull )
      {
         stringTabSize += length;
         if ( needNull || optNullPad )
            stringTabSize++;
      } /* SizeString () */

      AddString ( byte *name, int length, Boolean needNull )
      {
         movebytes ( name, stringTable + stringTabOff, length );
         stringTabOff += length;
         if ( needNull || optNullPad )
            stringTabOff++;
      } /* AddString () */ long MapSecNumToPeff ( long secNm, long *defAddr )
      {
         if (secNm < 0) {
            *defAddr = 0;
            return secNm;
         }
         if (secNm == secNum [CODEINDEX]) {
            *defAddr = codeVAddr;
            return codeSectNum;
         }
         if (secNm == secNum [DATAINDEX]) {
            *defAddr = dataVAddr;
            return dataSectNum;
         }
         if (secNm == secNum [BSSINDEX]) {
            // the next line should result in subtracting out the start of bss,
            // and adding in the length of data to the symbol's address,
            // however, since XCOFF always places bssVAddr = dataVAddr + dataLen;
            // this line could be reduced to *defAddr = dataVAddr;
            *defAddr = bssVAddr - dataLen;
            return dataSectNum;
         }
         return -1;
      } /* MapSecNumToPeff () */

      int ClassOf ( TLdSymPtr sym )
      {
```

```
       switch ( sym -> lsSmClass ) {
       case XMC_PR : return kCodeSymbol;
       case XMC_SV : /* fall thru */
       case XMC_DS : return kTVectSymbol;
       case XMC_TC : return kTOCSymbol;
       default     : return kDataSymbol;
       }
    } /* ClassOf () */

    Boolean IsValidImport ( TLdSymPtr sym )
    {
    /*
       don't remove import symbols -
       if ( sym == remSym [0] ) return 0;
       if ( sym == remSym [1] ) return 0;
       if ( sym == remSym [2] ) return 0;
    */

       return IsLdImport ( *sym ) &&
              sym -> lsIFile > 0 &&
              sym -> lsIFile <= ldHdr. numImportFiles;
    } /* IsValidImport () */

    Boolean IsReExportImport ( TLdSymPtr sym )
    {
       // remove export symbols only
       if ( sym == remSym [0] ) return 0;
       if ( sym == remSym [1] ) return 0;
       if ( sym == remSym [2] ) return 0;

return IsLdExport ( *sym );
    } /* IsReExportImport () */

Boolean IsValidExport ( TLdSymPtr sym )
    {
       // remove export symbols only
       if ( sym == remSym [0] ) return 0;
       if ( sym == remSym [1] ) return 0;
       if ( sym == remSym [2] ) return 0;

return IsLdExport ( *sym ) &&
              (sym -> lsScNum == secNum [CODEINDEX] ||
              sym -> lsScNum == secNum [DATAINDEX] ||
              sym -> lsScNum == secNum [BSSINDEX]);
    } /* IsValidExport () */

    AddExport ( long secn, long theAddr, byte *name, int nameLength, int symClass )
    {
       exportSymbols [exportNext]. symClass = symClass;
       exportSymbols [exportNext]. nameOffset = stringTabOff;
       exportSymbols [exportNext]. sectionNumber = secn;
       // loaderHdr [secn]. numExports++;
       exportHashChain [exportNext]. hashword = CFLHash ( name, nameLength );
       exportSymbols [exportNext]. address = theAddr;
       exportNext++;
    } /* AddExport () */

AddImport ( int XCOFFindex, TLdSymPtr sym, byte *name, int nameLength )
    {
       int symClass = ClassOf ( sym );

XCOFFSymIndexToPeffImportNumber [XCOFFindex] = importNext;
```

```
            importSymbols [importNext]. symClass = symClass;
            importSymbols [importNext]. nameOffset = stringTabOff;
            // if both import & export, add to both
            // tables, but only one string table entry
            if (IsReExportImport ( sym ) )
                AddExport ( kReExportImport, importNext, name, nameLength, symClass );
            importNext++;
        } /* AddImport () */

        int SymCvt ( TLdSymPtr ldSyms, long symCnt )
        {
            TVersion linkedVer, oldImpVer;
            TBoolean iB;
            long fileIndex;
            long symIndex;
            byte *name;
            int nameLength;
            byte *ldFiles;
            long size;
            TLdSymPtr sym;
            long cnt;
            long secn;
            long defAddr;
            long sNum;
            TBoolean isImp;

// set inital values to these
            if (fileCnt == 0 || auxHdrPtr -> ahEntry == -1) {
                ldHdr. entryPointSection = kNoRegion;
            }
            else {
                ldHdr. entryPointSection = MapSecNumToPeff (auxHdrPtr -> ahSnEntry, & defAddr);
                ldHdr. entryPointOffset = auxHdrPtr -> ahEntry - defAddr;
            }
            ldHdr. initPointSection = kNoRegion;
            ldHdr. termPointSection = kNoRegion;

            // determine sizeof string table
            // first - size of import lib names if (ldHdrPtr) {
                /* Skip the first file string, it is the UNIX path */
                ldHdr. numImportFiles = ldHdrPtr -> lhNImpID - 1;
                ldFiles = (byte *) ldHdrPtr + ldHdrPtr -> lhImpOff;
            }

            for (fileIndex = 0; fileIndex < ldHdr. numImportFiles; fileIndex++) {
                name = GetLibName ( ldFiles, fileIndex, & nameLength );
                CheckLibOpt ( & name, & nameLength, & linkedVer, & oldImpVer, & iB );
                SizeString ( nameLength, TRUE );
            }
            // next size of all symbol's names
            // and types of them - import vs. export
            for (symIndex = 0; symIndex < symCnt; symIndex++) {
                sym = & ldSyms [symIndex];
                GetName ( sym, & name, & nameLength );

// identify entryPoint, initPoint, termPoint, by name
                // as user specified options, and remove from general
                // processing of symbols.

isImp = IsValidImport ( sym );
```

- 95 -

```
        if (isImp && IsReExportImport ( sym ) || IsValidExport ( sym ) ) {
            if ( nameLength == entryPointNameLength &&
                comparebytes ( name, entryPoint, nameLength ) ) {
                if ( isImp ) {
                    ldHdr. entryPointSection = kReExportImport;
                    ldHdr. entryPointOffset  = sym -> lsValue;
                }
                else {
                    ldHdr. entryPointSection = MapSecNumToPeff ( sym -> lsScNum, & defAddr );
                    ldHdr. entryPointOffset  = sym -> lsValue - defAddr;
                }
                if (! optKeepMIT) remSym [0] = sym;
                entryUsed = TRUE;
            }
            if ( nameLength == initPointNameLength &&
                comparebytes ( name, initPoint, nameLength ) ) {
                if ( isImp ) {
                    ldHdr. initPointSection = kReExportImport;
                    ldHdr. initPointOffset  = sym -> lsValue;
                }
                else {
                    ldHdr. initPointSection = MapSecNumToPeff ( sym -> lsScNum, & defAddr );
                    ldHdr. initPointOffset  = sym -> lsValue - defAddr;
                }
                if (! optKeepMIT) remSym [1] = sym;
                initUsed = TRUE;
            }
            if ( nameLength == termPointNameLength &&
                comparebytes ( name, termPoint, nameLength ) ) {
                if ( isImp ) {
                    ldHdr. termPointSection = kReExportImport;
                    ldHdr. termPointOffset  = sym -> lsValue;
                }
                else {
                    ldHdr. termPointSection = MapSecNumToPeff ( sym -> lsScNum, & defAddr );
                    ldHdr. termPointOffset  = sym -> lsValue - defAddr;
                }
                if (! optKeepMIT) remSym [2] = sym;
                termUsed = TRUE;
            }
        } if ( IsValidImport ( sym ) ) {
            ldHdr. numImportSyms++;
            SizeString ( nameLength, TRUE );
            if (IsReExportImport ( sym ))
                ldHdr. numExportSyms++;
        }
        else if ( IsValidExport ( sym ) ) {
            ldHdr. numExportSyms++;
            SizeString ( nameLength, FALSE );
        }
    } if ( entryPoint && ! entryUsed )
        printf ("# %s: warning, the specified entry point '%s' was not found\n",  gToolName,
entryPoint);
    if ( initPoint && ! initUsed )
        printf ("# %s: warning, the specified init routine '%s' was not found\n", gToolName,
initPoint);
    if ( termPoint && ! termUsed )
        printf ("# %s: warning, the specified term routine '%s' was not found\n", gToolName,
termPoint);
```

```
          for (symIndex = 0; symIndex < addExpCnt; symIndex++) {
             SizeString ( strlen ( (char*) addExpAry [symIndex]. name ), FALSE );
             ldHdr. numExportSyms++;
          }

// allocate symbol string tables and import / export tables
          stringTable = Malloc ( (size = stringTabSize) + 4 );
          if (! stringTable) goto Mem_Error;
          clearbytes ( stringTable, size );
          stringTabOff = 0;

XCOFFSymIndexToPeffImportNumber = (long *) Malloc ( size = sizeof (long) * symCnt );
          if (! XCOFFSymIndexToPeffImportNumber) goto Mem_Error;
          clearbytes ( (byte *) XCOFFSymIndexToPeffImportNumber, size );

importFiles = (LoaderImportFileIDPtr)
                Malloc ( size = sizeof (LoaderImportFileID) * ldHdr. numImportFiles );
          if (! importFiles) goto Mem_Error;
          clearbytes ( (byte *) importFiles, size );

importSymbols = (LoaderImportPtr)
                Malloc ( size = sizeof (LoaderImport) * ldHdr. numImportSyms );
          if (! importSymbols) goto Mem_Error;
          clearbytes ( (byte *) importSymbols, size );
          importNext = 0;

exportSymbols = (LoaderExportPtr)
                Malloc ( size = sizeof (LoaderExport) * ldHdr. numExportSyms );
          if (! exportSymbols) goto Mem_Error;
          clearbytes ( (byte *) exportSymbols, size );
          exportNext = 0;

exportHashChain = (HashChainEntryPtr)
                Malloc ( size = sizeof (HashChainEntry) * ldHdr. numExportSyms );
          if (! exportHashChain) goto Mem_Error;
          clearbytes ( (byte *) exportHashChain, size );

// extract imported library symbols
          for (fileIndex = 0; fileIndex < ldHdr. numImportFiles; fileIndex++) {
             name = GetLibName ( ldFiles, fileIndex, & nameLength );
             CheckLibOpt ( & name, & nameLength, & linkedVer, & oldImpVer, & iB );
             importFiles [fileIndex]. fileNameOffset = stringTabOff;
             importFiles [fileIndex]. linkedVersion = linkedVer;
             importFiles [fileIndex]. oldImpVersion = oldImpVer;
             importFiles [fileIndex]. initBefore = iB;
             AddString ( name, nameLength, TRUE );
          }

// extract imports for each library
          for (fileIndex = 0; fileIndex < ldHdr. numImportFiles; fileIndex++) {
             // add imported symbols, in order of the files they belong to.
             cnt = 0;
             importFiles [fileIndex]. impFirst = importNext;
             for (symIndex = 0; symIndex < symCnt; symIndex++) {
                sym = & ldSyms [symIndex];
                if (! IsValidImport ( sym )) continue;
                if (sym -> lsIFile-1 != fileIndex) continue;
                GetName ( sym, & name, & nameLength );
                AddImport ( symIndex, sym, name, nameLength );
                AddString ( name, nameLength, TRUE );
                cnt++;
             }
             importFiles [fileIndex]. numImports = cnt;
          }
```

```
        // extract exports by section number
        for (sNum = kReExportImport; sNum < kMaxLoadableSections; sNum++) {
            if (sNum != kReExportImport)  // we already started accumulating exports of type -3
                ;  // loaderHdr [sNum]. expFirst = exportNext;
            for (symIndex = 0; symIndex < symCnt; symIndex++) {
                sym = & ldSyms [symIndex];
                if ( IsValidImport ( sym ) ) continue;    // if it was an import it was checked
already
                                                          //    to see if it is an export
                if (! IsValidExport ( sym ) ) continue;
                secn = MapSecNumToPeff ( sym -> lsScNum, & defAddr );
                if ( secn != sNum ) continue;
                GetName ( sym, & name, & nameLength );
                AddExport ( secn, sym -> lsValue - defAddr, name, nameLength, ClassOf ( sym ) );
                AddString ( name, nameLength, FALSE );
            }
            for (symIndex = 0; symIndex < addExpCnt; symIndex++) {
                long    xcIndex;
                AddExpType *add = & addExpAry [symIndex];
                switch ( add -> format ) {
                case kEquivalence :
                    xcIndex = FindXCOFFIndexByName ( add -> oldname, ldSyms, symCnt );
                    if ( xcIndex < 0 ) {
                        printf ("# %s: symbol '%s' not found for export '%s'\n", gToolName, add ->
oldname, add -> name);
                        return 1;
                    }
                    sym = & ldSyms [ xcIndex ];
                    nameLength = strlen ( (char*) add -> name );
                    if ( IsValidImport ( sym ) ) {
                        long impIndex;
                        if ( kReExportImport != sNum ) break;
                        impIndex = XCOFFSymIndexToPeffImportNumber [ xcIndex ];
                        AddExport ( kReExportImport, impIndex, add -> name, nameLength, ClassOf (
sym ) );
                    }
                    else {
                        secn = MapSecNumToPeff ( sym -> lsScNum, & defAddr );
                        if ( secn != sNum ) break;
                        AddExport ( secn, sym -> lsValue - defAddr, add -> name, nameLength, ClassOf
( sym ) );
                    }
                    AddString ( add -> name, nameLength, FALSE );
                    break;
                case kAbsolute :
                    if ( add -> secn != sNum ) break;
                    nameLength = strlen ( (char*) add -> name );
                    AddExport ( add -> secn, add -> offset, add -> name, nameLength, add -> class
);
                    AddString ( add -> name, nameLength, FALSE );
                    break;
                }
            }
        }

CheckWeak ();

return 0;

Mem_Error:
        printf ("# %s: Could not allocate %d bytes\n", gToolName, size);
        return 1;
}  /* SymCvt () */ int SymSort ( void )
```

```
        {
            long i;
            long s;
            long *exportLinkSlot;
            long hashSlotSize;
            long size;
            long oldIndex;
            long hashSlot;
            long oldcc;
            int  hsincr = 0;

// compute size of hash slot table
            ldHdr. hashSlotTabSize = CFLHashSlotBits ( ldHdr. numExportSyms );
    top :
            hashSlotSize = 1 << ldHdr. hashSlotTabSize;

exportHashSlot = (HashSlotEntryPtr)
                Malloc ( size = sizeof (HashSlotEntry) * hashSlotSize );
            if (! exportHashSlot) goto Mem_Error;
            clearbytes ( (byte *) exportHashSlot, size );

exportLinkSlot = (long *)
                Malloc ( size = sizeof (long) * ldHdr. numExportSyms );
            if (! exportLinkSlot) goto Mem_Error;
            clearbytes ( (byte *) exportLinkSlot, size );

for (i = 0; i < ldHdr. numExportSyms; i++) {
                hashSlot = CFLHashSlot ( exportHashChain [i]. hashword, ldHdr. hashSlotTabSize );
                exportLinkSlot [i] = exportHashSlot [hashSlot]. chainIndex;
                oldcc = exportHashSlot [hashSlot]. chainCount;
                exportHashSlot [hashSlot]. chainCount++;
                exportHashSlot [hashSlot]. chainIndex = i;
                if (exportHashSlot [hashSlot]. chainCount != oldcc + 1) {
                    if ( ++hsincr > 3) {
                    printf ("# %s: hash chain count overflow (quitting)\n", gToolName);
                    return -1;
                    }
                    printf ("# %s: Hash chain count overflow, using more slots\n", gToolName);
                ldHdr. hashSlotTabSize++;
                Free ( (byte *) exportHashSlot );
                Free ( (byte *) exportLinkSlot );
                goto top;
                }
                if ( exportHashSlot [hashSlot]. chainIndex != i) {
                    printf ("# %s: hash slot value overflow (too many exports, quitting)\n",
    gToolName);
                    return -1;
                }
            }
            sortedExportSymbols = (LoaderExportPtr)
                Malloc ( size = sizeof (LoaderExport) * ldHdr. numExportSyms );
            if (! sortedExportSymbols) goto Mem_Error;
            clearbytes ( (byte *) sortedExportSymbols, size );
            sortedHashChain = (HashChainEntryPtr)
                Malloc ( size = sizeof (HashChainEntry) * ldHdr. numExportSyms );
            if (! sortedHashChain) goto Mem_Error;
            clearbytes ( (byte *) sortedHashChain, size );
            sortedExportNext = 0;
            // convert exportHashSlot in place,
            // put map of old --> new into indexMap
            for (s = 0; s < hashSlotSize; s++) {
                oldIndex = exportHashSlot [s]. chainIndex;
                exportHashSlot [s]. chainIndex = sortedExportNext;
```

- 99 -

```
        for (i = 0; i < exportHashSlot [s]. chainCount; i++) {
            sortedExportSymbols [sortedExportNext] = exportSymbols   [oldIndex];
            sortedHashChain    [sortedExportNext] = exportHashChain [oldIndex];
            sortedExportNext++;
            oldIndex = exportLinkSlot [oldIndex];
        }
    }

Free ( (byte *) exportLinkSlot ); /* !!wow, we almost care about memory disposal!! */
    return 0;

Mem_Error:
    printf ("# %s: Could not allocate %d bytes\n", gToolName, size);
    return 1;
} /* SymSort () */ int AddWeakImport ( byte *libName, byte *name )
{
    WeakImport *ptr = (WeakImport *) NewPtr ( sizeof (WeakImport) );
    if (! ptr) return -1;
    ptr -> libName = libName;
    ptr -> name = name;
    ptr -> next = WeakImportList;
    WeakImportList = ptr;
    return 0;
} /* AddWeakImport () */ int CheckWeak ( void )
{
    WeakImport *ptr;
    long start, end;
    long fileIndex;
    int  libNameLen;
    int  impNameLen;

for (ptr = WeakImportList; ptr; ptr = ptr -> next) {
       start = end = 0;

libNameLen = strlen ( (char *) ptr -> libName );
       for ( fileIndex = 0; fileIndex < ldHdr. numImportFiles; fileIndex++ ) { impNameLen = strlen ( (char *) (stringTable + importFiles [fileIndex].
fileNameOffset) );
          if ( impNameLen != libNameLen ||
              ! comparebytes ( stringTable + importFiles [fileIndex]. fileNameOffset,
                      ptr -> libName,
                  libNameLen ) ) continue;

start = importFiles [fileIndex]. impFirst;
          end   = start + importFiles [fileIndex]. numImports;
          for (; start < end; start++ ) {
             if ( strcmp ( (char*) (stringTable + importSymbols [start]. nameOffset),
                       (char*) ptr -> name) != 0 )
                continue;
             importSymbols [start]. symClass |= kUndefImpOK;
          // we found the symbol whose name matches, so stop!
             break;
          }
       // we found the file whose library name matches, so stop!
       break;

}
       if (start >= end)
          printf ("# %s: warning, symbol '%s' in file '%s' not found\n", gToolName, ptr ->
name, ptr -> libName);
```

- 100 -

```
        } for ( fileIndex = 0; fileIndex < ldHdr. numImportFiles; fileIndex++ ) {
            if ( importFiles [fileIndex]. initBefore & kWeakImport )
                CheckImportsForUndefOK ( fileIndex );
        } return 0;
    } /* CheckWeak () */ void CheckImportsForUndefOK ( int fileIndex )
    {
        long start, end;

start = importFiles [fileIndex]. impFirst;
        end   = start + importFiles [fileIndex]. numImports;
        for (; start < end; start++ ) {
            if ( importSymbols [start]. symClass & kUndefImpOK ) continue;
            printf ("# %s: warning, symbol '%s' is not marked as weak, but its library \"%s\"
    is.\n",
                    gToolName,
                    stringTable + importSymbols [start]. nameOffset,
                    stringTable + importFiles [fileIndex]. fileNameOffset );
        }
    } /* CheckImportsForUndefOK () */ long RelocAddr ( TLdRelPtr reloc )
    {
        long relpos = (long) reloc -> lrVAddr;

if (reloc -> lrRSecNm == secNum [DATAINDEX]) {
            relpos -= dataVAddr;
        }
        else if (reloc -> lrRSecNm == secNum [BSSINDEX]) {
            relpos -= bssVAddr;
            relpos += dataLen;
        } return relpos;
    } /* RelocAddr () */ long RelocIndex ( TLdRelPtr reloc )
    {
        long rIndex = reloc -> lrSymNdx;

if (rIndex == BSSINDEX)
            rIndex  = DATAINDEX;
        return rIndex;
    } /* RelocIndex () */ int DataAdjust ( TLdRelPtr reloc, long count )
    {
    while (count > 0) {
        long rIndex = reloc -> lrSymNdx;
        long *rAddr;

if (reloc -> lrRSecNm != secNum [DATAINDEX] &&
            reloc -> lrRSecNm != secNum [BSSINDEX]) {
            printf ("# %s: not converting relocation; relocations not allowed in code\n",
    gToolName);
            return 1;
        }
```

- 101 -

```
            if (rIndex == CODEINDEX) {
                if (reloc -> lrRSecNm == secNum [BSSINDEX]) {
                    if (! optBSSExpand) {
errmsg :            printf ("# %s: relocation of BSS to BSS not convertable into PEF format without
            -b option\n", gToolName);
                        printf ("#           item at 0x%08lx in BSS\n", reloc -> lrVAddr);
                        printf ("#           relocate item into (initialized) DATA to properly
            convert\n");
                        return 1;
                    }
                    rAddr = (long *) (bssStart + RelocAddr ( reloc ) - dataLen);
                }
                else {
                    rAddr = (long *) (dataStart + RelocAddr ( reloc ) );
                }
                *rAddr -= codeVAddr;
                *rAddr += peffCodeVAddr;
            }
            else if (rIndex == DATAINDEX) {
                if (reloc -> lrRSecNm == secNum [BSSINDEX]) {
                    if (! optBSSExpand) goto errmsg;
                    rAddr = (long *) (bssStart + RelocAddr ( reloc ) - dataLen);
                }
                else {
                    rAddr = (long *) (dataStart + RelocAddr ( reloc ) );
                }
                *rAddr -= dataVAddr;
                *rAddr += peffDataVAddr;
            }
            else if (rIndex == BSSINDEX) {
                rIndex = DATAINDEX;
                if (reloc -> lrRSecNm == secNum [BSSINDEX]) {
                    if (! optBSSExpand) goto errmsg;
                    rAddr = (long *) (bssStart + RelocAddr ( reloc ) - dataLen);
                }
                else {
                    rAddr = (long *) (dataStart + RelocAddr ( reloc ) );
                }
                *rAddr -= bssVAddr;
                *rAddr += dataLen;
                *rAddr += peffDataVAddr;
            }
            count--;
            reloc++;
        }
        return 0;
    } /* DataAdjust () */ long index = 0;

define kRptBufSize 8              // keep power of 2
    #define kRptBufMask (kRptBufSize-1)
    typedef RelocInstr TRptBuf [kRptBufSize];
    TRptBuf rptBuf;         // last n words of relocation
    int rptDist;                        // match found how far back?
    int rptRest;                        // number of instrs in current partial match
    int rptRunCnt;                      // number of complete matches void PrtReloc ( RelocInstr w1 )
    {
        relocations [relWordCnt++] = w1;
    } /* PrtReloc () */

CheckRelocMatch ( RelocInstr w1, int matchStart )
```

- 102 -

```
     {
        int i;
        for (i = matchStart; i <= kRptBufSize; i++) {
           if (w1 == rptBuf [ relWordCnt-i & kRptBufMask ]) {
              rptDist = i;
              rptRest = 1;         // first word of match
              break;
           }
        }
     } /* CheckRelocMatch () */ void RestartMatch ( RelocInstr w1 )
     {
        int relCopy = relWordCnt;
        int rptRunCopy = rptRunCnt;
        int rptRestCopy = rptRest;
        int rptDistCopy = rptDist;
        TRptBuf rptCopy;

// don't emit a RPT 1,1
        if (rptRunCnt == 1 && rptDist == 1) {
           rptRunCopy = rptRunCnt = 0;
           rptRestCopy = rptRest = 1;
        }

// output completed runs; set rptRunCnt to 0
        if (rptRunCnt > 0) {
           if (rptRunCnt <= ksRPTMAX) {
              PrtReloc ( (krRPT << RELOPSHFT) + (rptDist-1<<8) + rptRunCnt - 1 );
           }
           else {
              PrtReloc ( (krLRPT << RELOPSHFT) + (rptDist-1<<6) + (rptRunCnt >> 16) );
              PrtReloc ( rptRunCnt & 65535 );
           }
        }

// in case of an incomplete run, which we will want to add to thru
        // repeat buffer, save the repeat buffer to know what the partial
        // sequence was
        movebytes ( (byte *) rptBuf, (byte *) rptCopy, sizeof rptCopy );

// if a run was sent, then clear the match buffer
        // otherwise, don't
        if (rptRunCopy) {
           clearbytes ( (byte *) rptBuf, sizeof rptBuf );
           rptDistCopy = 1;     // and set the distance of first ok match to 1
                                // (no match will be found, however, AddReloc
                                // will know that a sequence is being restarted
                                // when it sees that matchStart > 1)
        } relCopy -= rptDist;
        rptRunCnt = 0;
        rptDist = 0;
        rptRest = 0;
        while (--rptRestCopy >= 0) {           // output incomplete match
           AddReloc ( rptCopy [ relCopy & kRptBufMask ], rptDistCopy+1 );
           rptDistCopy = 0;
           relCopy++;
        }
        AddReloc ( w1, 1 );
     } /* RestartMatch () */

     void AddReloc ( RelocInstr w1, int matchStart )
     {
```

- 103 -

```
        static int secondWord;

if (rptDist) {                              // is repeat buffer started?
                                                    // yes- check if next word continues repeat
            if (w1 && w1 == rptBuf [ relWordCnt-rptDist+rptRest & kRptBufMask ]) {
                rptRest++;                          //    yes- check if match complete?
                if (rptRest == rptDist) {
                    rptRunCnt++;                    //       yes- incremnt run count
                    rptRest = 0;                    //             clear count of uncompleted run
                }
            }
            else {                                  // no- match continuation failed
                RestartMatch ( w1 );
            }
            return;
        }
        // case of no partial match started yet
        {                                           // no - check for match anywhere
            if (matchStart > 1) secondWord = 0;     // sequence is being restarted by Restart
                                                    // restarted sequence must start on instr
boundary
                                                    // because match started on instr boundary
            if (! secondWord && w1)                 //    only check if start of instr
                CheckRelocMatch ( w1, matchStart );
            if (rptDist) {                          //    matched somewhere?
                if (rptRest == rptDist) {           //    yes- is match complete?
                    rptRunCnt++;                    //       yes- increment run cnt
                    rptRest = 0;                    //             set rest cnt to 0
                }
            }
            else if (w1) {                          //    no - add to match buffer, output
                rptBuf [ relWordCnt & kRptBufMask] = w1;
                PrtReloc ( w1 );
                secondWord = ( secondWord ? 0 : IsLARG ( w1 >> RELOPSHFT ) );
            }
        }
    } /* AddReloc () */ void dorform ( int op, long run, long max )
    {
        int cnt;

while (run > 0) {
            cnt = run > max ? max : run;
            AddReloc ( (op << RELOPSHFT) + cnt - 1, 1 );
            run -= cnt;
        }
    } /* dorform () */ void doform ( int op, long cnt )
    {
        AddReloc ( (op << RELOPSHFT) + cnt, 1 );
    } /* doform () */ void dolform ( int op, long offset )
    {
        AddReloc ( (op << RELOPSHFT) + ((offset >> 16) & 1023), 1 );
        AddReloc ( offset & 65535, 1 );
    } /* dolform () */ void dodform ( int op, int delta, int run )
    {
```

```
        AddReloc ( (op << RELOPSHFT) + (delta << 4) + run, 1 );
    } /* dodform () */

    void dodelta ( long relpos, long delta )
    {
        if (! delta) return;
        if (delta >= 0 && delta <= ksDELTA)
            doform ( krDELT, delta-1 );
        else
            dolform ( krLABS, relpos );
    } /* dodelta () */

    int RelCvt ( TLdRelPtr reloc, long count )
    {
        long curpos = 0;
        long relpos;
        long delta;
        long run;
        long rIndex;
        long symIndex = 0;
        long peffIndex;

        DataAdjust ( reloc, count );

relocations = (RelocInstr *) Malloc ( count * sizeof (RelocInstr) * 2 * 2 + 8 );
                // max possible size of relocation: old count * 2 bytes per relocInstr
                //                 * 2 for long form of reloc instr * 2 for two instrs
        if (! relocations) return -1;

if ( count > 0 ) {
            if (codeSectNum >= 0)
                if ( codeSectNum != 0)
                    doform ( krCDIS, codeSectNum );

if (dataSectNum >= 0)
                if ( dataSectNum != 1 )
                    doform ( krDTIS, dataSectNum );
        } while (count > 0) {
            relpos = RelocAddr ( reloc );           // address to relocate
            delta = relpos - curpos;                // delta from last address
            curpos = relpos;                        // new curpos is addr to relocate run = 1;

        // look for run of
        //      SYM,SYM+1,SYM+2...

rIndex = RelocIndex ( reloc );

            if (rIndex > BSSINDEX) {
                peffIndex = XCOFFSymIndexToPeffImportNumber [rIndex - kSpecialSymbolCount];
                if (peffIndex == symIndex) {
                    while (count >= 2 &&
                            RelocAddr ( reloc+1 ) == curpos+4 &&
                            XCOFFSymIndexToPeffImportNumber [RelocIndex ( reloc+1 ) -
        kSpecialSymbolCount]
                                            == symIndex+1) {
                        curpos += 4;
                        reloc++;
                        symIndex++;
                        run++;
                        count--;
```

- 105 -

```
                    )
                )
                dodelta ( relpos, delta );
5               if (run > 1 || peffIndex == symIncex) {
                    dorform ( krSYMR, run, ksISMAX );
                    symIndex++;
                }
                else {
                    if (peffIndex >= ksISMAX)
                        dolform ( krLSYM, peffIndex );
                    else
                        doform ( krSYMB, peffIndex );
                    symIndex = peffIndex+1;
                }
                curpos += 4;
                reloc++;
                index += run;
                count--;
                continue;
            }

// look for run of:
        //    code,
        //    data while (count >= 2 &&
                    RelocAddr ( reloc+1 ) == curpos+4 &&
                    RelocIndex ( reloc+1 ) == rIndex) {
                curpos += 4;
                reloc++;
                run++;
                count--;
            }
        // no single run found,
        // look for run of:
        //    desc(code/data/blank)
        //    vtbl(data/blank)
            if (run == 1 && rIndex == 0) {              // desc (12 byte form)
                while (count >= 2 &&
                        RelocAddr ( reloc ) == curpos &&
                        RelocIndex ( reloc ) == CODEINDEX &&
                        RelocAddr ( reloc+1 ) == curpos+4 &&
                        RelocIndex ( reloc+1 ) == DATAINDEX &&
                        (count == 2 || RelocAddr ( reloc+2 ) >= curpos+12) ) {
                    curpos += 12;
                    reloc += 2;
                    run++;
                    count -= 2;
                }
                if (run > 1) {
                    run--;
                    dodelta ( relpos, delta );
                    dorform ( krDESC, run, ksDEMAX );
                    index += run*2;
                    continue;
                }
                while (count >= 2 &&                    // desc (8 byte form)
                        RelocAddr ( reloc ) == curpos &&
                        RelocIndex ( reloc ) == CODEINDEX &&
                        RelocAddr ( reloc+1 ) == curpos+4 &&
                        RelocIndex ( reloc+1 ) == DATAINDEX) {
                    if (count > 2) {                    // try to exclude 12 byte form
                        long addr = RelocAddr ( reloc+2 );
                        if (addr < curpos+8 || addr == curpos+12) break;
```

- 106 -

```
                }
                curpos += 8;
                reloc += 2;
                run++;
                count -= 2;
            }
            if (run > 1) {
                run--;
                dodelta ( relpos, delta );
                dorform ( krDSC2, run, ksDEMAX );
                index += run*2;
                continue;
            }
        }
        else if (run == 1 && rIndex == 1) {              // vtbl
            while (count >= 2 &&
                    RelocAddr ( reloc+1 ) == curpos+8 &&
                    RelocIndex ( reloc+1 ) == DATAINDEX &&
                    (count == 2 || RelocAddr ( reloc+2 ) >= curpos+16) ) {
                curpos += 8;
                reloc++;
                run++;
                count--;
            }
            if (run > 1) {
/*
                if (run <= ksDVRMAX) {
                    if (delta > ksDVDMAX || (delta & 3)) {
                        dodelta ( relpos, delta );
                        delta = 0;
                    }
                    dodform ( krDVBL, delta << 2, run-1 );
                }
                else
*/
                {
                    dodelta ( relpos, delta );
                    dorform ( krVTBL, run, ksVTMAX );
                }
                curpos += 8;
                reloc++;
                index += run;
                count--;
                continue;
            }
        } if ( rIndex == DATAINDEX && run <= ksDDRMAX ) {
            if (delta > ksDDDMAX || (delta & 3)) {
                dodelta ( relpos, delta );
                delta = 0;
            }
            dodform ( krDDAT, delta, run );
        }
        else {
            dodelta ( relpos, delta );
            dorform ( rIndex == 0 ? krCODE : krDATA, run, ksDATA );
        }
        curpos += 4;
        reloc++;
        index += run;
        count--;
    }

// flush rpt buffers - with the unmatchable and reserved instruction opcode.
    AddReloc ( 0, 1 );
```

- 107 -

```
        return 0;
    } /* RelCvt () */

    int FindStuff ( byte *theContainer )
    {
        fileHdrPtr    = (TFileHdrPtr)theContainer;
        auxHdrPtr     = (TAuxHdrPtr)(fileHdrPtr + 1);
        scnHdrs       = (TScnHdrPtr)(auxHdrPtr + 1);
        ldrScnHdr     = & scnHdrs [auxHdrPtr -> ahSnLoader-1];
        ldHdrPtr      = (TLdHdrPtr) (theContainer + ldrScnHdr -> shScnPtr);
        ldSyms        = (TLdSymPtr) (ldHdrPtr + 1);
        ldRelocs      = (TLdRelPtr) (ldSyms + ldHdrPtr->lhNSyms);
        ldStrings     = (byte *) ldHdrPtr + ldHdrPtr->lhSTOff;
        secNum [0] = auxHdrPtr -> ahSnText;
        secNum [1] = auxHdrPtr -> ahSnData;
        secNum [2] = auxHdrPtr -> ahSnBSS;

    /***********************************************************************
        codeScnHdr    = & scnHdrs [ secNum [0] - 1 ];
        codeStart     = theContainer + codeScnHdr -> shScnPtr;
        codeLen       = codeScnHdr -> shSize;
        codeVAddr     = (long) codeScnHdr -> shVAddr;

dataScnHdr    = & scnHdrs [ secNum [1] - 1 ];
        dataStart     = theContainer + dataScnHdr -> shScnPtr;
        dataLen       = dataScnHdr -> shSize;
        dataVAddr     = (long) dataScnHdr -> shVAddr;

bssScnHdr     = & scnHdrs [ secNum [2] - 1 ];
        bssLen        = bssScnHdr -> shSize;
        bssVAddr      = (long) bssScnHdr -> shVAddr;
        if (optBSSExpand) {
            bssStart  = Malloc ( bssLen );
            clearbytes ( bssStart, bssLen );
        }
    ***********************************************************************/
        if (auxHdrPtr -> ahSnText)
        {
            codeScnHdr    = & scnHdrs [ secNum [0] - 1 ];
            codeStart     = theContainer + codeScnHdr -> shScnPtr;
            codeLen       = codeScnHdr -> shSize;
            codeVAddr     = (long) codeScnHdr -> shVAddr;
        }
        else
        {
            codeScnHdr    = 0;
            codeStart     = 0;
            codeLen       = 0;
            codeVAddr     = 0L;
        }
        if (auxHdrPtr -> ahSnData)
        {
            dataScnHdr    = & scnHdrs [ secNum [1] - 1 ];
            dataStart     = theContainer + dataScnHdr -> shScnPtr;
            dataLen       = dataScnHdr -> shSize;
            dataVAddr     = (long) dataScnHdr -> shVAddr;
        }
        else
        {
            dataScnHdr    = 0;
            dataStart     = 0;
            dataLen       = 0;
```

- 108 -

```
            dataVAddr      = 0L;
         } if (auxHdrPtr -> ahSnBSS)
         {
            bssScnHdr      = & scnHdrs [ secNum [2] - 1 ];
            bssLen         = bssScnHdr -> shSize;
            bssVAddr       = (long) bssScnHdr -> shVAddr;
            if (optBSSExpand)
10       {
               bssStart    = Malloc ( bssLen );
               clearbytes ( bssStart, bssLen );
            }
         }
         else
         {
            bssScnHdr      = 0;
            bssLen         = 0;
            bssVAddr       = 0L;
            if (optBSSExpand)
            {
               bssStart    = (byte*)0;
            }
         }
   locNum [0] = 0;
         locNum [1] = 0;
         locNum [2] = scnHdrs [auxHdrPtr -> ahSnData - 1]. shSize;
         symCnt = ldHdrPtr -> lhNSyms;
         relCnt = ldHdrPtr -> lhNReloc;

return 0;
        } /* FindStuff () */ if 0
        long FindExportSectionNumber ( long exportNumber )
        {
           long secn;
        //--return exportSymbols [exportNumber]. sectionNumber;

for (secn = kReExportImport; secn < kMaxLoadableSections; secn++) {
              if (exportNumber >= loaderHdr [secn]. expFirst &&
                  exportNumber <  loaderHdr [secn]. expFirst + loaderHdr [secn]. numExports)
                 return secn;
           }

           return -1;
        } /* FindExportSectionNumber () */
        #endif

        #if 0
        int FindSymbol ( byte *name, long *secn, long *offset )
        {
           int i;
           int length;
           *secn = -1;
           *offset = -1;
           if (! name) return 0;

           length = strlen ( (char*) name );

for (i = 0; i < ldHdr. numExportSyms; i++) {
```

- 109 -

```
        if ( (exportSymbols [i]. hashword >> 16) != length) continue;
        if ( comparebytes ( exportSymbols [i]. nameOffset + stringTable, name, length ) ) {
            *secn = FindExportSectionNumber ( i );
            *offset = exportSymbols [i]. address;
            return i;
        }
    } printf ("# %s: Symbol %s not found\n", gToolName, name);
    return -1;
} /* FindSymbol () */
endif
long FindXCOFFIndexByName ( byte *name, TLdSymPtr ldSyms, long symCnt )
{
    TLdSymPtr sym;
    long symIndex;
    int nameLength;
    int xnamLen;
    byte *xnam;

nameLength = strlen ( (char *) name );
    for (symIndex = 0; symIndex < symCnt; symIndex++) {
        sym = & ldSyms [symIndex];
        if ( ! IsValidImport ( sym ) && ! IsValidExport ( sym ) ) continue;
        GetName ( sym, & xnam, & xnamLen );
        if ( xnamLen == nameLength &&
            comparebytes ( xnam, name, nameLength ) ) return symIndex;
    } return -1;
} /* FindXCOFFIndexByName () */ int CheckLibOpt ( byte **namep, int *nameLengthp, TVersion *linkedVer, TVersion *oldImpVer,
    TBoolean *iB )
    {
        int i;
        byte *libStr;
        int nl;
        *linkedVer = kDefVersion;
        *oldImpVer = kDefVersion;
        *iB      = 0;

        for (i = 0; i < libOpts; i++) {
            libStr = libInfo [i];
            nl = mchlen ( libStr, (byte *) "=#-!~" );
            if ( nl == *nameLengthp && comparebytes ( libStr, *namep, nl ) ) {
                for (;;) {
                    switch ( libStr [nl] ) {
                    case '\0': break;
                    case '=' : libStr += nl + 1;
                               nl = mchlen ( libStr, (byte *) "=#-!~" );
                               *namep = libStr;
                               *nameLengthp = nl;
                               continue;
                    case '#' : *oldImpVer = *linkedVer = GetInt ( libStr + nl + 1, & libStr, 0 );
nl = 0; continue;
                    case '-' : *oldImpVer = GetInt ( libStr + nl + 1, & libStr, 0 ); nl = 0;
   continue;
//                  case ')' : nl++; continue;
                    case '!' : nl++; *iB |= kInitBefore; continue;
```

Attorney Docket No.: APPL:P-2008CIP1MCF/WSW
/wsw/appl/2008cip1.001

Client Ref: P877X HSP

- 110 -

```
                 case '~' : nl++; *iB |= kWeakImport; continue;
               }
               break;
             }
           break;
         }
       }
       return 0;
     } /* CheckLibOpt () */ int ProcessExportList ( void )
     {
       int    err;
       byte  *buf, *ptr, *end;
       long   len;
       long   index;

err = OpenRead ( expFileName, & buf, & len );
       if (err) return err;

end = buf + len;

for ( ptr = buf; ptr < end; ) {
         if (*ptr++ == '\n') addExpCnt++;
       } addExpAry = (AddExpType *) Malloc ( addExpCnt * sizeof (AddExpType) );
       if (! addExpAry) {
         printf ("# %s: Could not allocate %d bytes\n", gToolName, addExpCnt * sizeof
     (AddExpType));
         return -1;
       } index = 0;
       for ( ptr = buf; ptr < end; ) {
         while (ptr < end && (*ptr == ' ' || *ptr == '\t')) ptr++;
         if ( *ptr == '@' ) {
           ptr++;
           if ( ptr >= end ) goto ExpErr;
           // format @oldname newname
           addExpAry [index]. format = kEquivalence;
           addExpAry [index]. oldname = ptr;
           while (ptr < end &&
                  (*ptr != ' ' && *ptr != '\t' && *ptr != '\r' && *ptr != '\n')) ptr++;
           if (ptr >= end) goto ExpErr;
           *ptr++ = 0;
         }
         else {
           addExpAry [index]. format = kAbsolute;
           // format sec#:offset class newname
             addExpAry [index]. secn = GetInt ( ptr, & ptr, end );
             if (*ptr++ != ':' || ptr > end) goto ExpErr;
             addExpAry [index]. offset = GetInt ( ptr, & ptr, end );
             while (ptr < end && (*ptr == ' ' || *ptr == '\t')) ptr++;
             if (ptr >= end) goto ExpErr;
             addExpAry [index]. class = GetInt ( ptr, & ptr, end);
         }
         while (ptr < end && (*ptr == ' ' || *ptr == '\t')) ptr++;
         if (ptr >= end) goto ExpErr;
         addExpAry [index]. name = ptr;
         while (ptr < end && *ptr != '\r' && *ptr != '\n') ptr++;
         if (ptr >= end) goto ExpErr;
         *ptr++ = 0;
         index++;
       }
```

- 111 -

```
        //-- don't unmap, its in use! ReleaseFile ( buf, len );

return 0;

    ExpErr :
        printf ("# %s: error in export list, line %d\n", gToolName, index-1);
        return -1;
     ) /* ProcessExportList () */

     int CheckXCOFF ( byte *theContainer )
     {
         TFileHdrPtr    fileHdrPtr    = (TFileHdrPtr)theContainer;
         TAuxHdrPtr     auxHdrPtr     = (TAuxHdrPtr)(fileHdrPtr + 1);
         /* Verify that the container is valid XCOFF. The "file" header must have */
         /* the right magic number, the right size for the auxiliary header, and  */
         /* executable and dynamic load flags must be set. The auxiliary header   */
         /* must have the right version number and non-zero section numbers for   */
         /* the .text, .data, .bss, and .loader sections.
             */
         /* ------------------------------------------------------------------ */ if (fileHdrPtr->fhMagic != AIXPowerPCMagic ||
              fileHdrPtr->fhOptHdr != sizeof(TAuxHdr) ||
              ! IsExec(*fileHdrPtr) ||
              ! IsDynLoad(*fileHdrPtr) ) return badUnitErr;

/************************************************************
         if (auxHdrPtr->ahVStamp != kXCOFFVersion ||
             auxHdrPtr->ahSnText == 0 ||
             auxHdrPtr->ahSnData == 0 ||
             auxHdrPtr->ahSnBSS == 0 ||
             auxHdrPtr->ahSnLoader == 0 ) return badUnitErr;
     ************************************************************/ if (auxHdrPtr->ahVStamp != kXCOFFVersion ||
             auxHdrPtr->ahSnLoader == 0 ) return badUnitErr;

         return 0;
     ) /* CheckXCOFF () */

     int OpenRead ( byte *fName, byte **buffer, long *length )
     {
         short refNum;
         byte *ptr;
         long len;
         long err;
         Str255 pName;

err = MakePStr ( fName, strlen ( (char*) fName ), pName, sizeof pName );
         if (err) return err;
         err = HOpenDF ( 0, 0, pName, fsRdPerm, & refNum );
         if (err) { printf ("# %s: Could not open input file %s %d\n", gToolName, fName, err);
     return -1; )

         err = GetEOF ( refNum, & len );
         if (err) { FSClose ( refNum ); printf ("# %s: Could not seek in %s %d\n", gToolName,
     fName, err); return -1; )

ptr = (byte *) NewPtr ( len );
         if (! ptr) { FSClose ( refNum ); printf ("# %s: Could not allocate %d bytes\n",
     gToolName, len); return -1; )
```

- 112 -

```
        err = FSRead ( refNum, & len, ptr );
        if (err) { FSClose ( refNum ); printf ("# %s: Could not read %s %d\n", gToolName, fName,
    err); return -1; }

       FSClose ( refNum );

*buffer = ptr;
        *length = len;

        return 0;
    } /* OpenRead () */ void movebytes ( byte *s, byte *t, long length )
    {
        while (--length >= 0) *t++ = *s++;
    } /* movebytes () */

    void clearbytes ( byte *t, long length )
    {
        while (--length >= 0) *t++ = 0;
    } /* clearbytes () */

    int comparebytes ( byte *s, byte *t, int length )
    {
        while (--length >= 0) if (*s++ != *t++) return 0;
        return 1;
    } /* comparebytes () */ byte mem [1];

byte *Malloc ( long len )
    {
        extern byte *malloc ( long len );

if (! len) return mem;
        return (byte*) (malloc ( len ));
    } /* Malloc () */ void Free ( byte *tofree )
    {
    #pragma unused(tofree)
        extern void free ( byte * );

/*  hal don't free anything,
            since we are almost never doing so anyway,
        and we are mixing NewPtr with Malloc (yuk)
        if ( tofree != mem )
            free (tofree);
    */
    } /* Free () */
    long Write ( int fd, byte *buf, long len )
    {
        int err;
        if (! len) return 0;
        err = FSWrite ( fd, & len, buf );
        if (err) return err;
        return len;
    } /* Write () */

    long GetInt ( byte *ptr, byte **out, byte *end )
    {
```

- 113 -

```
          Boolean neg = 0;
          long value = 0;
          int mp = 10;
          int off;
          if (! end) end = ptr + 16;
          while (ptr < end && (*ptr == ' ' || *ptr == '\t')) ptr++;
          if (*ptr == '-') { neg = 1; ptr++; }
          if (*ptr == '0') {
              ptr++;
              if (*ptr == 'x') { ptr++; mp = 16; }
              else             { mp = 8; }
          }

          while (ptr < end && *ptr) {
              if      (*ptr >= '0' && *ptr <= '9') off = '0';
              else if (*ptr >= 'a' && *ptr <= 'f') off = 'a' - 10;
              else if (*ptr >= 'A' && *ptr <= 'F') off = 'A' - 10;
              else break;
              value *= mp;
              value += *ptr++ - off;
          }
          if (out)
              *out = ptr;
          return neg ? -value : value;
      } /* GetInt () */ int mchlen ( byte *str, byte *mch )
      {
          int len = 0;
          byte *mptr;
          byte ch;

          for (;;) {
              ch = *str++;
              if (! ch) return len;
              mptr = mch;
              while (*mptr) if (*mptr++ == ch) return len;
              len++;
          }
      } /* mchlen () */

45    int Log2 ( unsigned long aln )
      {
          int i;

aln--;
          for (i = 0; aln; i++) aln >>= 1;
          return i;
      } /* Log2 () */

      OSErr MakePStr ( byte *src, int len, byte *trg, int max )
      {
          if (len >= max) return ioErr;

movebytes ( src, trg+1, len );
          *trg = (byte) len;

return noErr;
      } /* MakePStr () */

          /* UNIX -> MAC date convert. Runs on UNIX only */
```

- 114 -

```
include <time.h> long MacTime(long unixTime)
{
    static time_t convert = 0;

if ( unixTime == 0 ) return 0;

if(!convert)
    {
    time_t gmt = time(0);
    struct tm local = *localtime(&gmt);

convert = mktime(&local) - mktime(gmtime(&gmt));
    if(local.tm_isdst)
        convert += 60 * 60;

convert += 0x7c25b080;  /* magic number for 1/1/70 in mac time */
    }
    return unixTime + convert;
} void convertString2Long (byte* theString, unsigned long* theLong)
{
    *theLong = (((long)(theString[0] << 24) + (long)(theString[1] << 16) + (long)(theString[2]
<< 8) + (long)theString[3]);
} if MAC
long GetFileTime ( byte *fileName )
{
    CInfoPBRec  pb;
    OSErr err;
    Str255  pName;

err = MakePStr ( fileName, strlen ( (char*) fileName ), pName, sizeof pName );
    if (err) return 0;

clearbytes ( (byte *) & pb, sizeof pb );

pb. hFileInfo. ioNamePtr = pName;

err = PBGetCatInfo ( & pb, FALSE );
        if ( err ) return 0;

return pb. hFileInfo. ioFlMdDat;
} /* GetFileTime () */
endif int CountCompareBytes ( register byte *s, register byte *t, register int length )
{
    int fullLength = length;
    while (--length >= 0) if (*s++ != *t++) return fullLength-length-1;
    return fullLength;
} /* CountCompareBytes () */ long CountZeroBytes ( byte *src, long length )
```

- 115 -

```
{
    long cnt = 0;
    while ( --length >= 0 ) {
        if ( *src++ == 0 ) cnt++;
    }
    return cnt;
} /* CountZeroBytes () */ define kMaxForwardMatch 12 typedef struct {
    long opcode;
    long matchLen;
    long diffCnt;
    long rptCnt;
    long backup;

byte *ptr;
    byte *end;

long coverage;
    long cost;
    long overhead;
    long gain;
} PackInstr, *PackInstrPtr;

byte *gBlockStart;
/*
    RBLK   rptCnt,    matchCnt,   diffCnt
    RBLK   rptCnt=1,  matchCnt=0, diffCnt=x   ==> BLK x
    RBLK   rptCnt=x,  matchCnt=y, diffCnt=0   ==> RPT y,x
*/ byte *targetBuf, *targetEnd;

OSErr EmitBytes ( byte *pointer, long count )
{
    register long cnt = count;
    register byte *ptr = pointer;
    int lp = 0;

if ( cnt <= 0 ) return noErr;

if ( targetBuf + cnt >= targetEnd ) return -1;

while ( --cnt >= 0 ) {
        *targetBuf++ = *ptr++;
    } if DEBUG
    ptr = pointer;
    cnt = count;
    printf ("         ");
    while ( --cnt >= 0 ) {
        printf (" %02x", *ptr++);
        if ( ++lp == 15 ) {
            printf ("\n");
            printf ("         ");
            lp = 0;
        }
    }
    printf ("\n");
```

- 116 -

```
        if ( debug ) fflush ( stdout );
    #endif return noErr;
    } /* EmitBytes () */

PackInstr bufInst;
    PackInstr newInst;

OSErr EmitCount ( long count )
    {
        if ( count < 0 ) return noErr;
        if ( targetBuf >= targetEnd-5 ) return -1;

if ( count <= 127 ) {
            *targetBuf++ = count;
        }
        else if ( count <= (127<<7) + 127 ) {
            *targetBuf++ = (count >> 7) | 0x80;
            *targetBuf++ = count & 0x7f;
        }
        else if ( count <= ((127<<7)+127<<7) + 127 ) {
            *targetBuf++ = (count >> 14 ) | 0x80;
            *targetBuf++ = (count >> 7) | 0x80;
            *targetBuf++ = count & 0x7f;
        }
        else if ( count <= (((127<<7)+127<<7)+127<<7) + 127 ) {
            *targetBuf++ = (count >> 21 ) | 0x80;
            *targetBuf++ = (count >> 14 ) | 0x80;
            *targetBuf++ = (count >> 7) | 0x80;
            *targetBuf++ = count & 0x7f;
        }
        else {
            *targetBuf++ = (count >> 28 ) | 0x80;
            *targetBuf++ = (count >> 21 ) | 0x80;
            *targetBuf++ = (count >> 14 ) | 0x80;
            *targetBuf++ = (count >> 7) | 0x80;
            *targetBuf++ = count & 0x7f;
        } return noErr;
    } /* EmitCount () */

OSErr EmitOpcode ( byte op, long count )
    {
        if ( count <= 0 ) return noErr;

if ( targetBuf >= targetEnd ) return -1;

if ( count <= kFirstOperandMask ) {
            *targetBuf++ = (op << kOpcodeShift) + count;
            return noErr;
        }

*targetBuf++ = (op << kOpcodeShift);
        return EmitCount ( count );
    } /* EmitOpcode () */

OSErr EmitOneInst ( byte ch, PackInstrPtr ibp )
    {
    #pragma unused(ch)
        long cnt;
```

- 117 -

```
            byte *ptr;
            OSErr err;

if ( ibp -> opcode == kNoOpcode ) return noErr;
    #if DEBUG
            printf ("%c%04lx-%04lx",
                    ch,
                    ibp -> ptr - gBlockStart,
                    ibp -> end - gBlockStart - 1);
    #endif switch ( ibp -> opcode ) {
            case kZero  :
                    err = EmitOpcode ( kZero, ibp -> rptCnt );
                    if ( err ) return err;

//              printf (" ZRO    #%d\n", ibp -> rptCnt );
    #if DEBUG
                    printf (" ZRO    #%d", ibp -> rptCnt );
                    printf ("\tv=%d,c=%d,o=%d,g=%d\n",
                        ibp -> coverage,
                        ibp -> cost,
                        ibp -> overhead,
                        ibp -> gain );
    #endif
                    break;
            case kBlock :
                    err = EmitOpcode ( kBlock, ibp -> diffCnt );
                    if ( err ) return err;
    //              printf (" BLK    #%d\n", ibp -> diffCnt );
    #if DEBUG
                    printf (" BLK    #%d", ibp -> diffCnt );
                    printf ("\tv=%d,c=%d,o=%d,g=%d\n",
                        ibp -> coverage,
                        ibp -> cost,
                        ibp -> overhead,
                        ibp -> gain );
    #endif
                    err = EmitBytes ( ibp -> ptr, ibp -> diffCnt );
                    if ( err ) return err;
                    break;
            case kRepeat:
                    err = EmitOpcode ( kRepeat, ibp -> diffCnt );
                    if ( err ) return err;
    //              printf (" RPT    #%d*%d\n", ibp -> matchLen, ibp -> diffCnt );
    #if DEBUG
                    printf (" RPT    #%d*%d", ibp -> matchLen, ibp -> diffCnt );
                    printf ("\tv=%d,c=%d,o=%d,g=%d\n",
                        ibp -> coverage,
                        ibp -> cost,
                        ibp -> overhead,
                        ibp -> gain );
    #endif
                    err = EmitBytes ( ibp -> ptr, ibp -> matchLen );
                    if ( err ) return err;
                    break;
            case kRepeatBlock :
                    if ( ibp -> diffCnt == 0 ) {
                        err = EmitOpcode ( kRepeat, ibp -> matchLen );
                        if ( err ) return err;
                    }
                    else {
                        err = EmitOpcode ( kRepeatBlock, ibp -> matchLen );
                        if ( err ) return err;
                        err = EmitCount ( ibp -> diffCnt );
                        if ( err ) return err;
```

- 118 -

```
                        )
                        err = EmitCount ( ibp -> rptCnt - 1 );
                        if ( err ) return err;
        //                  printf (" RBLK    #(%d,%d)*%d\n", ibp -> matchLen, ibp -> diffCnt, ibp ->
        rptCnt );
        #if DEBUG
                        printf (" RBLK    #(%d,%d)*%d", ibp -> matchLen, ibp -> diffCnt, ibp ->
        rptCnt );
                        printf ("\tv=%d,c=%d,o=%d,g=%d\n",
                           ibp -> coverage,
                           ibp -> cost,
                           ibp -> overhead,
                           ibp -> gain );
        #endif
                        err = EmitBytes ( ibp -> ptr, ibp -> matchLen );
                        if ( err ) return err;
                        cnt = ibp -> rptCnt - 1;
                        ptr = ibp -> ptr + ibp -> matchLen;
                        while ( --cnt >= 0 ) {
                           err = EmitBytes ( ptr, ibp -> diffCnt );
                           if ( err ) return err;
                           ptr += ibp -> matchLen + ibp -> diffCnt;
                        }
                        break;
             case kRepeatZero :
                        err = EmitOpcode ( kRepeatZero, ibp -> matchLen );
                        if ( err ) return err;
                        err = EmitCount ( ibp -> diffCnt );
                        if ( err ) return err;
                        err = EmitCount ( ibp -> rptCnt - 1 );
                        if ( err ) return err;
        //                  printf (" RZRO    #(%d,%d)*%d\n", ibp -> matchLen, ibp -> diffCnt, ibp ->
        rptCnt );
        #if DEBUG
                        printf (" RZRO    #(%d,%d)*%d", ibp -> matchLen, ibp -> diffCnt, ibp ->
        rptCnt );
                        printf ("\tv=%d,c=%d,o=%d,g=%d\n",
                           ibp -> coverage,
                           ibp -> cost,
                           ibp -> overhead,
                           ibp -> gain );
        #endif
                        cnt = ibp -> rptCnt - 1;
                        ptr = ibp -> ptr + ibp -> matchLen;
                        while ( --cnt >= 0 ) {
                           err = EmitBytes ( ptr, ibp -> diffCnt );
                           if ( err ) return err;
                           ptr += ibp -> matchLen + ibp -> diffCnt;
                        }
                        break;
             default    :
        #if DEBUG
                        printf ("??? %d\n", ibp -> opcode);
        #endif
                        break;
           }

/*
           if ( ch == '=' )
              gPackedSize += ibp -> overhead + ibp -> cost;
        */ ibp -> opcode = kNoOpcode;
        #if DEBUG
           if ( debug ) fflush ( stdout );
        #endif
```

Attorney Docket No.: APPL:P-2008CIP1MCF/WSW
/wsw/appl/2008cip1.001                                                                    Client Ref: P877X HSP

- 119 -

```
        return noErr;
    } /* EmitOneInst () */

    OSErr EmitInst ( PackInstrPtr pi )
    {
        OSErr err;

if ( pi -> opcode == kNoOpcode ) return noErr;
        err = EmitOneInst ( '=', pi );
        pi -> opcode = kNoOpcode;
        return err;
    } /* EmitInst () */

    int Matches ( register byte *ptr, register byte *end, PackInstrPtr bestInstr )
    {
        register long  distance;
        register long  matchLen;
        register long  rptCnt;
        long bestMatchLen;
        long repeatedZeros;
        long zeroBytes;
        byte *match;
        byte found;
        byte tryShorter;
        byte ch;
        PackInstr thisInstr;
        long backup;
        long backupCnt;
        long backupRptCnt;
        long fwd;
        long fwdCnt;
        long fwd3Cnt;
        long fwdRptCnt;
        long fwd3RptCnt;
        long thisFwd;
        long matchCount;

        clearbytes ( (byte *) bestInstr, sizeof *bestInstr );
        found = FALSE;

bestMatchLen = 0;

        ch = *ptr;
        for ( distance = 1; distance <= kMaxForwardMatch; distance++ ) {
            if ( ptr + distance >= end ) break;
            if ( ch != ptr [distance] ) continue;
            // found a potential match
            for ( matchLen = 1; matchLen < distance; matchLen++ ) {
                if ( ptr + distance + matchLen >= end ) break;
                if ( ptr [matchLen] != ptr [distance + matchLen] ) break;
            }

            if ( matchLen <= bestMatchLen ) continue;
            bestMatchLen = matchLen;

Shorter:

            tryShorter = FALSE;

repeatedZeros = CountZeroBytes ( ptr, matchLen );
            // if ( repeatedZeros == matchLen ) then we know it is
            //                    a repeated zero
            //                    type of match thisInstr. diffCnt  = distance - matchLen;
```

- 120 -

```
        if ( thisInstr. diffCnt == 0 && matchLen > 1 ) {
           // remember, diff count is zero
           // so, this is a repeat only
           if ( repeatedZeros == matchLen ||
               matchLen >= 5 &&
               5 * repeatedZeros >= 3 * matchLen )
              continue;
        }
        thisInstr. backup = 0;
        backup = 0;
        backupCnt = 0;
        backupRptCnt = 0;
        fwd = 0;
        fwdCnt = 0;
        fwdRptCnt = 0;
        fwd3Cnt = 0;
        fwd3RptCnt = 0;
        match = ptr;
        zeroBytes = 0;
        for ( rptCnt = 1; ; rptCnt++ ) {
           match += distance;
           if ( match + matchLen >= end ) break;

matchCount = CountCompareBytes ( ptr, match, matchLen );

if ( matchCount < matchLen ) {
              if ( matchCount ) tryShorter = TRUE;
              break;
           }

// match of at least one (ie: rpt of 2)
           // now, see if it is practical to go backward
           // to extend the match
           // or should this be an on going thing
           if ( backup == 0 ) {
              backupRptCnt = rptCnt;
              while ( backup < thisInstr. diffCnt &&
                      bufInst. opcode == kZero &&
                      backup < bufInst. rptCnt &&
                      ptr [-backup-1] == match [-backup-1] ) {
                 backup++;
              }
           }
           // count backup byte compares
           else if ( comparebytes ( ptr-backup, match-backup, backup ) ) {
              backupCnt++;
           }
           else {
              // we couldn't continue the backup.
              // is it worth stopping the match just to allow the backup?
              // or, deleting the back up?
              if ( backupCnt > 3 ) {
                 // it was worth it :
                 // so, either use the backup
                 // or stop this repeat short of it
                 if ( backupRptCnt != 1 )
                 rptCnt = backupRptCnt - 1;  /* ! to try to catch the backup next time! */
                 break;
              }
              backup = 0;
              backupCnt = 0;
              backupRptCnt = 0;
           }
```

- 121 -

```
            if ( thisInstr. diffCnt ) {

// count forward compares
                thisFwd = CountCompareBytes ( match - thisInstr. diffCnt, match + matchLen,
        thisInstr. diffCnt );
                if ( fwd == 0 ) {
                    if ( thisFwd ) {
                        fwd = thisFwd;
                        fwdCnt = 1;
                        fwdRptCnt = rptCnt-1;
                    }
                }
                else if ( thisFwd ) {
                    // some match larger than the current instruction
                    fwdCnt++;
                }
                else {
                    // extra match count no longer present
                    if ( fwdCnt >= matchLen + 3 ) {
                        // this match cnt is noteworthy:
                        // record repeat count of this match
                        // to stop at, so that a resart can
                        // catch this new longer match
                        if ( fwd3Cnt == 0 ) fwd3RptCnt = fwdRptCnt;
                        if ( ++fwd3Cnt >= 2 ) {
                            fwd = 0;
                            rptCnt = fwd3RptCnt;
                            break;
                        }
                    }
                    fwd = 0;
                    fwdCnt = 0;
                    fwdRptCnt = 0;
                }
                zeroBytes += CountZeroBytes ( match - thisInstr. diffCnt /* matchLen */,
        thisInstr. diffCnt );
                if ( repeatedZeros == matchLen ) {
                    if ( zeroBytes == thisInstr. diffCnt ||
                        3 * zeroBytes >= thisInstr. diffCnt * rptCnt ) break;
                }
                else {
#if trim
                    if ( 5 * zeroBytes >= 3 * thisInstr. diffCnt * rptCnt ) break;
45 #endif
                }
            }
        }

        if ( fwd && fwdCnt > 3 ) {
            // stopped in the middle of a match
            // that had an extended match
            rptCnt = fwdRptCnt;
        }
        if ( rptCnt < 2 ) continue;
        if ( rptCnt == 2 && matchLen == 1 && thisInstr. diffCnt == 1 ) continue;

// trim last repeat off of a RZRO if its diffpart is all zeros
        // ?? if ( repeatedZeros == )

// match a dist, mlen, for rptCnt

// did we stop with a good backup?
        if ( backup && backupRptCnt == 1 )
            thisInstr. backup = backup;
```

- 122 -

```
        // determine 1) coverage
        //           2) cost
        //           3) overhead thisInstr. coverage  = distance * (rptCnt - 1) + matchLen;
        thisInstr. ptr       = ptr;
        thisInstr. end       = ptr + thisInstr. coverage;
        if ( thisInstr. backup ) {
           matchLen += thisInstr. backup;
           thisInstr. diffCnt -= thisInstr. backup;
           thisInstr. ptr     -= thisInstr. backup;
           thisInstr. coverage += thisInstr. backup;
           repeatedZeros += CountZeroBytes ( thisInstr. ptr, thisInstr. backup );
        } if ( repeatedZeros == matchLen ) {
           if ( thisInstr. diffCnt == 0 ) {
              thisInstr. opcode   = kZero;
              thisInstr. cost     = 0;
           }
           else {
              thisInstr. opcode   = kRepeatZero;
              thisInstr. cost     = (rptCnt - 1) * thisInstr. diffCnt;
           }
        }
        else {
           thisInstr. cost      = matchLen + (rptCnt - 1) * thisInstr. diffCnt;
           thisInstr. opcode    = kRepeatBlock;
        }
        thisInstr. overhead   = (matchLen != 0) + (thisInstr. diffCnt != 0) + 1;

if ( thisInstr. cost == 0 )
           thisInstr. gain = thisInstr. coverage * ( 78 - thisInstr. overhead );
        else
           thisInstr. gain      = ( thisInstr. coverage * 100 ) / ( thisInstr. cost +
    thisInstr. overhead );

// thisInstr. gain -= thisInstr. overhead;
        //thisInstr. gain       = thisInstr. coverage - thisInstr. cost - thisInstr. overhead;

// done later :
        // if ( thisInstr. gain < 122 ) continue;

// these next 5 are really part of the if
        // but hear because they are useful for
        // the debugging in the else part
        thisInstr. matchLen  = matchLen;
        thisInstr. rptCnt    = rptCnt;

if ( thisInstr. gain >= 104 &&
             ( ! found || thisInstr. gain > bestInstr -> gain ) ) {
           found = TRUE;

*bestInstr = thisInstr;
           if ( thisInstr. diffCnt == 0 &&
                thisInstr. coverage >= kMaxForwardMatch ) break;
#if DEBUG
           if ( debug )
              EmitOneInst ( '+', & thisInstr );
#endif
        }
        else {
#if DEBUG
           if ( debug )
              EmitOneInst ( '-', & thisInstr );
#endif
```

- 123 -

```
            }
            if ( tryShorter ) {
               matchLen = matchCount;
               goto Shorter;
            }
         } return found;
   } /* Matches () */

OSErr PackData ( register byte *ptr, register byte *end, byte *target, byte **tend )
   {
      OSErr err;

targetBuf = target;
      targetEnd = *tend;

gBlockStart = ptr;

bufInst. opcode = kNoOpcode;
      bufInst. end    = 0;

while ( ptr < end ) {
         if ( Matches ( ptr, end, & newInst ) ) { if ( newInst. backup ) {
               bufInst. rptCnt -= newInst. backup;
               if ( bufInst. rptCnt == 0 )
                  bufInst. opcode = kNoOpcode;
            } if ( ptr >= bufInst. end ) {
               err = EmitInst ( & bufInst );
               if ( err ) return err;
            }
            bufInst = newInst;

// for now, advance
            ptr = newInst. end;
            continue;

}
         else {
            if ( bufInst. opcode == kBlock ) {
               bufInst. diffCnt++;
               bufInst. end++;
               bufInst. cost++;
               bufInst. coverage++;
               // bufInst. gain++;
            }
            else {
               err = EmitInst ( & bufInst );
               if ( err ) return err;

clearbytes ( (byte *) & bufInst, sizeof bufInst );
               bufInst. opcode   = kBlock;
               bufInst. diffCnt  = 1;
               bufInst. rptCnt   = 1;
               bufInst. ptr      = ptr;
               bufInst. end      = ptr+1;
               bufInst. coverage = 1;
               bufInst. cost     = 1;
               bufInst. overhead = 1;
               bufInst. gain     = 100 - 1;
```

- 124 -

```
                }
            }
            ptr++;
        }
        EmitInst ( & bufInst );

*tend = targetBuf;

return noErr;
    } /* PackData () */ pascal void BlockClear ( void *s, long l )
    {
        clearbytes ( (byte *) s, (long) l );
    } /* BlockClear () */ long GetCount ( register byte *ptr, byte **nxt )
    {
        register long value = *ptr++;
        register byte nextB;

if ( value & 0x80 ) {
            nextB = *ptr++;
            value = (value & 0x7f) << 7;
            if ( nextB & 0x80 ) {
                value += nextB & 0x7f;
                nextB = *ptr++;
                value <<= 7;
                if ( nextB & 0x80 ) {
                    value += nextB & 0x7f;
                    nextB = *ptr++;
                    value <<= 7;
                    if ( nextB & 0x80 ) {
                        value += nextB & 0x7f;
                        nextB = *ptr++;
                        value <<= 7;
                    }
                }
            }
            value += nextB;
        }
        *nxt = ptr;
        return value;
    } /* GetCount () */

OSErr UnpackData ( register byte *ptr, register byte *end, register byte *trg, byte *tend )
    {
        byte *startPtr = ptr;
        register byte u1;
        register long cnt;
        register long cntX;
        register long rep;
        register long dif;
        register long offset;
        byte *nxt;
#if DEBUG
        printf ("ptr = %x,m end = %x\n", ptr, end );
endif while ( ptr < end ) {
            u1 = *ptr++;
            if ( u1 & kFirstOperandMask ) cnt = u1 & kFirstOperandMask;
```

- 125 -

```
        else {
            cnt = GetCount ( ptr, & nxt );
            ptr = nxt;
            // we know the count is larger than kFirstOperandMask (about 31)
            switch ( u1 >> kOpcodeShift ) {
            case kZero :
#if DEBUG
                                printf ( "  ZROx %3d\n", cnt );
#endif
                                if ( trg+cnt > tend ) return -1;
                                BlockClear ( trg, cnt );
                                trg += cnt;
                                continue;
            case kBlock :
   #if DEBUG
                                printf ( "  BLKx %3d\n", cnt );
#endif
                                if ( trg+cnt > tend ) return -1;
                                BlockMove ( ptr, trg, cnt );
                                ptr += cnt;
                                trg += cnt;
                                continue;
            }
        }
        switch ( u1 >> kOpcodeShift ) { default :
                                printf ( "# %s: Unknown opcode %d\n", gToolName, u1 >>
   kOpcodeShift );
                                goto EBOT;

case kZero          :
#if DEBUG
                                printf ( "  ZRO %3d\n", cnt );
#endif
                                if ( trg+cnt > tend ) goto EBOT;
                                while ( --cnt >= 0 ) { *trg++ = 0; }
                                break;
            case kBlock         :
#if DEBUG
                                printf ( "  BLK %3d\n", cnt );
#endif
                                if ( trg+cnt > tend ) goto EBOT;
                                while ( --cnt >= 0 ) { *trg++ = *ptr++; }
                                break;

case kRepeat        :
                                rep = GetCount ( ptr, & nxt ) + 1;
                                ptr = nxt;
#if DEBUG
                                printf ( "  RPT %3d,%3d\n", cnt, rep );
#endif
                                if ( cnt == 1 ) {
                                    // repeat one byte over and over,
                                    // common enough to test for and optimize
                                    u1 = *ptr++;
                                    if ( trg+rep > tend ) goto EBOT;
                                    while ( --rep >= 0 ) {
                                       *trg++ = u1;
                                    }
                                    break;
                                }
65                              while ( --rep >= 0 ) {
                                    ptr = nxt;
                                    cntX = cnt;
```

- 126 -

```
                                if ( trg+cntX > tend ) goto EBOT;
                                while ( --cntX >= 0 ) {
                                    *trg++ = *ptr++;
                                }
                            }
                            break;

case kRepeatZero :
                            dif = GetCount ( ptr, & nxt );
                            ptr = nxt;
                            rep = GetCount ( ptr, & nxt );
                            ptr = nxt;
#if DEBUG
                            printf ( "  RPTZ  %3d,%3d,%3d\n", cnt, dif, rep+1 );
#endif
                            // NOTE: rep counts the # of dif parts
                            // which equals the repeated parts - 1
                            // so, we don't rep--;

offset = 0;
                            // do repeated part first
                            goto L1;

while ( --rep >= 0 ) {
                                // do diff part
                                ptr += offset;
                                cntX = dif;
                                if ( trg+cntX > tend ) goto EBOT;
                                while ( --cntX >= 0 ) {
                                    *trg++ = *ptr++;
                                }
                                offset += dif;
            L1 :                // do repeated part
                                ptr  = nxt;
                                cntX = cnt;
                                if ( trg+cntX > tend ) goto EBOT;
                                while ( --cntX >= 0 ) {
                                    *trg++ = 0;
                                }
                            }
                            ptr += offset;
                            break;

case kRepeatBlock : dif = GetCount ( ptr, & nxt );
                            ptr = nxt;
                            rep = GetCount ( ptr, & nxt );
                            ptr = nxt;
#if DEBUG
                            printf ( "  RPTB  %3d,%3d,%3d\n", cnt, dif, rep+1 );
#endif
                            // NOTE: rep counts the # of dif parts
                            // which equals the repeated parts - 1
                            // so, we don't rep--;

offset = 0;
                            // do repeated part first
                            goto L2;

while ( --rep >= 0 ) {
                                // do diff part
                                ptr += offset;
                                cntX = dif;
                                if ( trg+cntX > tend ) goto EBOT;
                                while ( --cntX >= 0 ) {
                                    *trg++ = *ptr++;
                                }
```

- 127 -

```
                            offset += dif;

L2 :                    // do repeated part
                            ptr = nxt;
                            cntX = cnt;
                            if ( trg+cntX > tend ) goto EBOT;
                            while ( --cntX >= 0 ) {
                               *trg++ = *ptr++;
                            }
                            ptr += offset;
                            break;

}
    } return noErr;

EBOT :
        printf ( "# %s: Unpack Error @ %d\n", gToolName, --ptr -  startPtr );
        return -1;
    } /* UnpackData () */ byte *PartialName ( byte *name )
    {
      byte *end;

for ( end = name + strlen ( (char *) name );
            end > name;
            end-- ) { if ( end [-1] == ':' || end [-1] == '/' ) break;

} return end;
    } /* PartialName () */
```

We claim:

1. A computer readable storage medium carrying a file for loading into a computer system memory for execution by a computer system, said file comprising:

at least one loadable section including a first loadable section;

a symbol import portion which when interpreted by a computer system associates a plurality of import symbol names with respective import symbol numbers; and a symbol export portion which when interpreted by a computer system associates a plurality of export symbol names with respective export symbol location values, a first one of said export symbol location values including a pointer to a location in said first loadable section, said symbol export portion being non-interspersed with said symbol import portion and non-interspersed with said first loadable section.

2. A medium according to claim 1, wherein said symbol import portion comprises an import symbol table having a respective import table entry corresponding to each of said import symbol names, each given one of said import table entries having a respective location in said table and identifying the import symbol name to which said given entry corresponds, the import symbol number associated with each of said import symbol names being derivable from the location of the import table entry corresponding to the import symbol name in said import symbol table.

3. A medium according to claim 2, wherein said file further comprises a string table containing said import symbol names, wherein all of the entries in said import symbol table are in a common address map, and wherein each of said entries in said import symbol table includes an offset into said string table to identify the import symbol name to which the entry corresponds.

4. A medium according to claim 2, wherein the import symbol numbers for all of said import symbol names collectively constitute a series of consecutive integers.

5. A medium according to claim 1, wherein each of said export symbol location values is a member of a group consisting of (a) a pointer to a location in said file and (b) an import symbol number.

6. A medium according to claim 1, wherein said symbol export portion comprises an export symbol table having an export table entry corresponding to each of said export symbol names, each of said export table entries identifying the export symbol name to which it corresponds and the export symbol location value associated with the export symbol name to which it corresponds.

7. A medium according to claim 6, wherein said export symbol table is hashed.

8. A medium according to claim 6, wherein said file further comprises an export slot table which associates each of said export symbol names with a predetermined subset of said export table entries.

9. A medium according to claim 6, wherein said file comprises a chain entry corresponding to each of said export symbol names, each of said chain entries containing a hashword which is a first predefined function of the export symbol name corresponding to the chain entry, said chain entries being grouped into slots, at least one of said slots having more than one chain entry, each slot corresponding to a respective one of a plurality of hash slot values, the hash slot value corresponding to each given slot being a second predefined function of each of the export symbol names corresponding to a chain entry in said given slot.

10. A medium according to claim 9, wherein said file further comprises an export slot table which associates each given one of said hash slot values with the chain entries in the slot which correspond to said given hash slot value.

11. A medium according to claim 1, wherein said first export symbol location value further selects which of said at least one loadable section is said first loadable section.

12. A medium according to claim 1, wherein said symbol import portion comprises an import symbol table having a respective import symbol table entry corresponding to each of said import symbol names, each of said import table entries having a respective location in said table and identifying the import symbol name to which it corresponds, the import symbol number associated with each of said import symbol names being derivable from the location of the import table entry corresponding to the import symbol name in said import symbol table, said import symbol table being distinct from said export symbol table.

13. A medium according to claim 12, wherein said file further comprises a plurality of import symbol strings located in an import symbol name string portion of said file, and a plurality of export symbol strings located in an export symbol name string portion of said file, wherein each of said import table entries designates one of said import symbol name strings to identify the import symbol name to which the import table entry corresponds, wherein each of said export table entries designates one of said export symbol name strings to identify the export symbol name to which the export table entry corresponds, and wherein said import and export symbol name string portions of said file are distinct.

14. A medium according to claim 13, wherein said import and export symbol name string portions are each distinct from said export symbol table, and wherein said export symbol name string portion of said file is located closer in said file than said import symbol name string portion of said file, to said export symbol table.

15. A medium according to claim 14, wherein said import and export symbol name string portions are each distinct from said import symbol table, and wherein said import symbol name string portion of said file is located closer in said file than said export symbol name string portion of said file, to said import symbol table.

16. A medium according to claim 1, wherein said file further comprises a library portion associating a plurality of import library names with respective sets of said import symbol numbers, said library portion being non-interspersed with said symbol import portion and non-interspersed with said symbol export portion.

17. A medium according to claim 1, wherein said file has a plurality of information items to be loaded into said memory, certain ones of said information items each having a respective first address field containing a relocatable address, said file further having a plurality of relocation instructions, including a first instruction which specifies updating of the first address field of n consecutive ones of said information items, n being specified in said first relocation instruction.

18. A medium according to claim 1, said file having a plurality of information items to be loaded into said memory, certain ones of said information items each having a respective first address field containing a relocatable address, said file further having a plurality of relocation instructions, said relocation instructions being of different types, a first class of said relocation instructions (e.g. DDAT, CODE, DATA, DESC, DSC2, VTBL, SYMR, SYMB, SECN, LSECN) specifying a relocation operation on at least one of said information items, said at least one of said information items not being designated in said relocation instructions in said first class of relocation instructions, the type of each of said relocation instructions identifying the relocation operation to be performed on said at least one of said information items.

19. A computer readable storage medium carrying an exporting file for loading into a computer system memory as part of a process of loading an importing file into said memory for execution by a computer system, said export file having:

at least one loadable section including a first loadable section;

an export symbol table having entries which when interpreted by a computer system associates a plurality of export symbol names with respective export symbol location values, a first one of said export symbol location values including a pointer to a location in said first loadable section; and an export slot table which when interpreted by a computer system associates each of said export symbol names with a predetermined subset of said export symbol table entries, said first loadable section being distinct from both said export symbol table and said export slot table.

20. A computer readable storage medium carrying an exporting file for loading into a computer system memory as part of a process of loading an importing file into said memory for execution by a computer system, said exporting file having an export symbol table which when interpreted by a computer system associates a plurality of export symbol names with respective export symbol location values, said file further comprising a chain entry corresponding to each of said export symbol names, each of said chain entries containing a hashword which is a predefined Name to Hash-Word function of the export symbol name corresponding to the chain entry, said chain entries being grouped into slots, at least one of said slots having more than one chain entry, each slot corresponding to a respective one of a plurality of hash slot values, the hash slot value corresponding to each given slot being a predefined Hash-Word-to-Hash-Slot-Number function of the hashword in one of the chain entries in said given slot.

21. A medium according to claim 20, wherein said file further comprises an export slot table which associates each given one of said hash slot values with the chain entries in the slot which correspond to said given hash slot value.

22. A method for loading a relocatable file into a computer system memory for execution by the computer system, said file having a plurality of information items to be loaded into said memory, a first one of said information items having an address field and an indication of a first import symbol name for use in updating said address field, comprising the steps of:

said computer system loading an import file into said memory, said import file having a table of export symbols containing a plurality of export symbol slots each having a slot value, each of said slots in said table of export symbols containing at least one item associating an export symbol name to a respective location value, at least one of said slots in said table of export symbols containing more than one such item, all of the export symbol names associated in each given one of said slots having matching hash slot values according to a predefined hash-slot-value algorithm;

said computer system determining a first hash slot value for said first import symbol name according to said predefined hash-slot-value algorithm;

said computer system searching for a first export symbol name in a slot corresponding to said first hash slot value in said table of export symbols in said import file, which export symbol name matches said first import symbol name; and said computer system updating said address field of said first information item in response to the location value associated by said table of export symbols to said first export symbol name.

23. A method according to claim 22, wherein each given one of said items in said table of export symbols in said import file further associates a hashword value computed from the export symbol name of the given item according to a predefined hash-word-value algorithm, and wherein said slot corresponding to said first hash slot value contains a plurality of said items, said method further comprising a step of determining a first import hashword value for said first import symbol name according to said hash-word-value algorithm, and wherein said step of searching comprises the step of:

determining for successive current ones of at least two of said items in said slot corresponding to said first hash slot value in said table of export symbols, until the export symbol name of said current item matches said first import symbol name, first whether the export hashword value of said current item matches said first import hashword value, and only if so, whether the export symbol name of said current item matches said first import symbol name.

24. A method according to claim 23, wherein said import file further has an export slot table associating each given slot in said table of export symbols with the slot value of said given slot, said method further comprising a step of examining said export slot table to determine said slot corresponding to said first hash slot value.

25. A method according to claim 22, wherein said import file further has an export slot table associating each given slot in said table of export symbols with the slot value of said given slot, said method further comprising the step of examining said export slot table to determine said slot corresponding to said first hash slot value.

26. A method performed by a first computer system for constructing a relocatable file in a computer readable storage medium for loading into a computer system memory, said file having a plurality of information items to be loaded into said memory, certain ones of said information items each having a respective first address field containing a relocatable address, comprising steps of:

said first computer system identifying n consecutive ones of said certain information items; and said first computer system writing to said file a first relocation instruction which specifies updating of the first address field of said n consecutive information items, n being specified in said first relocation instruction.

27. A method according to claim 26, further comprising the steps of:

identifying m consecutive ones of said certain information items; and writing to said file a second relocation instruction which specifies updating of an address field of said m consecutive information items, m being specified in said second relocation instruction.

28. A method according to claim 27, wherein said first and second relocation instructions are of respective different first and second types, and wherein the updating specified by relocation instructions of said first type is different from the updating specified by relocation instructions of said second type.

29. A method according to claim 27, wherein said first and second relocation instructions have different byte lengths.

30. A method according to claim 26, wherein said first relocation instruction does not specify which of said n consecutive information items are to have an address field updated.

31. A method according to claim 26, wherein said updating of the first address field of said n consecutive information items as specified by said first relocation instruction includes updating the first address field of each given information item in said n consecutive information items to a value which depends upon a respective given element of a table (imports).

32. A method according to claim 31, wherein said updating of the first address field of a given information item as specified by said first relocation instruction includes adding the contents of said respective given element of said table to said first address field of said given information item.

33. A method according to claim 26, wherein said updating the first address field as specified by said first relocation instruction includes updating the first address field of each given information item in said n consecutive information items to a value which depends upon a third pointer (codeA, dataA) the value in said third pointer (codeA, dataA) remaining constant for said entire updating of the first address field of n consecutive ones of said information items.

34. A method according to claim 33, wherein said updating of the first address fields of each given information item as specified by said first relocation instruction includes adding of the contents of said third pointer (codeA, dataA) to said first address field of said given information item.

35. A method according to claim 33, wherein said updating the first address field as specified by said first relocation instruction further includes a specification of which of a predetermined plurality of pointers constitutes said third pointer.

36. A method for constructing a relocatable file in a computer readable storage medium for loading into a computer system memory, said file having a plurality of information items to be loaded into said memory, certain ones of said information items each having a respective first address field containing a relocatable address, comprising the steps of:

identifying a first plurality of said certain information items; and writing to said file a plurality of relocation instructions, said relocation instructions being of different types, a first class of said relocation instructions (e.g. DDAT, CODE, DATA, DESC, DSC2, VTBL, SYMR, SYMB, SECN, LSECN) specifying a relocation operation on at least one of said information items in said first plurality, said at least one of said information items in said first plurality not being designated in said relocation instructions in said first class of relocation instructions, the type of each of said relocation instructions identifying the relocation operation to be performed on said at least one of said information items in said first plurality.

37. A method according to claim 36, wherein the relocation operation identified by each given relocation instruction in a second class of relocation instructions (e.g. DDAT, CODE, DATA, DESC, DSC2, VTBL, SYMR) which is within said first class, includes updating the first address field of n consecutive ones of said information items in said first plurality, said n consecutive ones of said information items not being designated in said given relocation instruction, n being specified in said given relocation instruction.

38. A method according to claim 37, wherein the updating to be performed if said given relocation instruction is in a third class of relocation instructions (e.g. DDAT, CODE, DATA, DESC, DSC2, VTBL) which is within said second class, includes updating the first address field of each given information item in said n consecutive ones of said information items to a value which depends upon the prior contents of such first address field and upon a third pointer (codeA, dataA), the value in said third pointer (codeA, dataA) remaining constant for said entire updating of the first address field of n consecutive information items.

39. A method according to claim 37, wherein the updating to be performed if said given relocation instruction is in a fourth class of instructions (e.g. DDAT) within said third class includes adding of the contents of a third pointer (dataA) to said first address field of each of said n consecutive information items, said given relocation instruction further specifying a value by which a second pointer (rAddr) pointing to said information items is to be incremented prior to said updating.

40. A method according to claim 37, wherein the updating to be performed includes adding the contents of a third pointer (codeA) to said first address field of each of said n consecutive information items if said given relocation instruction is in a sixth class of relocation instructions (e.g. CODE) which is within said second class, and adding the contents of a fourth pointer (dataA) to said first address field of each of said n consecutive information items if said given relocation instruction is in a seventh class of instructions (e.g. DATA) which is within said second class.

41. A method according to claim 37, wherein each of said n consecutive information items includes a first word and a second word, wherein said updating to be performed if said given relocation instruction is in an eighth class of instructions (e.g. VTBL) within said second class, includes adding the contents of a fourth pointer (dataA) to the first word of each of said n consecutive information items, the relocation operation identified by relocation instructions in said eighth class of instructions not including any updating of the second word of each of said n consecutive information items.

42. A method according to claim 37, wherein each of said n consecutive information items further includes a respective second address field containing a relocatable address, wherein the relocation operation identified by each given relocation instruction in a ninth class of relocation instructions (e.g. DESC, DSC2) within said second class, includes adding the contents of a third pointer (codeA) to said first address field of each of said n consecutive information items and adding the contents of a fourth pointer (dataA) to said second address field of each of said n consecutive information items.

43. A method according to claim 37, wherein the updating to be performed if said given relocation instruction is in a tenth class of instructions (e.g. SYMR), includes adding, to the first address field of each i'th one of said n consecutive information items, the contents of a respective i'th element of n consecutive elements in a table (imports).

44. A method according to claim 36, wherein said relocation operation specified by each given relocation instruction which is in an eleventh class of relocation instructions (e.g. SYMB, SECN, LSECN) within said first class, includes updating the first address field of the information item designated by a second pointer (rAddr) the contents of which are not specified in said relocation instruction.

45. A method according to claim 44, wherein said updating of the first address field includes adding to said first address field the contents of a pointer (imports [IDX9], regions[IDX9], regions [CNT22]) specified by said given relocation instruction.

46. A method according to claim 36, wherein said plurality of relocation instructions further includes relocation instructions in a thirteenth class of instructions (e.g. DCIS, DTIS, LCDIS, LDTIS), each relocation instruction in said thirteenth class of instructions specifying that a third one of a predetermined plurality of pointers (codeA, dataA) is to be updated, the type of each relocation instruction in said thirteenth class of instructions determining which of said predetermined plurality of pointers (codeA dataA) is to be said third pointer.

47. A method according to claim 46, wherein said plurality of information items is to be loaded into a plurality of regions of said memory, each of said regions containing contiguously a respective group of at least one of said plurality of information items, each of said regions having a respective designation and a respective start address, and wherein the updating specified by each given relocation instruction in said thirteenth class of instructions includes storing as said third pointer (codeA, dataA) the start address of one of said regions whose designation is specified in said given relocation instruction.

48. A method according to claim 36, wherein said relocation instructions further include a fourteenth class of instructions (e.g. DELTA), each relocation instruction in said fourteenth class of instructions specifying a value to be added to a second pointer (rAddr) into said information items.

49. A method according to claim 36, wherein said relocation instructions further include a fifteenth class of instructions (e.g. LABS), each relocation instruction in said fifteenth class of instructions specifying a value to be stored as a second pointer (rAddr) into said information items.

50. A method according to claim 36, wherein said relocation instructions further include a sixteenth class of instructions (e.g. RPT, LRPT), each instruction in said sixteenth class of instructions specifying a number of times for which an immediately preceding group of m of said relocation instructions are to be repeated.

51. A method according to claim 50, wherein each instruction in said sixteenth class of instructions further specifies m.

52. A method performed by a computer system for constructing, in a computer readable storage medium, an object code library file containing a plurality of exports capable of being imported into an importing file to be loaded into a computer system memory, each of said exports having an export symbol name and a respective export symbol location value, comprising steps of:

said computer system writing said exports to said object code library file in said computer readable storage medium; and said computer system writing to said object code library file in said computer readable storage medium an export symbol table associating said export symbol names with said export symbol location values, said export symbol table being hashed.

53. A method performed by a computer system for constructing, in a computer readable storage medium, an object code library file containing a loadable section and a plurality of exports capable of being imported into an importing file to be loaded into a computer system memory, each of said exports having an export symbol name and a respective export symbol location value, comprising steps of:

said computer system writing said loadable section to said object code library file in said computer readable storage medium;

said computer system writing to said object code library file an export symbol table having a plurality of entries each associating a respective given one of said export symbol names with the export symbol location value of the given export symbol name, a first one of said export symbol location values including a pointer to a location in said first loadable section; and said computer system writing to said object code library file in said computer readable storage medium an export slot table which associates each of said export symbol names with a predetermined subset of said export table entries.

54. A method for constructing, in a computer readable storage medium, an object code file containing a plurality of exports capable of being imported into an importing file to be loaded into a computer system memory, each of said exports having an export symbol name and a respective export symbol location value, comprising steps of.

writing to said object code file an export symbol table associating each of said export symbol names with its respective export symbol location value;

writing to said object code file a chain entry corresponding to each of said export symbol names, each of said chain entries containing a hashword which is a predefined Name-to-Hashword function of the export symbol name corresponding to the chain entry, said chain entries being grouped into slots, at least one of said slots having more than one chain entry, each slot corresponding to a respective one of a plurality of hash slot values, the hash slot value corresponding to each given slot being a predefined Hash-Word-to-Hash-Slot Number function of the hashword in one of the chain entries in said given slot.

55. A method according to claim 54, further comprising the step of writing to said object code file an export slot table which associates each given one of said hash slot values with the chain entries in the slot which correspond to said given hash slot value.

56. A method for constructing, in a computer readable storage medium, a file to be loaded into a computer system memory, comprising steps of:

identifying in said file a data pattern consisting of
(a) RCount3 contiguous instances of, in combination:
(1) a first repeating pattern of length Count1 bytes, followed contiguously by
(2) a non-repeating part of length DCount2 bytes,
(b) followed contiguously by another instance of said first repeating pattern of length Count1 bytes, said first repeating pattern being identical in all of said instances; and writing to said file a data expansion instruction comprising Count1, DCount2; RCount3, said first repeating pattern, and each of said non-repeating parts.

57. A computer readable storage medium carrying a file for loading into a computer system memory, said file having a plurality of data expansion instructions, including a first instruction which specifies the creation of a data pattern consisting of (a) RCount3 contiguous instances of, in combination:
  (1) a first repeating pattern of length Count1 bytes, followed continuously by
  (2) a non-repeating part of length DCount2 bytes,
(b) followed contiguously by another instance of said first reseating pattern of length Count1 bytes, said first repeating pattern being identical in all of said instances, said first instruction identifying Count1, DCount2, RCount3, said first repeating pattern, and each of said non-repeating parts.

58. A method for loading a file into a computer system memory, said file having a plurality of data expansion instructions, comprising steps of:

retrieving a first one of said data expansion instructions; and creating, in said computer system memory, a data pattern consisting of
(a) RCount3 contiguous instances of, in combination:
  (1) a first repeating pattern of length Count1 bytes, followed contiguously by
  (2) a non-repeating part of length DCount2 bytes,
(b) followed contiguously by another instance of said first repeating pattern of length Count1 bytes, said first repeating pattern being identical in all of said instances, said first instruction identifying Count1, DCount2, RCount3, said first repeating pattern, and each of said non-repeating parts.

* * * * *

UNITED STATES PATENT AND TRADEMARK OFFICE
CERTIFICATE OF CORRECTION

PATENT NO. : 5,764,987
DATED : June 9, 1998
INVENTOR(S) : Eidt, et al.

It is certified that error appears in the above-indentified patent and that said Letters Patent is hereby corrected as shown below:

Claim 33, column 141, line 27, "dataA) the value in said" should read - -dataA), the value in said- -.
Claim 40, column 142, line 34, "class of instructions" should read - -class.- -.
Claim 40, column 142, line 35, delete "(e.g. DATA) which is within said second class."
Claim 54, column 144, line 26, "steps of." should read - -steps of:- -.
Claim 56, column 144, line 61 "DCount2;" should read - -DCount2,- -.
Claim 57, column 145, line 3, "continuously" should read - -contiguously- -.
Claim 57, column 145, line 6, "reseating" should read - -repeating- -.

Signed and Sealed this

Sixteenth Day of November, 1999

Attest:

Q. TODD DICKINSON

*Attesting Officer*   *Acting Commissioner of Patents and Trademarks*